(12) United States Patent
Haq et al.

(10) Patent No.: US 12,590,511 B2
(45) Date of Patent: Mar. 31, 2026

(54) METHOD OF STORING HYDROGEN GAS IN A SUBSURFACE FORMATION USING NITROGEN, METHANE, AND CARBON DIOXIDE BLEND AS A CUSHION GAS

(71) Applicant: KING FAHD UNIVERSITY OF PETROLEUM AND MINERALS, Dhahran (SA)

(72) Inventors: Md Bashirul Haq, Dhahran (SA); Dhafer Abdullah Al Shehri, Dhahran (SA); Nasiru Salahu Muhammed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 296 days.

(21) Appl. No.: 18/330,895

(22) Filed: Jun. 7, 2023

(65) Prior Publication Data

US 2024/0410255 A1     Dec. 12, 2024

(51) Int. Cl.
B65G 5/00          (2006.01)
E21B 41/00          (2006.01)
(52) U.S. Cl.
CPC ............ E21B 41/0057 (2013.01); B65G 5/00 (2013.01)
(58) Field of Classification Search
CPC ..... E21B 41/0057; E21B 43/166; B65G 5/00; Y02E 60/32
See application file for complete search history.

(56) References Cited

U.S. PATENT DOCUMENTS

| | | | |
|---|---|---|---|
| 5,052,856 A | 10/1991 | Tek | |
| 6,306,198 B1 | 10/2001 | Corbin | |
| 2016/0089705 A1* | 3/2016 | Oates | B09C 1/02 |
| | | | 405/57 |

FOREIGN PATENT DOCUMENTS

| | | |
|---|---|---|
| EP | 1 640 654 B1 | 10/2016 |
| RU | 2 189 340 C2 | 9/2002 |
| WO | WO 2022/232630 A1 | 11/2022 |

OTHER PUBLICATIONS

Heinemann et al., Enabling large-scale hydrogen storage in porous media—the scientific challenge, 2021, Energy and Environmental Science, Royal Society of Chemistry, pp. 853-864 (Year: 2021) (Year: 2021).*

(Continued)

*Primary Examiner* — Carib A Oquendo
(74) *Attorney, Agent, or Firm* — Oblon, McClelland, Maier & Neustadt, L.L.P.

(57)          ABSTRACT

A method of storing hydrogen (H$_2$) gas in a subsurface formation having an injection well, a production well and a heat well. The method includes injecting a first fluid stream into the subsurface formation via the at least one injection well to form a first composition containing a gas-phase mixture, a liquid-phase mixture and a solid matrix; injecting a H$_2$-containing gas stream into the subsurface formation via the at least one injection well to form a gas mixture containing H$_2$ gas; and heating and pressurizing the subsurface formation containing the gas mixture via the at least one heat well thereby achieving a storage condition and maintaining the storage condition to store the H$_2$ in the subsurface formation.

20 Claims, 14 Drawing Sheets

100 ⟶

102 — Inject first fluid stream into subsurface formation via at least one injection well to form a first composition containing a gas-phase mixture, a liquid-phase mixture and a solid matrix, wherein the gas-phase mixture includes 10 to 90 % of H$_2$, 5 to 80 % of nitrogen (N$_2$), 1 to 10 % of methane (CH$_4$), 1 to 10 % of carbon dioxide (CO$_2$), and each % is based on a total volume of the gas-phase mixture, the liquid-phase mixture includes water and at least one water-soluble mineral, and the solid matrix includes clay, shale, slate, and minerals 104 — Inject H$_2$-containing gas stream into the subsurface formation via the at least one injection well to form a gas mixture containing H$_2$ gas, wherein the H$_2$-containing gas stream comprises at least 50% of H$_2$ based on a total volume of the H$_2$-containing gas stream.

106 — Heat and pressurize the subsurface formation containing the gas mixture via at least one heat well thereby achieving a storage condition and maintaining the storage condition to store the H$_2$ in the subsurface formation

(56) References Cited

OTHER PUBLICATIONS

Mohammad Zamehrian, et al., "Underground hydrogen storage in a partially depleted gas condensate reservoir: Influence of cushion gas", Journal of Petroleum Science and Engineering, vol. 212, May 2022, 5 pages (Abstract only).

Radosław Tarkowski, et al., "Storage of hydrogen, natural gas, and carbon dioxide—Geological and legal conditions", International Journal of Hydrogen Energy, vol. 46, Issue 38, Jun. 3, 2021, pp. 20010-20022 (Abstract only).

Mahdi Kanaani, et al., "Role of Cushion Gas on Underground Hydrogen Storage in Depleted Oil Reservoirs", Journal of Energy Storage, vol. 45, Jan. 2022, 5 pages (Abstract only).

\* cited by examiner

100 ⟍

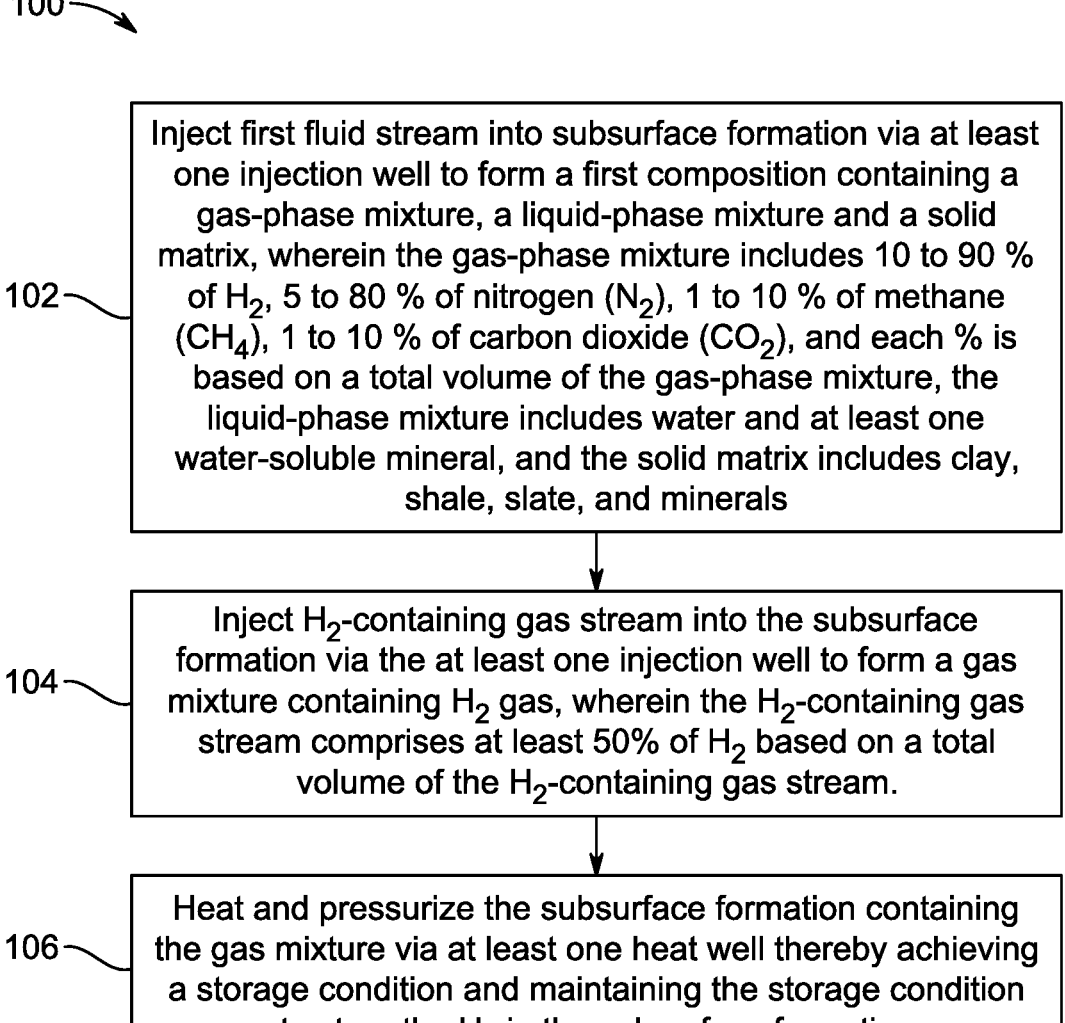

102 ⟍ Inject first fluid stream into subsurface formation via at least one injection well to form a first composition containing a gas-phase mixture, a liquid-phase mixture and a solid matrix, wherein the gas-phase mixture includes 10 to 90 % of $H_2$, 5 to 80 % of nitrogen ($N_2$), 1 to 10 % of methane ($CH_4$), 1 to 10 % of carbon dioxide ($CO_2$), and each % is based on a total volume of the gas-phase mixture, the liquid-phase mixture includes water and at least one water-soluble mineral, and the solid matrix includes clay, shale, slate, and minerals 104 ⟍ Inject $H_2$-containing gas stream into the subsurface formation via the at least one injection well to form a gas mixture containing $H_2$ gas, wherein the $H_2$-containing gas stream comprises at least 50% of $H_2$ based on a total volume of the $H_2$-containing gas stream.

106 ⟍ Heat and pressurize the subsurface formation containing the gas mixture via at least one heat well thereby achieving a storage condition and maintaining the storage condition to store the $H_2$ in the subsurface formation

FIG. 1

METHOD OF STORING HYDROGEN GAS IN A SUBSURFACE FORMATION USING NITROGEN, METHANE, AND CARBON DIOXIDE BLEND AS A CUSHION GAS

BACKGROUND

Technical Field

The present disclosure is directed to a method of storing hydrogen ($H_2$) in depleted gas reservoirs and improving the hydrogen geo-storage capacity.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Alternative energy sources to fossil fuels, such as carbon-free solar panels, carbon-free wind power, geothermal energy, and hydrogen ($H_2$) production are being explored due to the urgent environmental concern of rising $CO_2$ levels in the atmosphere. Green $H_2$ production through sustainable methods, such as water electrolysis technology, can be employed with zero-carbon emissions. However, most $H_2$ production currently relies on the usage of fossil fuels and carbon-intensive processes such as natural gas steam reforming or coal gasification, both of which emit large amounts of $CO_2$. Hydrogen-natural gas blends are critical in bridging the gap between present grey carbon-based and future green $H_2$ technologies. Despite numerous advantages of $H_2$ in various industries such as chemical, food, pharmaceuticals, metallurgical, transport, aviation, and maritime sectors, safe and effective storage, and gas transportation remains a significant issue for practical applications. One reason for the appeal of hydrogen/natural gas blend is that, unlike pure $H_2$, they can be transported to end-use devices using existing natural gas pipes. Additionally, these blends can also help minimize $CO_2$ emissions when natural gas is used by compensating for the lower heating value (244 KJ/mol) of $H_2$, thus boosting the total energy density.

Challenges associated with hydrogen ($H_2$) storage in geologic formations (salt caverns, aquifers, and depleted oil/gas reservoirs) have been established in the various scientific literature. These problems could result in, for example, (i) uncontrolled leakage and $H_2$ trapping in reservoir rocks based on its molecule size as well as diffusion through the reservoir and caprock, (ii) reaction with formation fluids (brine and minerals), (iii) production of pollutants with possible health risks, (iv) biofilms formation and their impacts on pore blockage, and (v) well integrity issues during injection and withdrawal.

Amongst geological formations, depleted natural gas reservoirs are potentially important targets for carbon dioxide ($CO_2$) and $H_2$ storage. Suitability of storage sites is determined by their total capacity/deliverability, which refers to the maximum volume of gas that can be contained within a reservoir which is broken down into working gas, and cushion gas. While the working gas refers to gas that can be recovered and made available to the market (in this case $H_2$), the cushion gas signifies the permanent inventory base gas remaining for adequate pressure maintenance.

A key constraint in the safe geological storage of $H_2$ involves the accurate knowledge of the sealing capillary pressure which prevents the migration (i.e., leakage) of $H_2$ from the storage site through the caprock (structural trapping). This pressure characterizes the capillary-sealing efficiency of a caprock, and it corresponds to the pressure at which the non-wetting $H_2$ gas penetrates the largest pore of a caprock previously saturated with a wetting phase (typically $H_2O$/brine), leading to the escape of $H_2$ from the storage site (reservoir). Furthermore, having accurate knowledge of wettability and gas/brine surface tension under various geological conditions, including pressure, temperature, rock mineralogy, and brine composition, is crucial for designing and maximizing $H_2$ storage projects.

Studies have investigated $H_2$ wettability using $CH_4$ as a cushion gas in depleted reservoir conditions. For instance, Hashemi et al. [See: Hashemi, L.; Boon, M.; Glerum, W.; Farajzadeh, R.; Hajibeygi, H. *A comparative study for $H_2$—$CH_4$ mixture wettability in sandstone porous rocks relevant to underground hydrogen storage. Adv. Water Resour.* 2022, 163] used the captive bubble technique to quantify the contact angle of Bentheimer sandstone at underground hydrogen storage (UHS) pressures, temperature, and salinities. Mirchi et al. [See: Mirchi, V.; Dejam, M.; Alvarado, V. *Interfacial tension and contact angle measurements for hydrogen-methane mixtures/brine/oil-wet rocks at reservoir conditions. Int. J. Hydrogen Energy* 2022, 47, 34963-34975] quantified the contact angles of $H_2$, $CH_4$, and $H_2$—$CH_4$ mixtures for oil-wet samples (sandstone and limestone) for different temperatures at 1000 psi pressure and 2 wt. % NaCl brine salinity. Although studies have provided some insight into $H_2$ storage in the aquifer and depleted oil and gas media, the effect of other native gases, such as the use of $N_2$ as a cushion gas, on the hydrogen storage in these formations remains unclear. Therefore, there remains a need to develop $N_2$ cushion gas mixtures at different compositions of $H_2$ for large-scale storage under depleted gas conditions via wettability and gas-liquid surface tension measurements relevant to UHS.

In view of the foregoing, it is one objective of the present disclosure to provide quartz/brine/gas mixtures ($N_2$—$H_2$—$CH_4$—$CO_2$) and their respective contact angles, and gas/brine mixtures ($N_2$—$H_2$—$CH_4$—$CO_2$) with their respective surface tensions as $N_2$ cushion gases for $H_2$ injection. A second objective of the present disclosure is to describe a method of storing hydrogen ($H_2$) gas in a subsurface formation.

SUMMARY

In an exemplary embodiment, a method of storing hydrogen ($H_2$) gas in a subsurface formation is described. The subsurface formation includes at least one injection well, at least one production well and at least one heat well penetrating the subsurface formation. The method includes injecting a first fluid stream into the subsurface formation via the at least one injection well to form a first composition containing a gas-phase mixture, a liquid-phase mixture and a solid matrix. In some embodiments, the injecting the first fluid stream increases wettability of the solid matrix by contact with the gas-phase mixture and the liquid-phase mixture, and reduces surface tension of the gas-phase mixture and the liquid-phase mixture. In some embodiments, the gas-phase mixture of the first composition includes 10 to 90% of $H_2$, 5 to 80% of nitrogen ($N_2$), 1 to 10% of methane ($CH_4$), 1 to 10% of carbon dioxide ($CO_2$). Each % is based on a total volume of the gas-phase mixture. In some embodiments, the liquid-phase mixture of the first composition includes water and at least one water-soluble mineral and the solid matrix of the first composition includes clay, shale, slate, and minerals. The method further includes injecting a $H_2$-containing gas stream into the subsurface formation via the at least one injection well to form a gas mixture containing $H_2$ gas. In some embodiments, the $H_2$-containing gas stream contains at least 50% of $H_2$ based on a total volume of the $H_2$-containing gas stream. The method further includes heating and pressurizing the subsurface formation containing the gas mixture via the at least one heat well thereby achieving a storage condition and maintaining the storage condition to store the $H_2$ in the subsurface formation.

In some embodiments, the gas-phase mixture after the injecting of the first fluid stream includes 20 to 80% of $H_2$, 10 to 70% of $N_2$, about 5% of $CH_4$, and about 5% of $CO_2$. Each % is based on a total volume of the gas-phase mixture.

In some embodiments, the gas-phase mixture of the first composition further includes up to 5% of hydrogen sulfide ($H_2S$), based on the total volume of the gas-phase mixture.

In some embodiments, the gas-phase mixture of the first composition further includes up to 5% of moisture ($H_2O$), based on the total volume of the gas-phase mixture.

In some embodiments, the subsurface formation is a hydrocarbon-containing reservoir, a depleted natural gas reservoir, a carbon sequestration reservoir, an aquifer, a geothermal reservoir, and/or an in-situ leachable ore deposit.

In some embodiments, the subsurface formation includes a rock material obtained from at least one shale selected from the group consisting of Eagle ford shale, Wolfcamp shale, Posidonia shale, Wellington shale, and Mancos shale.

In some embodiments, the rock material includes one or more of Bentheimer sandstone, Berea sandstone, Vosges sandstone, quartz, borosilicate glass, basalt, shale, calcite, granite, dolomite, gypsum, anhydrite, mica, kaolinite, illite, montmorillonite, and coal.

In some embodiments, the at least one water-soluble mineral includes one or more of sodium bicarbonate, sodium carbonate, sodium chloride, potassium bicarbonate, potassium carbonate, and potassium chloride.

In some embodiments, the at least one water-soluble mineral is present in the liquid-phase mixture at a concentration of 0.1 to 30 wt. % based on a total weight of the liquid-phase mixture.

In some embodiments, the at least one water-soluble mineral is sodium chloride. In some embodiments, the sodium chloride is present in the liquid-phase mixture at a concentration of 2 to 20 wt. % based on a total weight of the liquid-phase mixture.

In some embodiments, the solid matrix of the first composition further includes silicate, argillite, quartz, sandstone, gypsum, conglomerate, basalt, feldspar, mica, granite, granodiorite, diorite, calcite, kaolinite, illite, montmorillonite, and sand.

In some embodiments, the storage condition has a temperature in a range of 20 to 80 degree Celsius (° C.) in the subsurface formation.

In some embodiments, the gas/liquid-phase mixture has a water contact angle with the solid matrix in a range of 15 to 50 degrees (°) under a pressure of 500 to 4000 pound-force per square inch (psi) in the subsurface formation.

In some embodiments, the gas/liquid-phase mixture has a surface tension in a range of 50 to 90 dynes per centimeter (dynes/cm) under a pressure of 500 to 4000 psi in the subsurface formation, as determined by ASTM D1331-14.

In some embodiments, the storage condition has a pressure of 300 to 5000 psi in the subsurface formation.

In some embodiments, the gas/liquid-phase mixture has a water contact angle with the solid matrix in a range of 15 to 50° under a temperature in a range of 30 to 70° C. in the subsurface formation.

In some embodiments, the gas/liquid-phase mixture has a surface tension in a range of 50 to 90 dynes/cm under a temperature in a range of 30 to 70° C. in the subsurface formation, as determined by ASTM D1331-14.

In some embodiments, the first fluid stream is injected in an amount effective to increase an $H_2$ storage capacity of the subsurface formation. The gas mixture under the storage condition includes about 60% of $H_2$, about 30% of $N_2$, about 5% of $CO_2$, and about 5% of $CH_4$. Each % is based on the total volume of the gas mixture. The liquid-phase mixture includes 2 to 5 wt. % of NaCl based on a total weight of the liquid-phase mixture and the storage condition has a temperature in a range of 30 to 40° C.

In some embodiments, the method further includes withdrawing the gas-phase mixture under the storage condition from the subsurface formation via the at least one production well. The method further includes introducing the gas mixture into a hydrogen purification device comprising a plurality of hydrogen-selective membranes. The plurality of hydrogen-selective membranes are permeable to hydrogen gas, but are at least substantially impermeable to other components in the gas mixture. The method further includes passing the gas mixture through the plurality of hydrogen-selective membranes in the hydrogen purification device thereby allowing hydrogen gas to pass through the hydrogen-selective membrane and rejecting other components in the gas mixture to form a residue composition. The method further includes collecting the hydrogen gas after passing and recycling the residue composition.

In some embodiments, the plurality of hydrogen-selective membranes in the hydrogen purification device is arranged in parallel. Each membrane of the plurality of hydrogen-selective membranes is placed in a plane perpendicular to the direction of the gas mixture flow in the hydrogen purification device.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a schematic flow chart of a method of storing hydrogen ($H_2$) in a subsurface formation, according to certain embodiments;

DETAILED DESCRIPTION

Figure 2:
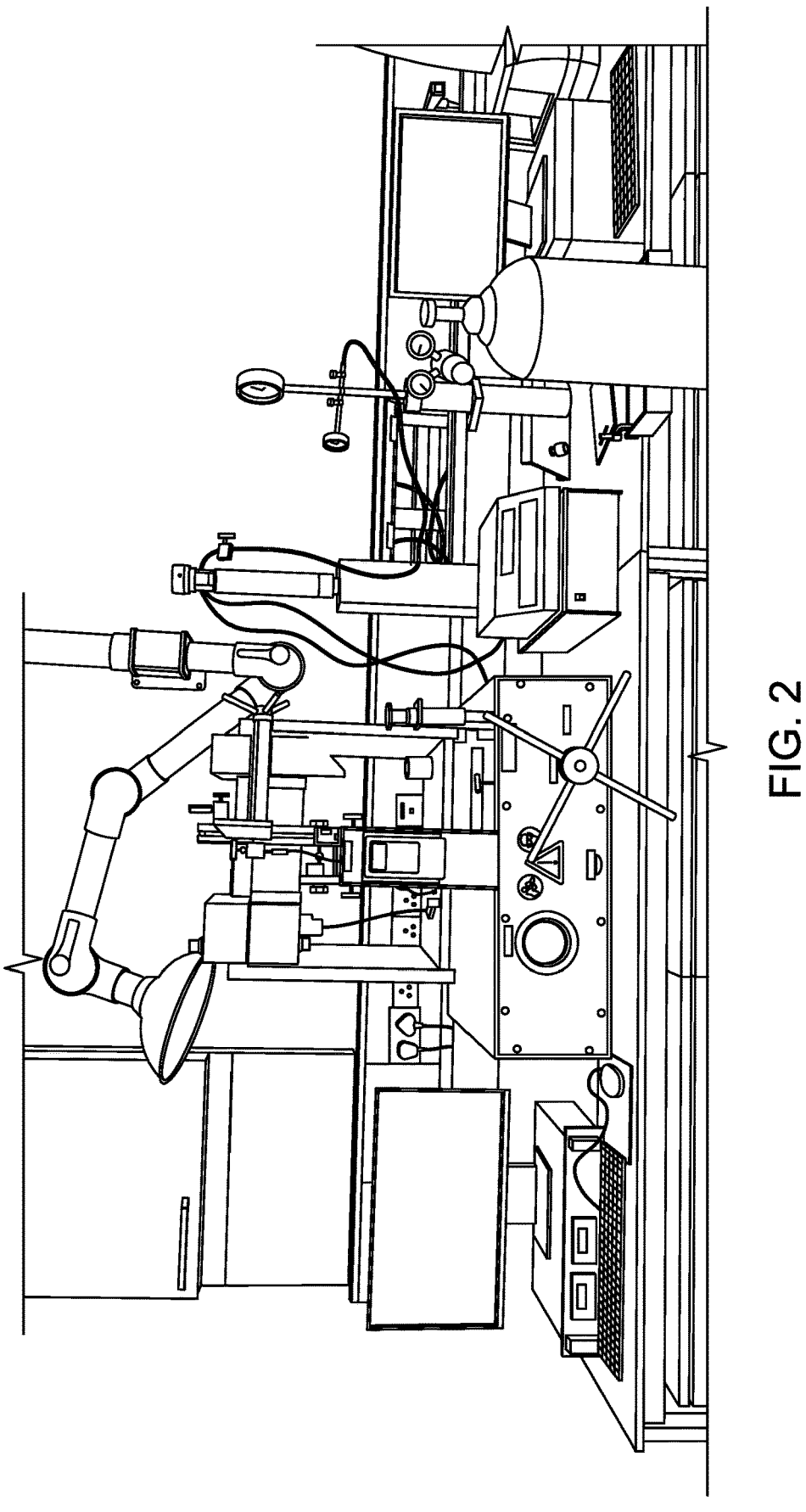
FIG. 2 is a pictorial depiction of the Krüss drop shape analyzer (DSA100) equipment, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed towards a method for storing hydrogen ($H_2$) in depleted gas reservoirs and improving hydrogen ($H_2$) geo-storage capacity.

Referring to FIG. 1, a schematic flow chart of a method 100 of storing hydrogen ($H_2$) gas in a subsurface formation is illustrated, according to an embodiment of the present disclosure. The subsurface formation includes at least an injection well configured to place oil and gas production waste, such as brine, into a porous rock formation for storage. Generally, the injection well is drilled thousands of feet, preferably at least 1000 feet, preferably at least, 2000, 3000, 4000 or 5000 feet, preferably at least 10,000 feet, preferably at least 15,000 feet, or even more preferably at least 20,000 feet, into the earth to inject injection fluids into the porous rock formation. By injecting at depth, the injection well does not inject production waste into subsurface freshwater reservoirs. The production waste is further stored in the injection well during the oil and gas extraction process. The subsurface formation further includes at least one production well configured to extract oil or gas from the subsurface during the oil and gas extraction process. The production well is also drilled thousands of feet, preferably at least 1000 feet, preferably at least 2000, 3000, 4000 or 5000 feet, preferably at least 10,000 feet, preferably at least 15,000 feet, or even more preferably at least 20,000 feet, into the earth directly into oil or gas-rich deposits contained in underground formations. During the oil and gas extraction process, hydraulic fracturing is used to bring the oil or gas to the surface. Hydraulic fracturing is defined as a method in which a mixture of water, sand and chemicals called "brine" are injected at high pressure through the injection well to fracture the rock, which then releases the oil or natural gas and allows it to flow to the ground surface. The subsurface formation further includes at least one heat well configured to heat the subsurface formation containing storage composition. As used herein, the term "heat well" generally refers to a vertical pipe or casing that is used to circulate heated fluid, e.g., hot water or steam, into an oil reservoir. In the present disclosure, the heat well can heat up the storage composition in the reservoir after injecting the $H_2$-containing fluid stream. The viscosity of the gas-phase mixture, and the liquid-phase mixture of the storage composition may be reduced after the heating, making it easier to pump out of the well.

In some embodiments, the volume amount of the gas-phase mixture that can be stored in a depleted gas reservoir ranging from hundreds of thousands of cubic meters ($m^3$) to cubic kilometers, preferably at least 50 $m^3$, preferably at least 500 $m^3$, preferably at least 5,000 $m^3$, or even more preferably at least 50,000 $m^3$, preferably $1 \times 10^6$ $m^3$, preferably $1 \times 10^7$ $m^3$, preferably $1 \times 10^8$ $m^3$, preferably $1 \times 10^9$ $m^3$, preferably $1 \times 10^{10}$ $m^3$. In some embodiments, the mass amount of the gas-phase mixture that can be stored in a depleted gas reservoir ranging from tens of thousands to millions of kilograms (kg), preferably at least 5,000 kg, preferably at least 10,000 kg, preferably at least 50,000 kg, or even more preferably at least 100,000 kg or 1,000,000 kg. Other ranges are also possible. The volume of subsurface formation required to store a given amount of the gas-phase mixture depends on the pressure and temperature conditions of the reservoir, the rock properties of the formation, and the injection and withdrawal rates of the gas. In some further embodiments, the volume of subsurface formation is ranging from hundreds to thousands of cubic meters ($m^3$), at least 50 $m^3$, preferably at least 500 $m^3$, preferably at least 5,000 $m^3$, or even more preferably at least 50,000 $m^3$, preferably $1 \times 10^6$ $m^3$, preferably $1 \times 10^7$ $m^3$, preferably $1 \times 10^8$ $m^3$, preferably $1 \times 10^9$ $m^3$, preferably $1 \times 10^{10}$ $m^3$. Other ranges are also possible.

In some embodiments, the heat well is in the form of a closed-loop pipeline having an aboveground loop part, and an underground loop part. The aboveground loop part is in thermal communication with a heat pump supplied by at least one energy source selected from the group consisting of natural gas, electricity, diesel fuel, and solar energy. The heat pump may be monitored and controlled by a computer system to ensure that a desired temperature for the storage composition in the subsurface formation is achieved. In some further embodiments, the underground loop part is extended into the central cavity of the subsurface formation and is in a helix shape that allows substantial contact with the gas-phase mixture, and the liquid-phase mixture of the storage composition. In some more preferred embodiments, the underground loop part is in thermal communication with the gas-phase mixture, and the liquid-phase mixture of the storage composition. In some embodiments, the amount of heat required to store the gas-phase mixture in a depleted gas reservoir is determined by the temperature for the storage composition in the subsurface formation, which is known to those of skill in the art.

In yet some other embodiments, the underground loop part of the heat well may be located around the subsurface formation and is surrounded by layers of rock and soil. The underground loop part is drilled deep into the ground and is equipped with a series of perforations or slots, known as a perforated casing, that allow the heated fluid to flow into the surrounding rock and heat up the subsurface formation surrounded by the underground loop part.

In some embodiments, the subsurface formation includes one of a hydrocarbon-containing reservoir, a depleted natural gas reservoir, a carbon sequestration reservoir, an aquifer, a geothermal reservoir, and/or an in-situ leachable ore deposit. In some embodiments, the subsurface formation includes a rock material obtained from at least one shale selected from the group consisting of Eagle ford shale, Wolfcamp shale, Posidonia shale, Wellington shale, and Mancos shale. The rock material includes one or more of Bentheimer sandstone, Berea sandstone, Vosges sandstone, quartz, borosilicate glass, basalt, shale, calcite, granite, dolomite, gypsum, anhydrite, mica, kaolinite, illite, montmorillonite, and coal.

The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes injecting a first fluid stream into the subsurface formation via the at least one injection well. The first fluid stream is further stored in the injection well to form a first composition containing a gas-phase mixture, a liquid-phase mixture, and a solid matrix. In some embodiments, injecting the first fluid stream increases wettability of the solid matrix by contact with the gas-phase mixture and the liquid-phase mixture, and reduces surface tension of the gas-phase mixture and the liquid-phase mixture. The liquid-phase mixture of the first composition includes water and at least one water-soluble mineral. The water-soluble mineral includes one or more of sodium bicarbonate, sodium carbonate, sodium chloride, potassium bicarbonate, potassium carbonate, and potassium chloride. Further, the water-soluble mineral is present in the liquid-phase mixture at a concentration of 0.1 to 30 wt. % based on a total weight of the liquid-phase mixture, preferably 1 to 25 wt. %, preferably 5 to 20 wt. %, or even more preferably 10 to 15 wt. % based on the total weight of the liquid-phase mixture. In some embodiments, the water-soluble mineral is sodium chloride which is present in the liquid-phase mixture at a concentration of 2 to 20 wt. % based on the total weight of the liquid-phase mixture, preferably 5 to 15 wt. %, or even more preferably about 10 wt. % based on the total weight of the liquid-phase mixture. In some further preferred embodiments, the liquid-phase mixture may further include a crude oil selected from the group consisting of Arabian Heavy oil, Arabian Light oil, Gulf crudes, and Brent crude. As used herein, the term "crude oil" generally refers to oil that has undergone some pre-treatment such as water-oil separation; and/or oil-gas separation; and/or desalting; and/or a stabilized mixture that contains crude oil.

The solid matrix of the first composition includes clay, shale, slate, and minerals. In some embodiments, the solid matrix of the first composition includes silicate, argillite, quartz, sandstone, gypsum, conglomerate, basalt, feldspar, mica, granite, granodiorite, diorite, calcite, kaolinite, illite, montmorillonite, and sand.

The gas-phase mixture of the first composition includes hydrogen ($H_2$), nitrogen ($N_2$), methane ($CH_4$), and carbon dioxide ($CO_2$). According to the present disclosure, a total volume of the gas-phase mixture includes 10 to 90% of $H_2$, 5 to 80% of $N_2$, 1 to 10% of $CH_4$, and 1 to 10% of $CO_2$. In some embodiments, the gas-phase mixture after the injection of the first fluid stream includes 20 to 80% of $H_2$, 10 to 70% of $N_2$, about 5% of $CH_4$, and about 5% of $CO_2$. Each % is defined based on the total volume of the gas-phase mixture. In some embodiments, the gas-phase mixture of the first composition includes up to 5% of hydrogen sulfide ($H_2S$), based on the total volume of the gas-phase mixture. In some embodiments, the gas-phase mixture of the first composition includes up to 5% of moisture ($H_2O$), based on the total volume of the gas-phase mixture.

In some embodiments, the first fluid stream may be a $H_2$-containing gas mixture containing hydrogen ($H_2$), methane ($CH_4$), carbon dioxide ($CO_2$), and nitrogen ($N_2$). In some further embodiments, a total volume of the $H_2$-containing gas mixture includes 10 to 90% of $H_2$, 5 to 80% of $N_2$, 1 to 10% of $CO_2$, and 1 to 10% of $CH_4$. In some preferred embodiments, the $H_2$-containing gas mixture includes 20 to 80% of $H_2$, 10 to 70% of $N_2$, about 5% of $CO_2$, and about 5% of $CH_4$. Each % is defined based on the total volume of the $H_2$-containing gas mixture. In some more preferred embodiments, the $H_2$-containing gas mixture further includes up to 5% of hydrogen sulfide ($H_2S$), based on the total volume of the $H_2$-containing gas mixture. In some most preferred embodiments, the $H_2$-containing gas mixture further includes up to 5% of moisture ($H_2O$), based on the total volume of the $H_2$-containing gas mixture. In some embodiments, the liquid-phase mixture and the solid matrix are present in the subsurface formation before injecting the $H_2$-containing gas mixture. In some further embodiments, the liquid-phase mixture May contain a water-soluble mineral having a concentration of 2 to 5 wt. % of mineral based on the total weight of the liquid-phase mixture.

In some embodiments, the first fluid stream contains the $H_2$-containing gas mixture and a NaCl solution. The $H_2$-containing gas mixture includes hydrogen ($H_2$), methane ($CH_4$), carbon dioxide ($CO_2$), and nitrogen ($N_2$). In some embodiments, the $H_2$-containing gas mixture present in the first fluid stream includes 10 to 90% of $H_2$, 5 to 80% of $N_2$, 1 to 10% of $CO_2$, and 1 to 10% of $CH_4$ based on a total volume of the first fluid stream. In some preferred embodiments, the $H_2$-containing gas mixture present in the first fluid stream includes 20 to 80% of $H_2$, 10 to 70% of $N_2$, about 5% of $CO_2$, and about 5% of $CH_4$. Each % is defined based on the total volume of the first fluid stream. In some more preferred embodiments, the $H_2$-containing gas mixture further includes up to 5% of hydrogen sulfide ($H_2S$), based on the total volume of the first fluid stream. In some most preferred embodiments, the $H_2$-containing gas mixture further includes up to 5% of moisture ($H_2O$), based on the total volume of the first fluid stream. In some embodiments, the NaCl solution has a concentration of 0.5 to 10 wt. % by weight of the NaCl solution, preferably 1 to 8 wt. %, or even more preferably 2 to 5 wt. % by weight of the NaCl solution. In some embodiments, the NaCl solution is present in the first fluid stream at a concentration of no more than 10%, preferably no more than 5%, preferably no more than 3%, or even more preferably no more than 1% based on the total volume of the first fluid stream. Other ranges are also possible. In some embodiments, the density of the $H_2$-containing gas mixture is no more than 1% of the density of the NaCl solution, preferably no more than 0.5%, or even more preferably no more than 0.1% based on the density of the NaCl solution.

At step 104, the method 100 includes injecting a $H_2$-containing gas stream into the subsurface formation via the at least one injection well to form a gas mixture containing $H_2$ gas. In some embodiments, the $H_2$-containing gas stream includes at least 50% of $H_2$ based on a total volume of the $H_2$-containing gas stream, preferably at least 70%, preferably at least 90%, or even more preferably at least 99% of $H_2$ based on the total volume of the $H_2$-containing gas stream. In some further embodiments, the gas mixture includes 10 to 90% of $H_2$, 5 to 80% of $N_2$, 1 to 10% of $CO_2$, and 1 to 10% of $CH_4$ based on a total volume of the gas mixture. In some preferred embodiments, the gas mixture includes 20 to 80% of $H_2$, 10 to 70% of $N_2$, about 5% of $CO_2$, and about 5% of $CH_4$ based on the total volume of the gas mixture. In some more preferred embodiments, the gas mixture further includes up to 5% of hydrogen sulfide ($H_2S$), based on the total volume of the gas mixture. In some most preferred embodiments, the gas mixture further includes up to 5% of moisture ($H_2O$), based on the total volume of the gas mixture. Other ranges are also possible. In some embodiments, the gas mixture is at least 80% of a total volume of the subsurface formation, preferably at least 85%, preferably at least 90%, preferably at least 95%, or even more preferably at least 99% based on the total volume of the subsurface formation. As used herein, the "volume of subsurface formation" generally refers to the underground reservoirs or geological formations that can be used to store the gas mixture. These formations can include depleted oil and gas reservoirs, aquifers, salt caverns, and other rock formations that are suitable for long-term storage of the gas mixture. The "volume of subsurface formation" may be determined by the size, shape, and properties of the formation, as well as the geologic and hydrologic conditions of the surrounding area.

At step 106, the method 100 includes heating and pressurizing the subsurface formation containing the gas mixture via the at least one heat well, thereby achieving a storage condition and maintaining the storage condition to store the $H_2$ in the subsurface formation. The storage condition has a temperature in a range of 20 to 80 degree Celsius (° C.), preferably 30 to 70° C., preferably 40 to 60° C., or even more preferably about 50° C. in the subsurface formation. In some embodiments, the storage condition has a pressure of 300 to 5000 psi, preferably 1000 to 4500 psi, preferably 1500 to 4000 psi, preferably 2000 to 3500, or even more preferably 2500 to 3000 in the subsurface formation. Other ranges are also possible.

As used herein, the term "cushion gas" generally refers to a gas that is injected into an underground reservoir to maintain pressure and help extract oil or gas from the reservoir.

$N_2$ as a cushion gas (in the presence of $CH_4$ and $CO_2$) for $H_2$ storage at various pressures (500 up to 4000 psi), temperatures (30 up to 70° C.), and salinities (2 up to 20 wt. %) using drop shape analyzer (DSA 100) equipment is performed. Contact angle (CA) and surface tension (ST) experiments were extensively conducted for the different gas mixtures ($H_2$—$N_2$—$CH_4$—$CO_2$) to establish relevant data for $H_2$ storage in the depleted gas reservoirs. The gas mixture compositions exhibit comparable wettability behavior as the contact angles ranged between 15° to 46° irrespective of the reservoir pressure, temperature, and salinity. The temperature was observed to have impact on the water contact angles as it decreases with increasing temperature. The surface tension for the respective gas-mixture/brine systems linearly decreased with increasing pressure and salinity.

Referring to FIGS. 4A-E, in some embodiments, when the reservoir has a salinity of 2 to 20% based on the total weight of the salt solution, the gas/liquid-phase mixture has a water contact angle (CA) with the solid matrix in a range of 15 to 50 degrees (°), preferably 20 to 45°, or even more preferably 25 to 30° under a pressure of 500 to 4000 pound-force per square inch (psi). Other ranges are also possible.

Referring to FIGS. 5A-E, in some embodiments, when the reservoir has a salinity of 2 to 20% based on the total weight of the salt solution, the gas/liquid-phase mixture has a surface tension (ST) in a range of 50 to 90 dynes per centimeter (dynes/cm), preferably 50 to 70 dynes/cm, or even more preferably about 60 dynes/cm, under a pressure of 500 to 4000 psi, as determined by ASTM D1331-14, which is incorporated herein by reference in its entirety.

Figure 6:
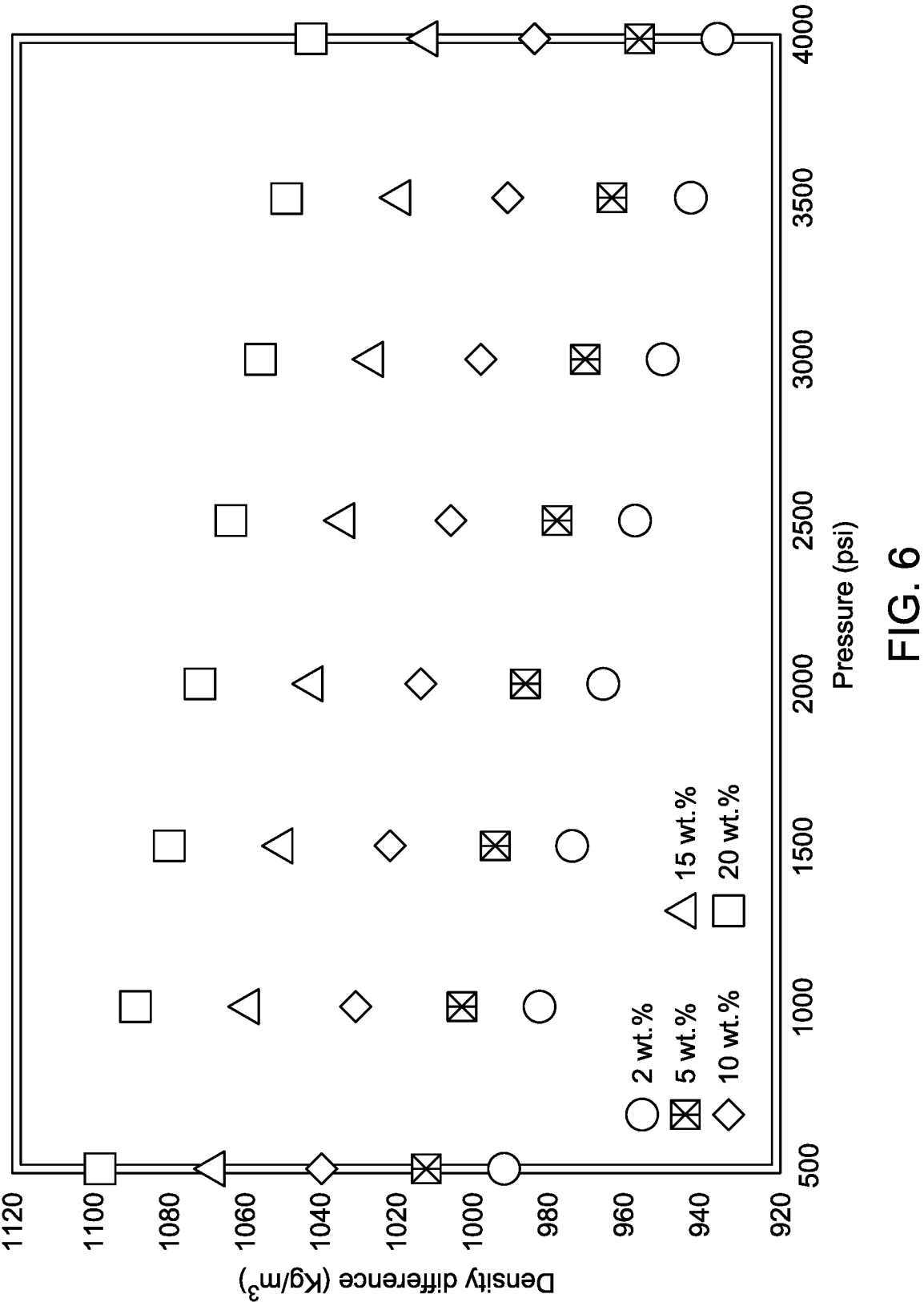
FIG. 6 is a schematic plot depicting an effect of density difference with increasing pressure on salinity at constant temperature (50° C.), according to certain embodiments.

Referring to FIG. 6, in some embodiments, the gas/liquid-phase mixture has the water contact angle with the solid matrix in a range of 15 to 50° under a temperature in a range of 30 to 70° C. Further, the gas/liquid-phase mixture has the surface tension in a range of 50 to 90 dynes/cm under a temperature in a range of 30 to 70° C., as determined by ASTM D1331-14, which is incorporated herein by reference in its entirety.

According to the present disclosure, the first fluid stream is injected in an amount effective to increase $H_2$ storage capacity of the subsurface formation. As such, the gas mixture under the storage condition includes about 60% of $H_2$, about 30% of $N_2$, about 5% of $CO_2$, and about 5% of $CH_4$, in which each % is based on the total volume of the gas mixture. The liquid-phase mixture includes 2 to 5 wt. % of NaCl based on the total weight of the liquid-phase mixture and the storage condition has a temperature in a range of 30 to 40° C.

In some embodiments, the method 100 further includes withdrawing the gas mixture under the storage condition from the subsurface formation via the production well and introducing the gas mixture into a hydrogen purification device including one or more hydrogen-selective membranes. Hydrogen purification device is configured to separate hydrogen from the gas mixture. In an example, the hydrogen purification device may be a palladium membrane hydrogen purifier. The palladium membrane may include metallic tubes of palladium and silver alloy for allowing only monatomic hydrogen to pass through its crystal lattice when it is heated above 300° C. The hydrogen-selective membranes are permeable to hydrogen gas but are at least substantially impermeable to other components in the gas mixture. In some embodiments, the plurality of hydrogen-selective membranes in the hydrogen purification device is arranged in parallel, and each membrane of the plurality of hydrogen-selective membranes is placed in a plane perpendicular to a direction of the gas mixture flow in the hydrogen purification device. The method 100 further includes passing the gas mixture through the plurality of hydrogen-selective membranes in the hydrogen purification device thereby allowing hydrogen gas to pass through the hydrogen-selective membrane and rejecting other components in the gas mixture to form a residue composition. The method 100 further includes collecting the hydrogen gas after passing and recycling the residue composition.

EXAMPLES

The following examples demonstrate a method of storing hydrogen ($H_2$) gas in a subsurface formation as described herein. The examples are provided solely for illustration and are not to be construed as limitations of the present disclosure, as many variations thereof are possible without departing from the spirit and scope of the present disclosure.

Example 1: Materials

The specification and sources of the chemicals used in the present disclosure are shown in Table 1. The high-purity gases and sodium chloride (NaCl) powder were supplied by Air Liquide gas company, and Sigma Aldrich, respectively. Lab-based deionized water (electrical conductivity <0.02 $\mu$S·cm$^{-1}$ at T=25° C.) was used for the aqueous brine preparation. The pristine quartz substrate (cut from a long-sized core plug) was used as a proxy for sandstone formation [See: *Brenchley, P. J. Sandstone depositional environments edited by P. A. Scholle and D. Spearing, American Association of Petroleum Geologists, 1982. Geol. J. 1986, 21, 88-89, which is incorporated herein by reference in its entirety*]. This was used to reduce the effect of spreading and diffusion of the brine droplet on the porous hydrophilic substrates observed in sessile drop for 10 contact angle measurements. The experimental condition for the different gas fractions and concentrations are shown in Table 2.

TABLE 1

Specifications and sources of the materials used in the present disclosure.

| Chemical name | State | Mass fraction purity | Supplier |
|---|---|---|---|
| Pristine Quartz | Solid | ≥0.9899 | Ward's Natural Science, USA |
| H$_2$ | Gas | ≥0.9999 | Air Liquide, Saudi Arabia |
| CO$_2$ | Gas | ≥0.9999 | Air Liquide, Saudi Arabia |
| CH$_4$ | Gas | ≥0.9999 | Air Liquide, Saudi Arabia |
| N$_2$ | Gas | ≥0.9999 | Air Liquide, Saudi Arabia |
| NaCl | Powder | ≥0.9999 | Signal Aldrich |
| De-ionized water | Liquid | Electrical conductivity = 0.02 $\mu$S · cm$^{-1}$ at T = 25° C. | Laboratory-based David Gray's Deionized water |

TABLE 2

Experimental conditions and gas fractions used in the present disclosure.

| Test Cases | Gas phase mixtures (%) | | | | Salinity (wt. %) | Temperature (° C.) | Pressure (psi) |
|---|---|---|---|---|---|---|---|
| | H$_2$ | N$_2$ | CH$_4$ | CO$_2$ | | | |
| Case 1 | 80 | 10 | 5 | 5 | 2, 5, 10, 15, 20 | 30, 40, 50, 60, 70 | 500-4000 |
| Case 2 | 70 | 20 | 5 | 5 | 2, 5, 10, 15, 20 | 30, 40, 50, 60, 70 | 500-4000 |
| Case 3 | 60 | 30 | 5 | 5 | 2, 5, 10, 15, 20 | 30, 40, 50, 60, 70 | 500-4000 |
| Case 4 | 50 | 40 | 5 | 5 | 2, 5, 10, 15, 20 | 30, 40, 50, 60, 70 | 500-4000 |
| Case 5 | 40 | 50 | 5 | 5 | 2, 5, 10, 15, 20 | 30, 40, 50, 60, 70 | 500-4000 |
| Case 6 | 30 | 60 | 5 | 5 | 2, 5, 10, 15, 20 | 30, 40, 50, 60, 70 | 500-4000 |
| Case 7 | 20 | 70 | 5 | 5 | 2, 5, 10, 15, 20 | 30, 40, 50, 60, 70 | 500-4000 |

Example 2: Sample and Equipment

Substrate contamination [See: *Morrow, N. R. Effects of Surface Roughness on Contact Angle With Special Reference*

*To Petroleum Recovery. J. Can. Pet. Technol. 1975, 14, 42-53; Gharabaghi, M.; Aghazadeh, S. A review of the role of wetting and spreading phenomena on the flotation practice. Curr. Opin. Colloid Interface Sci. 2014, 19, 266-282; and Chau, T. T.; Bruckard, W. J.; Koh, P. T. L.; Nguyen, A. V. A review of factors that affect contact angle and implications for flotation practice. Adv. Colloid Interface Sci. 2009, 150, 106-115, each of which is incorporated herein by reference in their entirety*] and equipment setup (to avoid uncontrolled gas leakage) are the two major sources of error during contact angle (CA) and interfacial tension (IFT) measurements using a drop-shape analyzer (DSA 100). After cutting the quartz substrates into a dimension suitable for the DSA 100 (i.e., length=2 cm, breadth=2 cm, and height=0.3 cm), 320 grit sandpaper type was used to smoothen the surface before cleaning; and thereafter, soaked in Deionized (DI) water. This was done to ensure that any impurities in the initial condition (of the core plug) that could influence the experimental results were reduced to the barest minimum as small amounts of pore-lining materials and trace amounts of natural organics may influence interfacial phenomena [See: *Wang, S.; Tokunaga, T. K. Capillary Pressure-Saturation Relations for Supercritical CO$_2$ and Brine in Limestone/Dolomite Sands: Implications for Geologic Carbon Sequestration in Carbonate Reservoirs. Environ. Sci. Technol. 2015, 49, 7208-7217, which is incorporated herein by reference in its entirety*]. The sample was then left to dry in an oven at 70° C. for 5 minutes. A surface roughness analyzer (KRUSS GmbH) was used to assess the roughness, which was expressed in the root mean square (RMS) as 373 $\mu$m. As for the equipment, before sample placement in the high-pressure high-temperature (HPHT) cell chamber, the system was thoroughly cleaned with DI water. Particularly, the flowlines were rinsed with dry nitrogen before using the exact gas mixture for flushing. Similarly, the inside of the brine pump was rinsed only with DI water, before using the brine of the specific experiment to flush out any remaining DI water. Following each experiment, the gas mixture was purged from the cell chamber whilst the metering valve was closed to ensure no contamination of the pure gas-mixture flowlines and the droplet pump. The brine was then replaced with different salinity and the cleaning procedure was repeated.

Example 3: Contact Angle Measurements

The contact angle of quartz/brine/gas-mixture (H$_2$—N$_2$—CH$_4$—CO$_2$) was measured through DSA 100, a product of Eurotechnica GmbH (Germany). The instrument can measure up to 10,000 psi and 200° C. The pictorial setup of the Krüss drop shape analyzer (DSA 100) equipment is shown in FIG. 2. Initially, the pristine quartz substrate was mounted inside the HPHT cell using a bespoke fitting holder which provided a horizontal surface. Thereafter, the HPHT chamber was closed using the sapphire windows, which allows easy visualization of the experimental condition. Afterward, the HPHT cell chamber temperature was raised to 30° C. before dispensing a drop (for example 2 wt. % NaCl brine) via the capillary needle of 0.625 mm diameter on the substrates. The droplet size approximately ranged between (17 to 23 $\mu$L). Then, the gas mixture was injected at 500 psi (using the ISCO syringe pump from the gas-mixture cell) into the chamber to compress the droplet. Allowed dynamic equilibrium as no considerable change was observed, before measuring the static contact angles. Thus, the droplet was thermodynamically stable since the effect of dissolution and spreading was minimized. Images were captured using a high-resolution charged-coupled device (CCD) camera connected to the sapphire window and the static contact angles were automatically measured in a repeating order for 5 minutes. This procedure was followed by systematically increasing the pressure of the gas mixture at a specific temperature, using the same droplet. This method models the realistic underground hydrogen storage (UHS) condition in a gas reservoir environment where the injected gas displaces the existing fluids (formation brine and native gas) in the storage medium (reservoir rock) before lateral spread.

Example 4: Surface Tension Measurements

Figure 3:
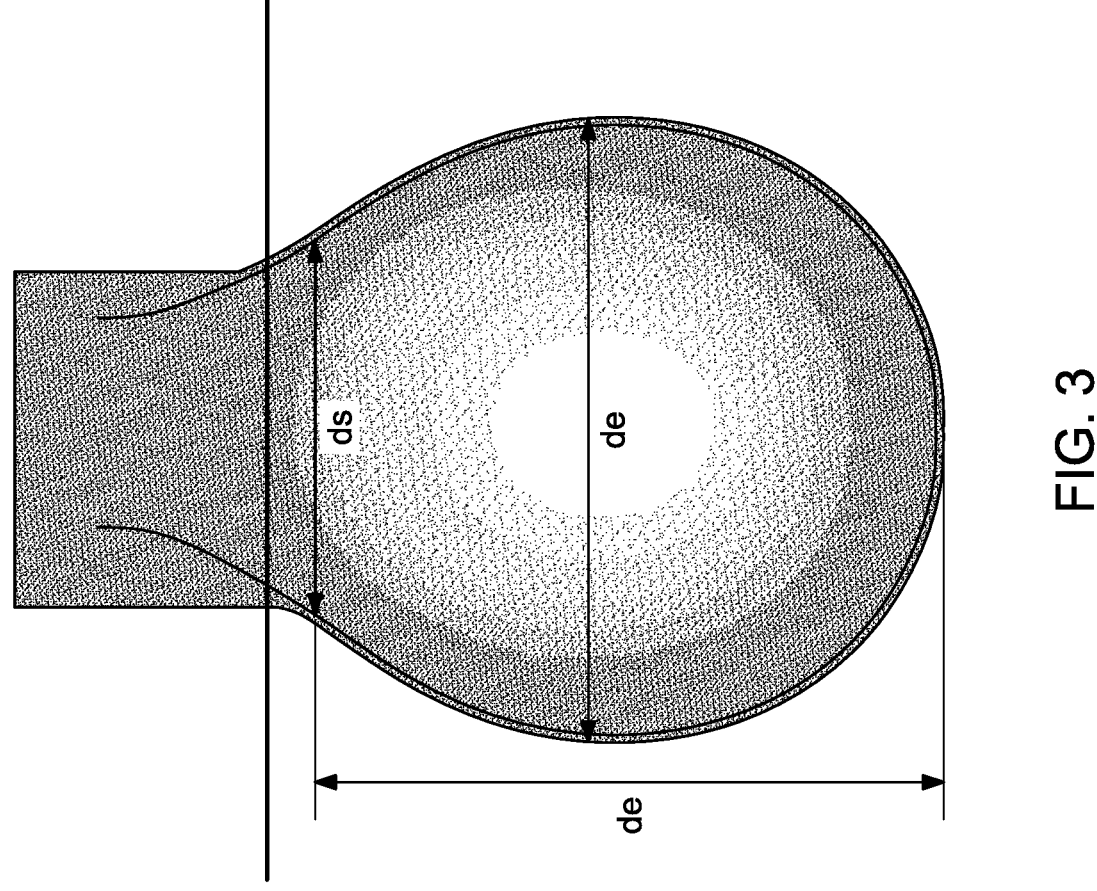
FIG. 3 is a pictorial depiction of a heavy (brine) phase pendant drop suspended in a surrounding light (gas mixture) phase showing different diameters thereof, according to certain embodiments.

The pendant drop method was used afterward to measure the brine/gas-mixture ($H_2$—$N_2$—$CH_4$—$CO_2$) surface tensions using DSA 100. After increasing the temperature of the cell to the test temperature (30° C. for the first experiment), a pendant (between 14 to 18 µL) was made at the capillary needle tip of similar diameter before allowing for stabilization. Afterward, the same ISCO pump was used to pressurize the cell chamber with the required gas mixture. Allowed the surrounding (gas-mixture) phase to effectively diffuse into the heavy (brine) phase, to attain dynamic equilibrium. This dynamic phase continues to reduce with time until full saturation. In the end, the equilibrium surface tension was measured when no change in the surface tension values was noticed at each measuring pressure point. Images were saved automatically and processed with the advanced Krüss software using the Young-Laplace equation fitting method [See: *Zhang, C.; Wang, M. Journal of Petroleum Science and Engineering CO₂/brine interfacial tension for geological CO₂ storage: A systematic review. J. Pet. Sci. Eng.* 2023, 220, 111154, which is incorporated herein by reference in its entirety]. The surface/interfacial tension is dependent on the drop geometry and the density difference between the drop and the surrounding liquid/gas phase and is related by Eq. (2).

$$\gamma = \frac{\Delta \rho g (d_e)^2}{H} \qquad \text{Eq. (2)}$$

Where $\Delta \rho$ is the change in density between the heavy (brine) and light (gas-mixture) phases, g is the gravitational constant, $d_e$ is the equatorial diameter of the droplet, $d_s$ is the diameter at the neck of the bubble at a distance $d_e$, while the H term is a shape-dependent correctional factor, which is a function of $d_s/d_e$ based on the empirical equation, Eq. (3). Where $B_i$ (i=0,1,2,3, and 4) and A represent the empirical constants for a particular range of shape factors [See: *Drelich, J. Measurement of Interfacial Tension in Fluid-Fluid Systems. Encycl. Surf. Colloid Sci.* 2002, 3152-3166, which is incorporated herein by reference in its entirety]. A schematic of a pendant drop showing different diameters thereof is shown in FIG. 3.

$$\frac{1}{H} = \frac{B_4}{S^A} + B_3 S^3 - B_2 S^2 + B_1 S - B_0 \qquad \text{Eq. (3)}$$

As a limitation, the gas mixture density was obtained from the study as the DSA 100 equipment only considers the density of the surrounding phase as a single gas. Thus, Eq. (4) was used to compute the different gas mixture densities.

The v in Eq. (4) denotes the individual gas volume in m³ and subscripts 1, 2, 3, and 4 correspond to $H_2$, $N_2$, $CH_4$, and $CO_2$ gases, respectively.

$$\rho_{mix} = \frac{(\rho_1 V_1 + \rho_2 V_2 + \rho_3 V_3 + \rho_4 V_4)}{(V_1 + V_2 + V_3 + V_4)} \qquad \text{Eq. (4)}$$

The surface tension obtained from Eq. (2) was therefore corrected by multiplying the experimental values by the erroneous density difference and dividing the result by 1000 kg/m³ (density of water) via Eq. (5).

$$\gamma_{corr} = \frac{(\rho_{brine} - \rho_{mix}) \times \gamma_{program}}{1000} \qquad \text{Eq. (5)}$$

Where $\rho_{brine}$ and $\rho_{mix}$ in (kg/m³) denotes the brine and gas mixture densities, $\gamma_{program}$ and $\gamma_{corr}$ in (mN/m) represent the program and corrected surface tensions.

Example 5: Contact Angle Observation

FIGS. 4A-4E show the effect of pressure, temperature, and salinity on the measured contact angles for a variety of reservoir conditions. While studies have shown that pressure has a profound influence on the $H_2$ wettability of storage and caprock due to its intermolecular interactions between the rock substrate's surface and gas molecules [*See: Ali, M.; Jha, N. K.; Al-Yaseri, A.; Zhang, Y.; Iglauer, S.; Sarmadivaleh, M. Hydrogen wettability of quartz substrates exposed to organic acids; Implications for hydrogen geo-storage in sandstone reservoirs. J. Pet. Sci. Eng.* 2021, 207, 109081; *Al-Yaseri, A.; Wolff-Boenisch, D.; Fauziah, C. A.; Iglauer, S. Hydrogen wettability of clays: Implications for underground hydrogen storage. Int. J. Hydrogen Energy* 2021, 46, 34356-34361, *each of which is incorporated herein by reference in their entirety*], the result of the present disclosure indicates no significant effect. For instance, FIGS. 4A-4E reveal that in Test case 1 (80% $H_2$—10% $N_2$—5% $CH_4$—5% $CO_2$), when the brine salinity was 2 wt. % at 30° C. (FIG. 4A) the contact angle slightly decreased from 23.36° at 500 psi to 23.32° at 4000 psi, whereas at 70° C., the contact angle hugely decreased from 26.18° at 500 psi to 22.41° at 4000 psi, respectively. Despite this difference in reported values, the decrease was found to be within the error limit of the experiment. A close look at the other temperatures of 40, 50, and 60° C. indicates a similar trend of contact angles with pressure. Although, some cases showed both decreasing and increasing contact angles with pressure like the case of 40° C. This suggest that contact angle behavior in a quartz/brine/gas mixture system is insignificant with pressure.

Figure 4A:
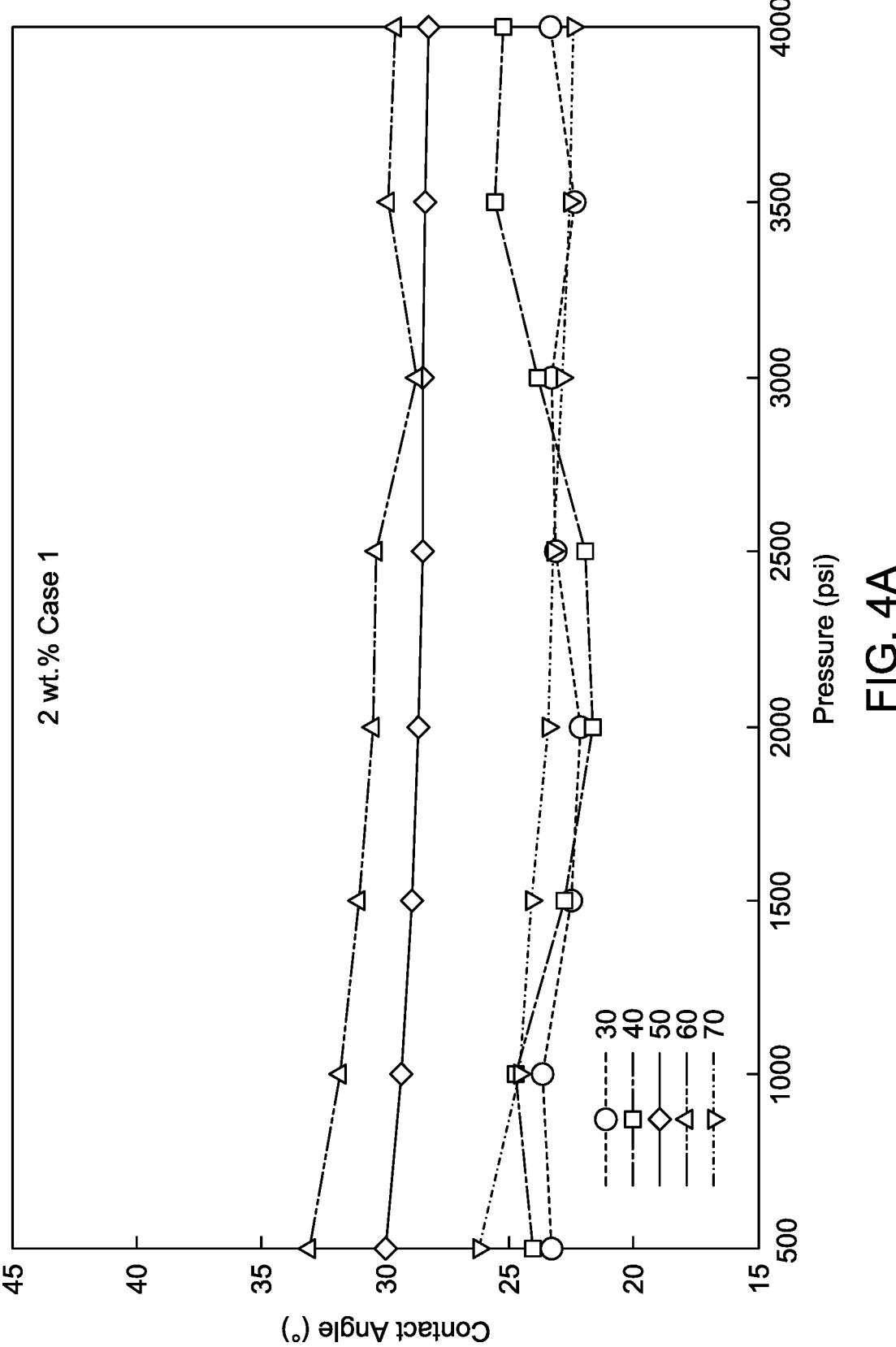
FIG. 4A is a schematic plot depicting an effect of pressure (500 to 4000 psi) on measured contact angle (CA) for various temperatures (30 to 70° C.) at 2 wt. % NaCl brine salinities for a test case 1 representing 80% $H_2$—10% $N_2$—5% $CH_4$—5% $CO_2$, according to certain embodiments.
Figure 4B:
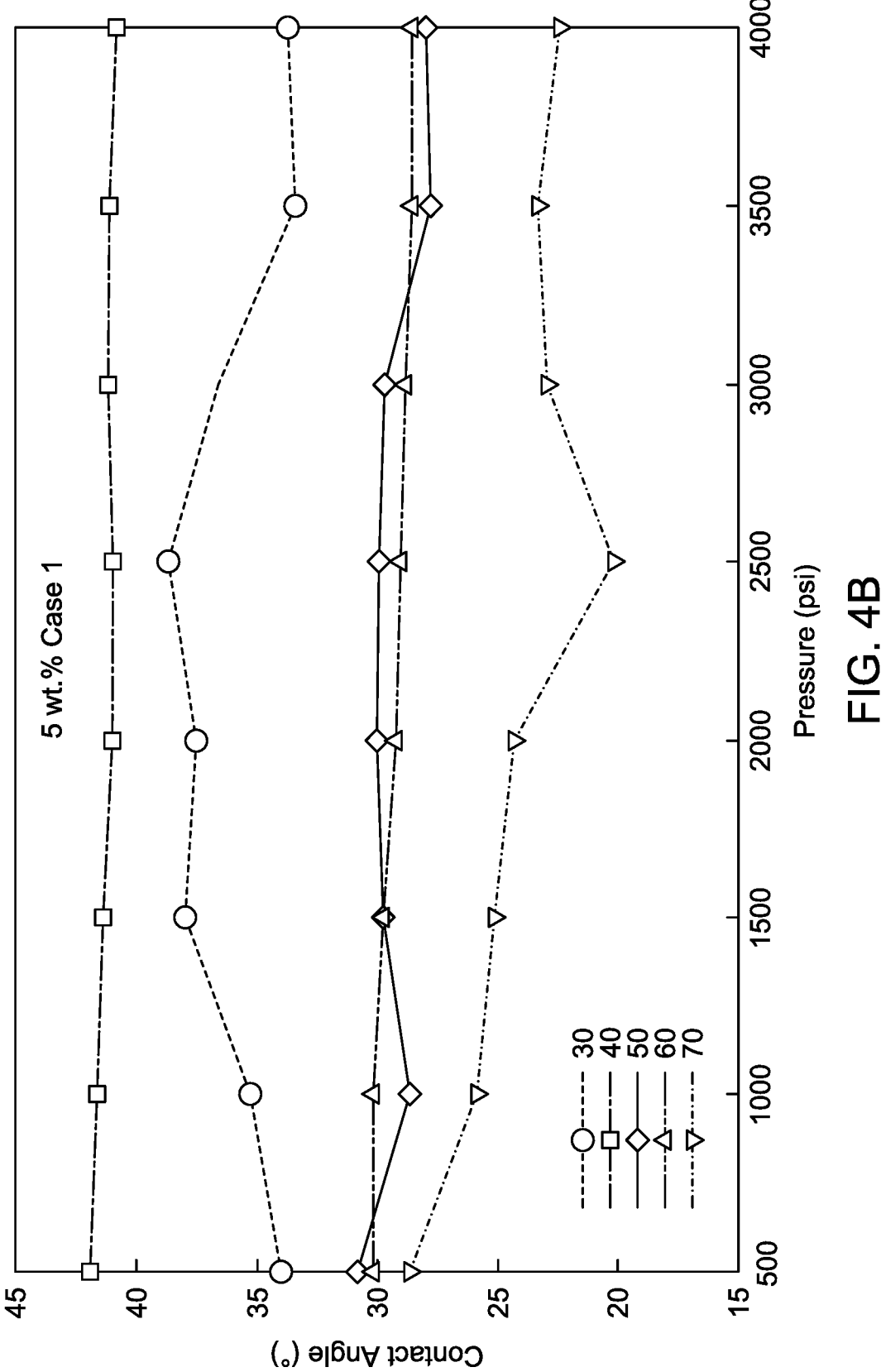
FIG. 4B is a schematic plot depicting an effect of pressure (500 to 4000 psi) on measured CA for various temperatures (30 to 70° C.) at 5 wt. % NaCl brine salinities for the test case 1, according to certain embodiments.
Figure 4C:
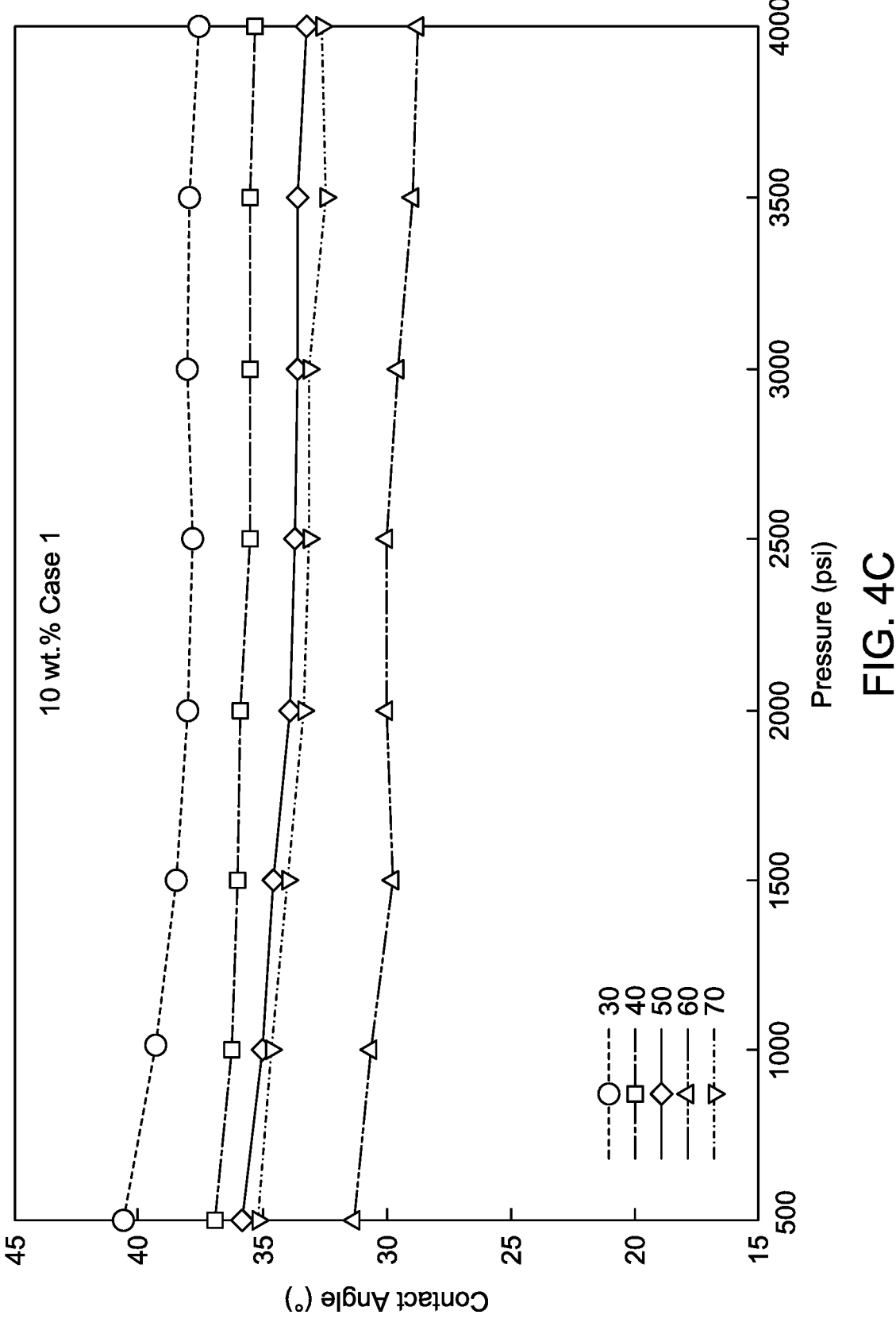
FIG. 4C is a schematic plot depicting an effect of pressure (500 to 4000 psi) on measured CA for various temperatures (30 to 70° C.) at 10 wt. % NaCl brine salinities for the test case 1, according to certain embodiments.
Figure 4D:
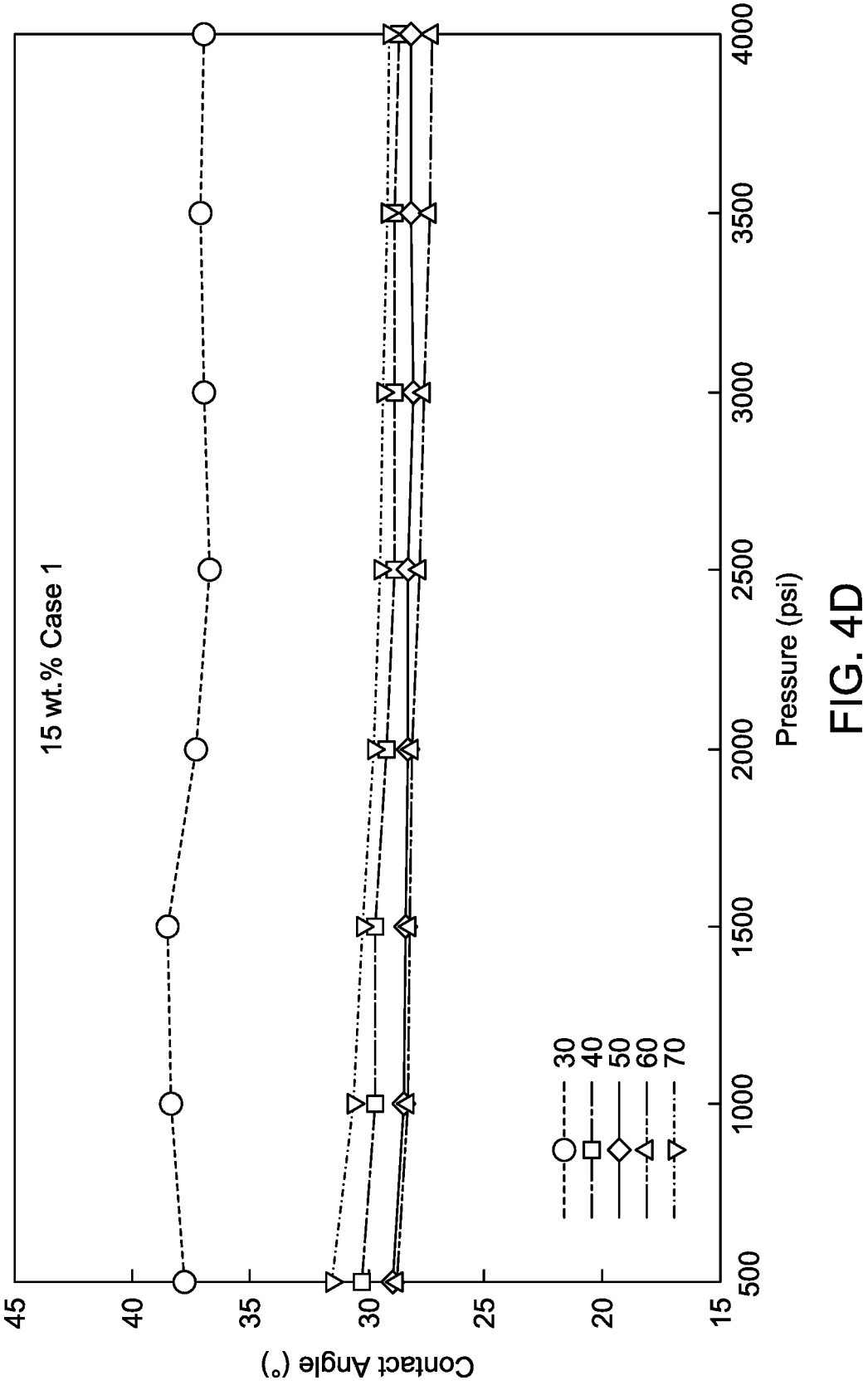
FIG. 4D is a schematic plot depicting an effect of pressure (500 to 4000 psi) on measured CA for various temperatures (30 to 70° C.) at 15 wt. % NaCl brine salinities for the test case 1, according to certain embodiments.

FIG. 4C shows a sequential behavior of the measured contact angles with pressure, as it decreases with increasing pressure. In addition, it showed that the contact angle can also decrease with increasing temperature (i.e., at 30, 40, 50, 60, and 70° C.). Yet, this behavior cannot be generalized as the decrease to be inconsistent with increasing. For instance, FIG. 4C shows that contact angles at 70° C. were much higher than contact angles at 60° C. This implies that for any rock sample whose condition is not altered by the aging solution, contact angle observations will be inconsistent and will be independent on pressure and temperature over the range of investigations.

Figure 4E:
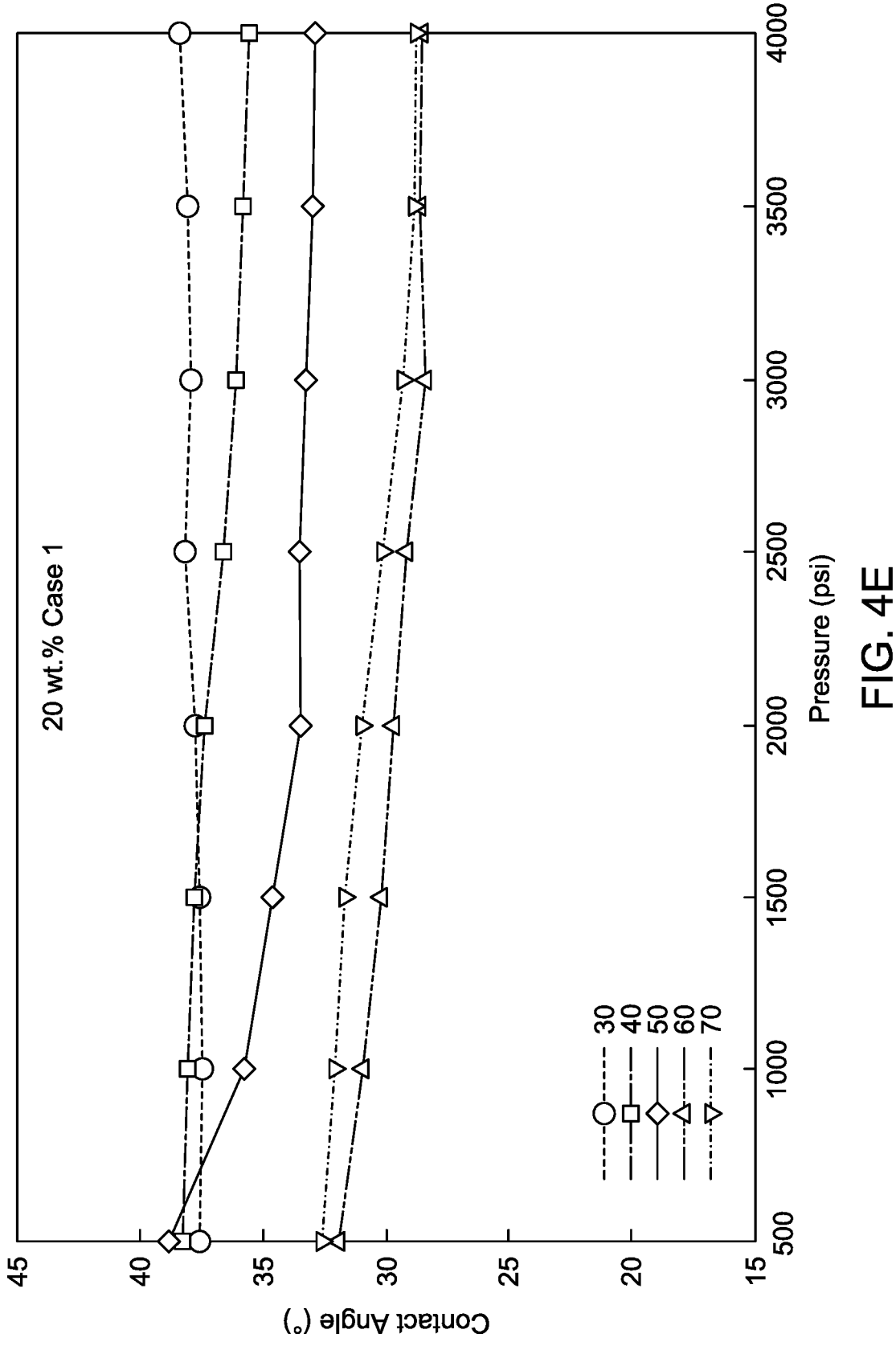
FIG. 4E is a schematic plot depicting an effect of pressure (500 to 4000 psi) on measured CA for various temperatures (30 to 70° C.) at 20 wt. % NaCl brine salinities for the test case 1, according to certain embodiments.

Furthermore, the increasing salinity played little or no significant role in the measured contact angles. This can be seen as the contact angle range reported at 2 wt. % NaCl brine was similar to those observed when the salinity increased to 5, 10, 15, and 20 wt. %. For instance, FIG. 4A observed the contact angle values (at 50° C.) of 29.99° at 500 psi to 28.31° at 4000 psi while FIG. 4E showed contact angle values (at 50° C.) of 38.9° (at 500 psi) to 32.96° (at 4000 psi) which is also within the experimental error of 9° standard deviation. Therefore, for a sessile drop experiment where the pendant is made on the rock substrate before saturating the cell chamber, quartz/brine/gas mixture systems will exhibit similar wettability status. A similar deduction was noted in all the different gas mixtures for Test cases 2, 3, 4, 5, 6, and 7 respectively even with the increase in $N_2$ fraction (at constant $CH_4$ and $CO_2$).

The observation concerning pressure, temperature, and salinity reported in this work, when using $N_2$ as a cushion gas in a different $H_2$—$N_2$ gas fraction (at a constant $CH_4$ and $CO_2$) have been reported in the literature for $CH_4$ cushion gas. For instance, Hashemi et al.'s [*See: Hashemi, L.; Boon, M.; Glerum, W.; Farajzadeh, R.; Hajibeygi, H. A comparative study for $H_2$ $CH_4$ mixture wettability in sandstone porous rocks relevant to underground hydrogen storage. Adv. Water Resour. 2022, 163, which is incorporated herein by reference in its entirety*] static contact angle results on $H_2$, $CH_4$, and $H_2$—$CH_4$/brine/rock systems found no effects on pressure, temperature, and salinity and the values ranged between 25 to 45°. Mirchi et al. [*See: Mirchi, V.; Dejam, M.; Alvarado, V. Interfacial tension and contact angle measurements for hydrogen-methane mixtures/brine/oil-wet rocks at reservoir conditions. Int. J. Hydrogen Energy 2022, 47, 34963-34975, which is incorporated herein by reference in its entirety*] similarly showed no changes in rock surface wettability and temperature (at constant pressure) with weakly water-wet (52.42 to) 71.1° contact angles. Though, their result was quite higher than those reported by Hashemi et al. and the present disclosure. This could be attributed to the fact that the rock sample was aged in crude oil to depict depleted oil and gas conditions. Higgs et al. [*See: Higgs, S.; Da Wang, Y.; Sun, C.; Ennis-King, J.; Jackson, S. J.; Armstrong, R. T.; Mostaghimi, P. In-situ hydrogen wettability characterisation for underground hydrogen storage. Int. J. Hydrogen Energy 2022, 47, 13062-13075, which is incorporated herein by reference in its entirety*] found a similar range of results for in-situ wettability characterization with an effective static contact angle between 29 and 39° for Bentheimer/$H_2$ systems. In their work, they observed no clear sequence with the reported contact angle at low pressure whereas the contact angle both increased and decrease with increasing pressure (irrespective of salinity).

Furthermore, pore-scale visualization studies observed similar wetting characteristics irrespective of the gas injected. For example, van Rooijen et al.'s [*See: van Rooijen, W.; Hashemi, L.; Boon, M.; Farajzadeh, R.; Hajibeygi, H. Microfluidics-based analysis of dynamic contact angles relevant for underground hydrogen storage. Adv. Water Resour. 2022, 164, 104221, which is incorporated herein by reference in its entirety*] drainage and imbibition results for different channel widths (50 to 130 μm) ranged between 13 to 30° (advancing) and 6 to 23° (receding) for the $H_2$/water/borosilicate chip system which was comparable to the observed $N_2$/water/borosilicate and $CO_2$/water/borosilicate systems. Lysyy et al. [*See: Lysyy, M.; Ersland, G.; Fernø, M. Pore-scale dynamics for underground porous media hydrogen storage. Adv. Water Resour. 2022, 163, 104167, which is incorporated herein by reference in its entirety*] also found contact angles hysteresis (drainage and imbibition) that varied between 17 and 56° for $H_2$/brine/micro model system. Jangda et al. [*See: Jangda, Z.; Menke, H.; Busch, A.; Geiger, S.; Bultreys, T.; Lewis, H.; Singh, K. Pore-scale visualization of hydrogen storage in a sandstone at subsurface pressure and temperature conditions: Trapping, dissolution and wettability. J. Colloid Interface Sci. 2023, 629, 316-325, which is incorporated herein by reference in its entirety*] reported an average contact angle of 54° after the first imbibition with $H_2$-equilibrated brine and 53° after the second imbibition with non-$H_2$-equilibrated brine for the studied $H_2$/brine/Bentheimer system. Higgs et al. [*See: Higgs, S.; Da Wang, Y.; Sun, C.; Ennis-King, J.; Jackson, S. J.; Armstrong, R. T.; Mostaghimi, P. In-situ hydrogen wettability characterisation for underground hydrogen storage. Int. J. Hydrogen Energy 2022, 47, 13062-13075, which is incorporated herein by reference in its entirety*] further observed water-wet conditions with mean contact angles of 39.77°, 36.8°, and 59.75° based on different approaches for $H_2$/brine/Bentheimer systems. Yekta et al. [*See: Yekta, A. E.; Manceau, J. C.; Gaboreau, S.; Pichavant, M.; Audigane, P. Determination of Hydrogen-Water Relative Permeability and Capillary Pressure in Sandstone: Application to Underground Hydrogen Injection in Sedimentary Formations. Transp. Porous Media 2018, 122, 333-356, which is incorporated herein by reference in its entirety*] found that after core flooding a brine-saturated Vosges sandstone rock with $H_2$ at two different pressure and temperature values (shallower: 797 psi, 20° C. and deeper: 1450 psi, 45° C.), it resulted into a strongly water-wet condition; with receding contact angles of 21.56° and 34.9°, respectively for the shallow and deep reservoir conditions. This confirms that rock wettability (without aging in an organic acids or oils) will always remain strongly wetting irrespective of the gas type, gas mixtures, pressure, temperature and salinity, but may vary within the same wettability characteristics. These conclusions are arrived at since contact angle measurements via in situ and pore-scale visualization (a more representative of the porous medium behavior) also found comparable range with those reported in this study (via sessile drop).

Studies observed that contact angle increases with increasing pressure while contact angle could increase with increasing and decreasing temperature. This difference could be due to the fact that the rock sample was aged in an organic acid of different alkyl groups (to replicate the aquifer condition) and the HPHT chamber was initially saturated with $H_2$ gas before releasing the drop. Thus, a change in wettability from strongly water wet to intermediate or $H_2$ wet was reported. Hou et al. [*See: Hou, J.; Lin, S.; Zhang, M.; Li, W. Salinity, temperature and pressure effect on hydrogen wettability of carbonate rocks. Int. J. Hydrogen Energy 2022, which is incorporated herein by reference in its entirety*] used a similar sessile drop method as the present disclosure, however, showed that contact angle decreases with increasing temperature (even after aging the carbonate/sandstone/shale samples) in stearic acid. This shows that pressure and temperature behavior with contact angle is a factor of the preparation and experimental method (in Hou et al.'s case, the HPHT chamber was saturated first before releasing the drop). Moreover, Al-Mukainah et al.'s [*See: Al-mukainah, H.; Al-yaseri, A.; Yekeen, N.; Al, J. Wettability of shale-brine-$H_2$ system and $H_2$-brine interfacial tension for assessment of the sealing capacities of shale formations during underground hydrogen storage. Energy Reports 2022, 8, 8830-8843, which is incorporated herein by reference in its entirety*] observed the contact angle to decrease with increasing pressure is likely to observe a similar effect of inconsistency, if the temperature of the experiment were to be varied (as similar experimental techniques were followed with ours).

While the effect of pressure, temperature, and salinity are different, the wettability of the substrate for a rock sample (e.g., sandstone) that is aged in brine before measurement will always remain water wet whereas such wettability conditions will only change if the substrates are aged in a medium other than brine. Overall, the test conditions for all the different gas-mixture fractions indicate a strong water-wet condition [See: Iglauer, S.; Pentland, C. H.; Busch, A. CO 2 wettability of seal and reservoir rocks and the implications for carbon geo-sequestration. Water Resour. Res. 2015, 51, 729-774, which is incorporated herein by reference in its entirety] ranging from [20.2°-41.9°] Test case 1; [25.3°-41.3°] Test case 2; [30.7°-46.2°] Test case 3; [30.5°-45.6°] Test case 4; [25.1°-42.2°] Test case 5; [16.5°-40.6°] Test case 6; and [15.8°-39.7°] Test case 7.

Example 6: Surface Tension Observations

Figure 5A:
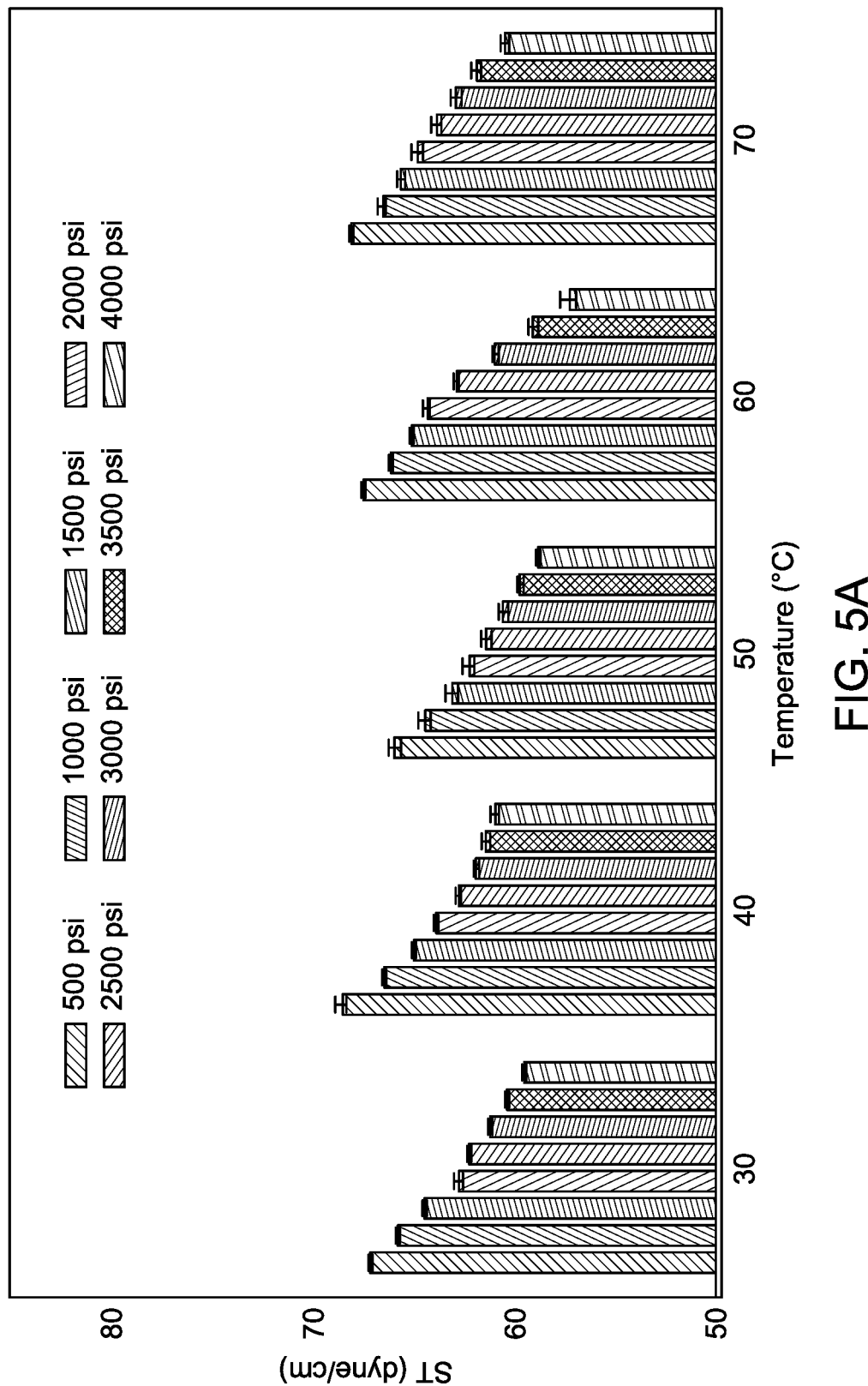
FIG. 5A is a schematic plot depicting an effect of pressure and temperature on measured surface tension (ST) with salinity increase at 2 wt. % for the test case 1, according to certain embodiments.
Figure 5B:
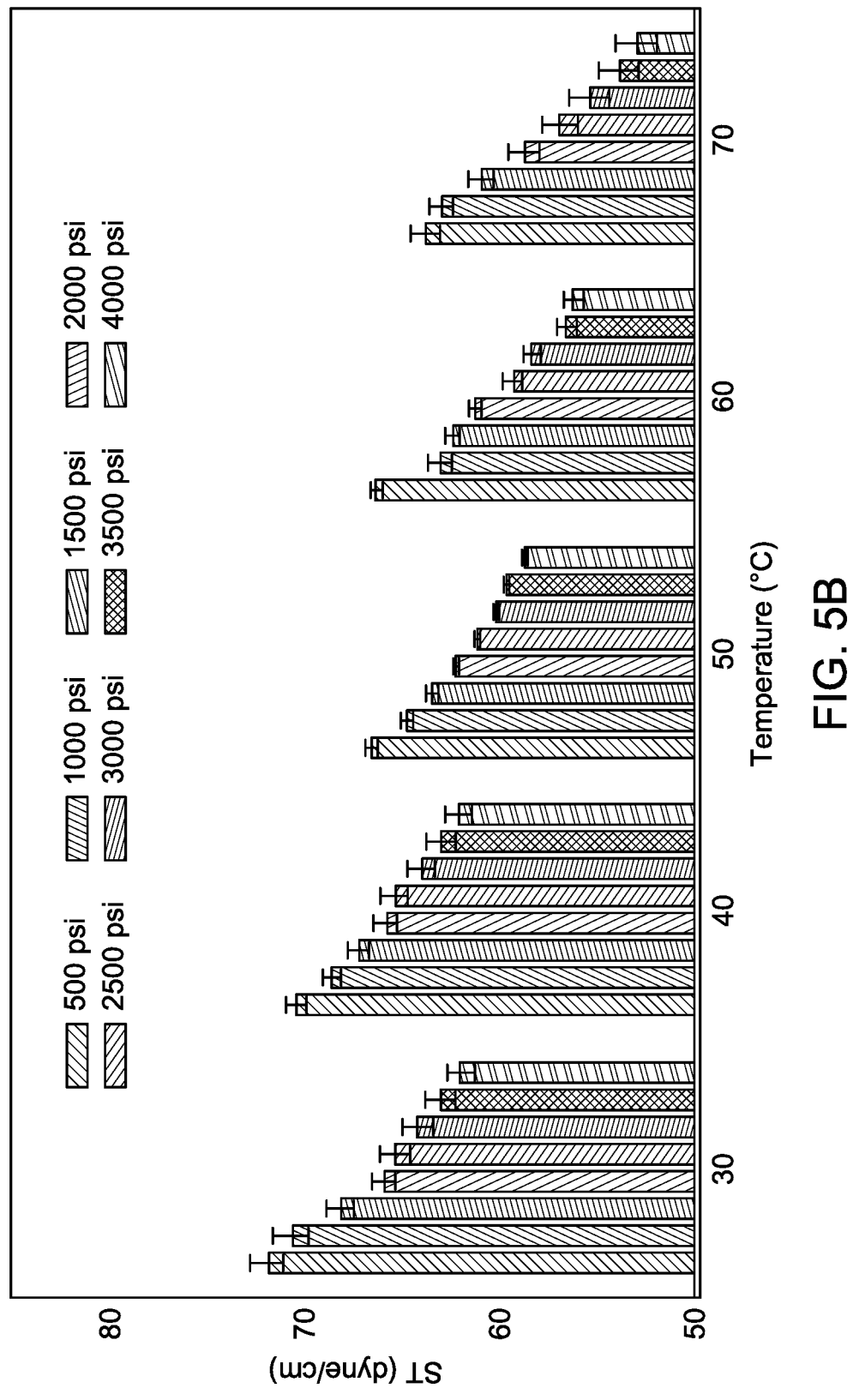
FIG. 5B is a schematic plot depicting an effect of pressure and temperature on measured ST with salinity increase at 5 wt. % for the test case 1, according to certain embodiments.
Figure 5C:
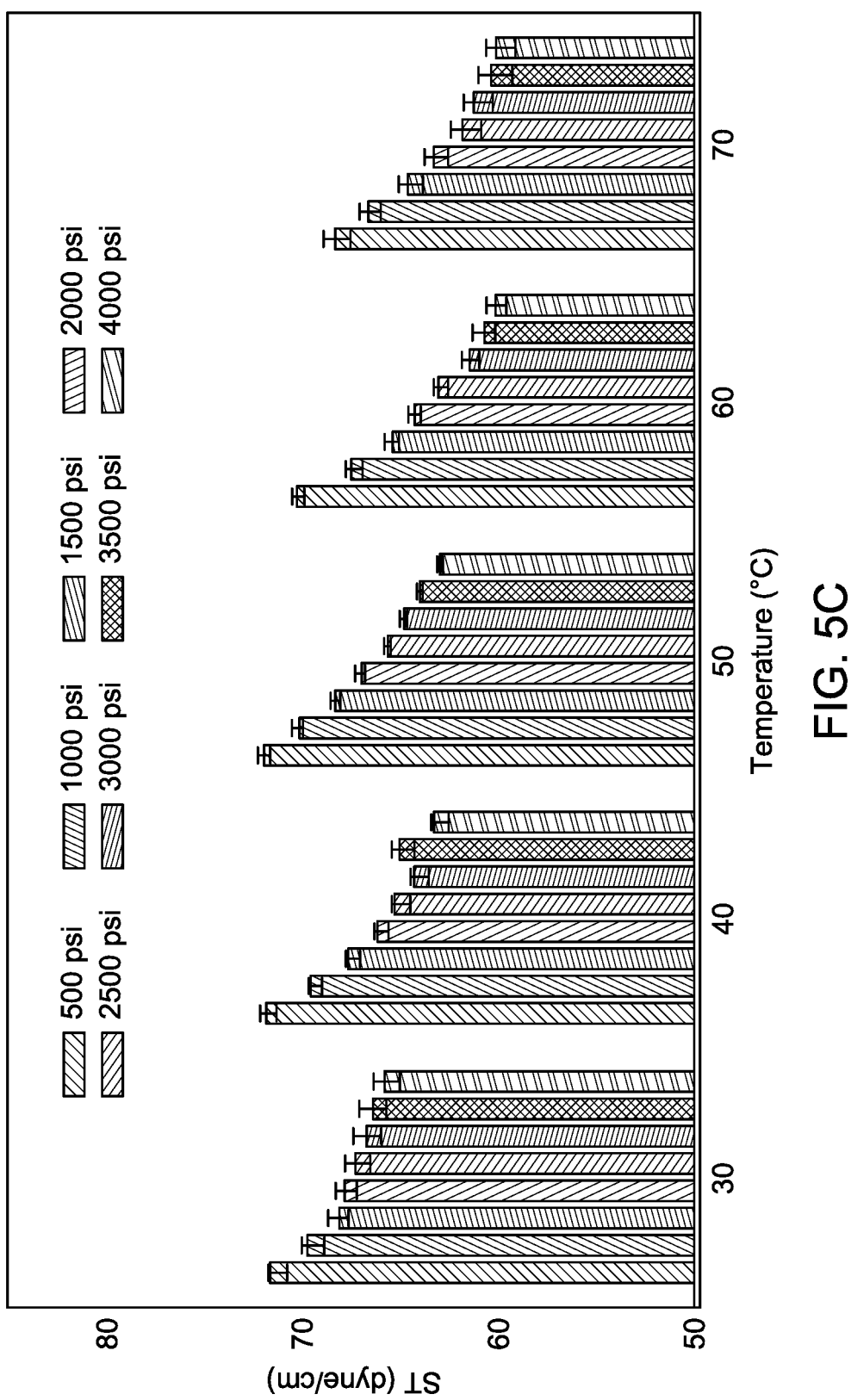
FIG. 5C is a schematic plot depicting an effect of pressure and temperature on measured ST with salinity increase at 10 wt. % for the test case 1, according to certain embodiments.
Figure 5D:
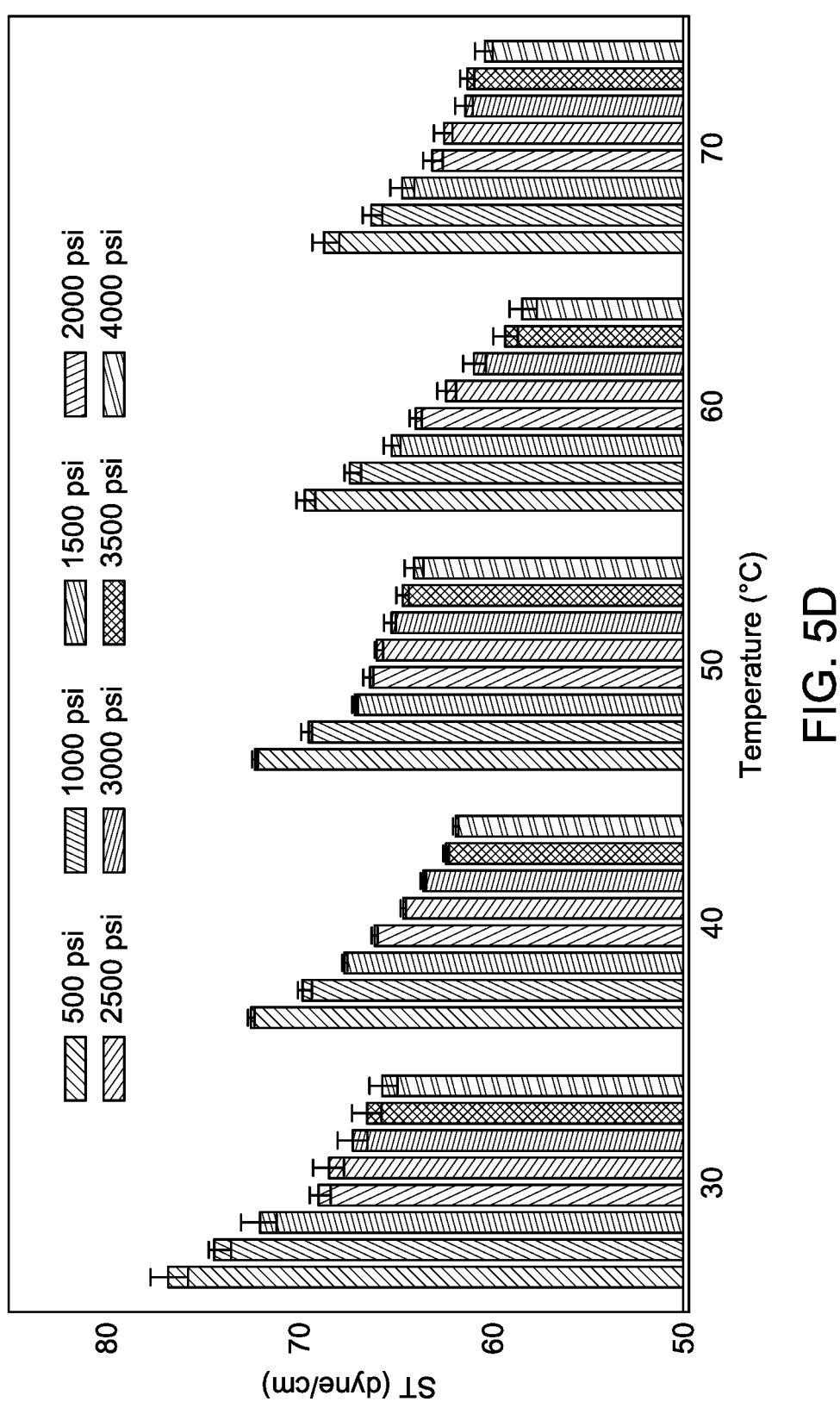
FIG. 5D is a schematic plot depicting an effect of pressure and temperature on measured ST with salinity increase at 15 wt. % for the test case 1, according to certain embodiments.
Figure 5E:
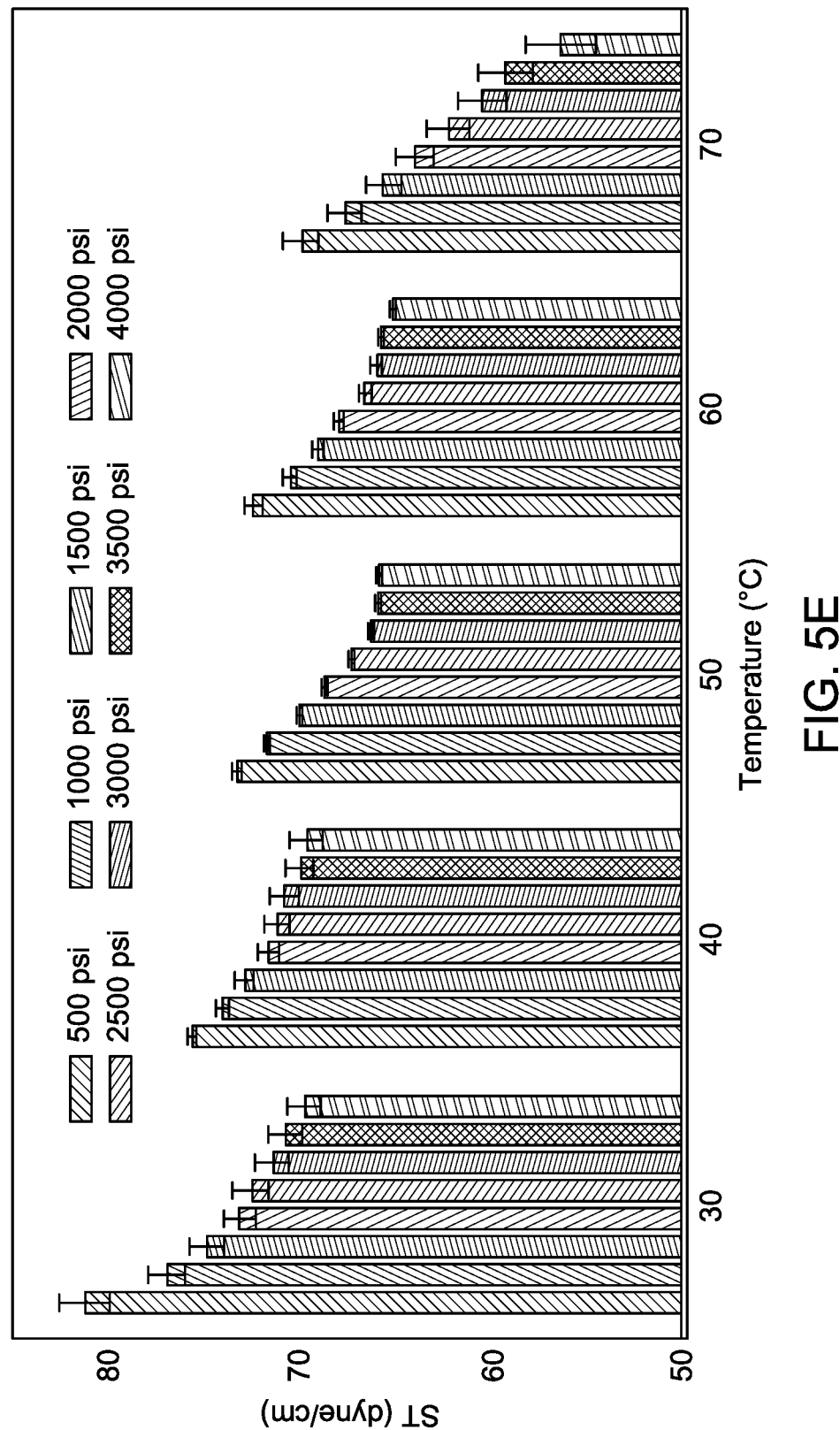
FIG. 5E is a schematic plot depicting an effect of pressure and temperature on measured ST with salinity increase at 20 wt. % for the test case 1, according to certain embodiments.

As shown in FIGS. 5A-5E, surface tension is a function of reservoir pressure, temperature, and salinity (though, often considered to be ionic strength when considering different salt types). The gas-mixture/brine surface tension decreased with increasing pressure (at constant temperature). For example, when at 30° C., the surface tension decreased from 67.23 dynes/cm (at 500 psi) to 59.61 dynes/cm (at 4000 psi) while at 70° C., it decreased from 68.18 dynes/cm (at 500 psi) to 60.51 dynes/cm (at 4000 psi). Furthermore, at a particular temperature, the surface tension between the gas mixture/brine increased with salinity. For example, when comparing the gas-mixture surface tension of FIG. 5A and FIG. 5E, it can be seen that a systematic increase was imminent with increasing salinity, but was not continuous over the investigated temperature. As an example, at say 70° C., the surface tension at 500 psi decreased from 68.18 dynes/cm to 60.51 dynes/cm at 4000 psi (FIG. 5A), whereas it decreased from 69.95 dynes/cm (at 500 psi) to 56.42 dynes/cm (at 4000 psi) (FIG. 5E). The reason behind these observed inconsistencies is not known yet, but it could be due to the increased solubility of the gas-mixture compositions (80% $H_2$—10% $N_2$—5% $CH_4$—5% $CO_2$) caused by increasing the salinity, which will result to an increase in the density difference between the brine and gas-mixture, leading to an increase in the surface tension.

Density difference ($\Delta\rho$) plays a key role in surface tension measurement as it increases with increasing temperature. This difference at each set temperature can also be seen to increase with salinity. For instance, in FIG. 6, it can be seen that at 50° C., 20 wt. % NaCl density difference was 1098.21 kg/m$^3$ compared to that of 2 wt. % (which was 991.70 kg/m$^3$) at 500 psi. This sequence was observed all through as the pressure increased from 500 psi to 4000 psi, implying higher surface tension values at high salinity.

There is a lack of studies on the effects of gas-mixture fractions on surface tension, making it difficult to make meaningful comparisons. At the time of the present disclosure, the only reported study on surface tension for $H_2$, $CH_4$, and $H_2$—$CH_4$/brine mixtures is conducted by Mirchi et al. [See: Mirchi, V.; Dejam, M.; Alvarado, V. Interfacial tension and contact angle measurements for hydrogen-methane mixtures/brine/oil-wet rocks at reservoir conditions. Int. J. Hydrogen Energy 2022, 47, 34963-34975, which is incorporated herein by reference in its entirety] and Chow et al. [See: Chow, Y. T. F.; Maitland, G. C.; Trusler, J. P. M. Interfacial tensions of ($H_2O+H_2$) and ($H_2O+CO_2+H_2$) systems at temperatures of (298-448) K and pressures up to 45 MPa. Fluid Phase Equilib. 2018, 475, 37-44, which is incorporated herein by reference in its entirety]. Mirchi et al. found that IFT decreased with increasing temperature and $CH_4$ fraction concurrently which they attributed to the interaction of the brine-$CH_4$ molecules at the interface when compared to the brine-$H_2$ molecules (though their study was conducted at 1000 psi). Chow et al. however, reported IFT first increased and then, decreased with pressure. In the present disclosure, where the $N_2$ fraction increased from 10 to 70%, observed a sequential decrease in the measured surface tension. This in prospect suggests that $CH_4$ and $N_2$ may exhibit similar behavior when used as cushion gas in a depleted gas reservoir. However, this assertion will require further studies via molecular dynamic simulation as it can investigate the intermolecular interactions and phenomena from molecular perspectives, which are hardly accessible by experiments [See: Li, W.; Jin, Z. Molecular dynamics simulations of natural gas-water interfacial tensions over wide range of pressures. Fuel 2019, 236, 480-492; Yang, Y.; Narayanan Nair, A. K.; Sun, S. Molecular Dynamics Simulation Study of Carbon Dioxide, Methane, and Their Mixture in the Presence of Brine. J. Phys. Chem. B 2017, 121, 9688-9698; and Li, W.; Jin, Z. Effect of ion concentration and multivalence on methane-brine interfacial tension and phenomena from molecular perspectives. Fuel 2019, 254, 115657, each of which is incorporated herein by reference in their entirety] to understand the governing mechanism responsible for the decrease in surface tension as $H_2$ fraction reduces.

Overall, the surface tension reduces with increasing pressure and increases with increasing reservoir salinity. For each test case, the range of surface tensions is as follows: Test case 1 [53.09 dynes/cm-81.23 dynes/cm]; Test case 2 [52.98 dynes/cm-76.37 dynes/cm]; Test case 3 [54.03 dynes/cm-78.13 dynes/cm]; Test case 4 [53.32 dynes/cm-75.81 dynes/cm]; Test case 5 [41.99 dynes/cm-69.09 dynes/cm]; Test case 6 [38.78 dynes/cm-69.61 dynes/cm] and Test case 7 [35.53 dynes/cm-73.33 dynes/cm].

Example 7: Implication of Measurements

Gas-brine interfaces play an important role in natural gas recovery. Hence, the understanding of $H_2$ flow physics and trapping potential is key to establishing effective and reliable storage model's representative of the reservoir type for lab-scale tests and feasibility studies. These can be achieved through wettability and gas-brine surface tension experiments for geological formations. However, the thermophysical properties of $H_2$ and its mixtures with reservoir fluids (native gases and brine) at reservoir conditions will significantly impact the storage and withdrawal capacity, injectivity, gas immobilization, and efficient gas containment [See: Pan, B.; Yin, X.; Ju, Y.; Iglauer, S. Underground hydrogen storage: Influencing parameters and future outlook. Adv. Colloid Interface Sci. 2021, 294, 102473; and Raza, A.; Arif, M.; Glatz, G.; Mahmoud, M.; Al Kobaisi, M.; Alafnan, S.; Iglauer, S. A holistic overview of underground hydrogen storage: Influencing factors, current understanding, and outlook. Fuel 2022, 330, 125636, each of which is incorporated herein by reference in their entirety] as their physical properties (such as density, viscosity, diffusivity, and solubility) petrophysical properties (interfacial tension, wettability, capillary pressure, and relative permeability) are somewhat different for all the resident fluids in a natural gas reservoir.

According to the present disclosure, the gas mixtures are preferably instantly occupied in the large pores since the water-wetness is very high for $H_2$ (thus, lower contact angles). This also implies a capillary-dominated flow of the injected gas mixtures due to interfacial forces. In the present disclosure, the data provides insight into the comparable contact angles for reservoir scale simulations using $N_2$ as a cushion gas in a depleted gas reservoir. This is because, when the contact angles (wettability status) of a given rock type (core scale-m to cm) are known, they can be used for pore-scale (mm to μm) modeling to estimate upscaled capillary pressure (Pc) and relative permeability (Kr) curves for core scales [See: Boon, M.; Hajibeygi, H. Experimental characterization of $H_2$/water multiphase flow in heterogeneous sandstone rock at the core scale relevant for underground hydrogen storage (UHS). Sci. Rep. 2022, 1-12; Hashemi, L.; Blunt, M.; Hajibeygi, H. Pore-scale modelling and sensitivity analyses of hydrogen-brine multiphase flow in geological porous media. Sci. Rep. 2021, 11, 1-13, each of which is incorporated herein by reference in their entirety] which can be used as input parameters for reservoir scale (km) simulations for gas recovery optimization.

Furthermore, the efficiency of the gas recovery will depend on the interplay between the capillary entry pressure (Pce), the buoyancy pressure, and their distribution within the interconnected pores as recent pore scale studies indicate that the injected gas (during drainage) will be instantly occupied by the larger pores as compared to the smaller pores, pore throats, and corner edges after imbibition. As an illustration, from the gas column height estimation using Eq. (6), it is relatively observed that the pore radius will significantly impact the sealing efficiency and $H_2$ storage capacities for the different gas mixtures.

$$h_{seal} = \frac{2\gamma Cos\theta}{g(\rho_b - \rho_{gmix})r_{seal}} \quad \text{Eq. (6)}$$

However, the use of Eq. (6) by various UHS studies do not account for the capillary contribution from the reservoir and seal rock, as seen in the context of carbon geo storage by Ringrose [See: Ringrose, P. How to Store $CO_2$ Underground: Insights from early-mover CCS Projects; 2020; ISBN 978-3-030-33112-2, which is incorporated herein by reference in its entirety] and Thanasaksukthawee et al. [See: Thanasaksukthawee, V.; Santha, N.; Saenton, S.; Tippayawong, N.; Jaroonpattanapong, P.; Foroozesh, J.; Tangparitkul, S. Relative $CO_2$ Column Height for CO2 Geological Storage: A Non-Negligible Contribution from Reservoir Rock Characteristics. Energy and Fuels 2022, 36, 3727-3736, which is incorporated herein by reference in its entirety] for a fair assessment of the structural trapping mechanisms. Hence, used Eq. (7) to account for this difference as it justifies the natural accumulations of gases beneath the subsurface as it balances the relative capillary contribution from both seal and reservoir rocks.

$$h_{seal-reservoir} = \frac{2\gamma Cos\theta}{g(\rho_b - \rho_{gmix})} \times \left(\frac{1}{r_{seal}} - \frac{1}{r_{reservoir}}\right) \quad \text{Eq. (7)}$$

Herein, $\gamma$ is the gas mixture surface tension (mN/m), $\theta$ is the contact angle (*), $\Delta\rho=(\rho_b-\rho_{gmix})$ is the density difference (kg/m³) between the brine and gas mixtures, g=9.81 (m²/s) is the gravitational constant, and r is the pore radius. In the present disclosure, used r=50 nm and 2 μm for the seal and reservoir rock, respectively [See: Iglauer, S.; Pentland, C. H.; Busch, A. CO 2 wettability of seal and reservoir rocks and the implications for carbon geo-sequestration. Water Resour. Res. 2015, 51, 729-774; and Nelson, P. H. Pore-throat sizes in sandstones, tight sandstones, and shales. Am. Assoc. Pet. Geol. Bull. 2009, 93, 329-340, each of which is incorporated herein by reference in their entirety].

It can be seen that a little variation between column heights was imminent, implying that the capillary reservoir effect impacts the immobilized gas beneath the seal rock. Particularly, $h_{seal}$ was higher than $h_{seal}$-reservoir suggesting the impact of the reservoir pores and characteristics. However, a general observation indicates that higher capillary entry pressure (i.e., lower contact angle values), will significantly favor high column height for gas storage.

Example 8: Gas Mixture Selection

The selection of an $N_2$ cushion gas mixture is determined from the behavior exhibited by sister gases. For instance, similar wettability behavior of $CO_2$ and $N_2$ has previously been observed using core-flooding experiments [See: Al-Menhali, A.; Niu, B.; Krevor, S. Capillarity and wetting of carbon dioxide and brine during drainage in <scp>B</scp>erea sandstone at reservoir conditions. Water Resour. Res. 2015, 51, 7895-7914; Garing, C.; Benson, S. M. CO 2 Wettability of Sandstones: Addressing Conflicting Capillary Behaviors. Geophys. Res. Lett. 2019, 46, 776 782, each of which is incorporated herein by reference in their entirety] as well as via microfluid experiments for $H_2$, $N_2$, and $CO_2$ storage. In addition, when using $CH_4$ as a cushion gas by Hashemi et al., similar wettability observation was documented for $H_2$, $CH_4$, and $H_2$—$CH_4$ for the depleted gas reservoir. While the case of Mirchi et al. using $CH_4$ as a cushion for depleted oil and gas reservoirs noted higher wettability (than those reported in this study) with increasing $CH_4$ fraction, their reported surface tension range decreases with increasing $CH_4$ fraction. Accordingly, in the present disclosure, a systematic decrease in surface tension happens with increasing $N_2$ fraction (while keeping $CH_4$ and $CO_2$ constant). This shows that $CH_4$ and $N_2$ may have similar cushion gas effects for $H_2$ storage, thus, the condition exhibited by methane can be used to determine that of $N_2$.

Accordingly, Test case 3 provides a preferable result because Test cases 1 and 2 will lead to higher surface tension (posing a significant threat to withdrawal) and less $CH_4$—$H_2$ interphase, Test cases 4, 5, 6, and 7 with lower $H_2$ fraction will have a relatively lower surface tension (which is recommended for gas immobilization) and higher $CH_4$—$H_2$ interphase thickness (which is considered as the most important function of a cushion gas) during withdrawal but may lead to lower breakthrough pressure. The close interfacial tension values could provide insight into the comparable contact angles found in the experiments as water-wet conditions can be expected in underground storage of $H_2$ as the non-wetting phase preferentially flows through the larger pores resulting in a higher relative permeability. This thus facilitates the injectivity/producibility of the reservoir, as the amount of capillary trapped $H_2$ will be smaller [See: Boon, M.; Hajibeygi, H. Experimental characterization of $H_2$/water multiphase flow in heterogeneous sandstone rock at the core scale relevant for underground hydrogen storage (UHS). Sci. Rep. 2022, 1-12, which is incorporated herein by reference in its entirety].

Example 9: Sessile and Pendent Drop Method

The following Tables 3 to 9 show the results of sessile and pendent drop method used to measure the contact angle for the gas mixture/brine/rock and gas mixture/brine surface tensions.

TABLE 3

| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
|---|---|---|---|---|---|---|---|
| | | | 80% $H_2$—10% $N_2$—5% $CH_4$—5% $CO_2$ (Case 1) | | | | |
| 2 | 500 | 30 | 999.48 | 23.36 | 67.23 | 251.80 | 245.50 |
| | 1000 | 30 | 989.79 | 23.67 | 65.85 | 248.47 | 242.26 |
| | 1500 | 30 | 980.48 | 22.52 | 64.51 | 247.84 | 241.64 |
| | 2000 | 30 | 971.60 | 22.15 | 62.85 | 244.29 | 238.18 |
| | 2500 | 30 | 963.16 | 23.28 | 62.30 | 242.28 | 236.22 |
| | 3000 | 30 | 955.14 | 23.30 | 61.23 | 240.07 | 234.06 |
| | 3500 | 30 | 947.54 | 22.39 | 60.42 | 240.40 | 234.39 |
| | 4000 | 30 | 940.33 | 23.32 | 59.61 | 237.38 | 231.44 |
| | 500 | 40 | 995.80 | 24.04 | 68.64 | 256.70 | 250.28 |
| | 1000 | 40 | 986.42 | 24.75 | 66.54 | 249.81 | 243.56 |
| | 1500 | 40 | 977.40 | 22.71 | 65.09 | 250.50 | 244.24 |
| | 2000 | 40 | 968.78 | 21.64 | 64.05 | 250.57 | 244.31 |
| | 2500 | 40 | 960.57 | 21.93 | 62.89 | 247.63 | 241.44 |
| | 3000 | 40 | 952.77 | 23.88 | 61.99 | 242.59 | 236.52 |
| | 3500 | 40 | 945.37 | 25.53 | 61.47 | 239.24 | 233.26 |
| | 4000 | 40 | 938.33 | 25.25 | 61.02 | 239.83 | 233.83 |
| | 500 | 50 | 991.71 | 29.99 | 65.95 | 234.88 | 229.01 |
| | 1000 | 50 | 982.60 | 29.35 | 64.51 | 233.33 | 227.50 |
| | 1500 | 50 | 973.85 | 28.86 | 63.17 | 231.65 | 225.86 |
| | 2000 | 50 | 965.48 | 28.68 | 62.37 | 231.09 | 225.31 |
| | 2500 | 50 | 957.50 | 28.51 | 61.44 | 229.90 | 224.16 |
| | 3000 | 50 | 949.91 | 28.45 | 60.61 | 228.75 | 223.03 |
| | 3500 | 50 | 942.68 | 28.40 | 59.78 | 227.48 | 221.79 |
| | 4000 | 50 | 935.81 | 28.31 | 58.85 | 225.75 | 220.10 |
| | 500 | 60 | 985.39 | 33.10 | 67.52 | 234.06 | 228.21 |
| | 1000 | 60 | 976.56 | 31.84 | 66.27 | 235.08 | 229.21 |
| | 1500 | 60 | 968.06 | 31.05 | 65.15 | 235.10 | 229.22 |
| | 2000 | 60 | 959.92 | 30.46 | 64.44 | 235.94 | 230.05 |
| | 2500 | 60 | 952.15 | 30.41 | 62.99 | 232.67 | 226.85 |
| | 3000 | 60 | 944.75 | 28.77 | 61.04 | 230.91 | 225.14 |
| | 3500 | 60 | 937.70 | 29.90 | 59.14 | 222.95 | 217.38 |
| | 4000 | 60 | 930.98 | 29.62 | 57.44 | 218.73 | 213.26 |
| | 500 | 70 | 977.25 | 26.18 | 68.18 | 255.32 | 248.93 |
| | 1000 | 70 | 968.68 | 24.67 | 66.64 | 254.93 | 248.56 |
| | 1500 | 70 | 960.42 | 24.06 | 65.67 | 254.39 | 248.23 |
| | 2000 | 70 | 952.50 | 23.44 | 64.88 | 254.84 | 248.47 |
| | 2500 | 70 | 944.93 | 23.30 | 63.92 | 253.33 | 247.00 |
| | 3000 | 70 | 937.71 | 22.86 | 62.98 | 252.36 | 246.05 |
| | 3500 | 70 | 930.82 | 22.60 | 61.94 | 250.52 | 244.26 |
| | 4000 | 70 | 924.25 | 22.41 | 60.51 | 246.80 | 240.63 |
| 5 | 500 | 30 | 1019.68 | 34.04 | 71.92 | 238.32 | 232.37 |
| | 1000 | 30 | 1009.99 | 35.21 | 70.69 | 233.18 | 227.35 |
| | 1500 | 30 | 1000.68 | 37.99 | 68.18 | 218.99 | 213.51 |
| | 2000 | 30 | 991.80 | 37.57 | 65.98 | 214.99 | 209.62 |
| | 2500 | 30 | 983.36 | 38.72 | 65.42 | 211.65 | 206.36 |
| | 3000 | 30 | 975.34 | 36.61 | 64.27 | 215.68 | 210.29 |
| | 3500 | 30 | 967.74 | 33.50 | 63.05 | 221.53 | 215.99 |
| | 4000 | 30 | 960.53 | 33.68 | 62.08 | 219.32 | 213.84 |
| | 500 | 40 | 1016.10 | 41.87 | 70.45 | 210.53 | 205.27 |
| | 1000 | 40 | 1006.72 | 41.68 | 68.65 | 207.67 | 202.48 |
| | 1500 | 40 | 997.70 | 41.40 | 67.23 | 206.11 | 200.96 |
| | 2000 | 40 | 989.08 | 41.00 | 65.88 | 204.99 | 199.87 |
| | 2500 | 40 | 980.87 | 40.96 | 65.42 | 205.39 | 200.25 |
| | 3000 | 40 | 973.07 | 41.20 | 64.03 | 201.90 | 196.86 |
| | 3500 | 40 | 965.67 | 41.14 | 63.13 | 200.75 | 195.73 |
| | 4000 | 40 | 958.63 | 40.80 | 62.15 | 200.13 | 195.12 |
| | 500 | 50 | 1011.91 | 30.81 | 66.60 | 230.50 | 224.74 |
| | 1000 | 50 | 1002.80 | 28.66 | 64.84 | 231.36 | 225.58 |
| | 1500 | 50 | 994.05 | 29.68 | 63.49 | 226.29 | 220.64 |
| | 2000 | 50 | 985.68 | 29.98 | 62.33 | 223.36 | 217.78 |
| | 2500 | 50 | 977.70 | 29.93 | 61.19 | 221.15 | 215.63 |
| | 3000 | 50 | 970.11 | 29.70 | 60.33 | 220.25 | 214.74 |
| | 3500 | 50 | 962.88 | 27.82 | 59.74 | 223.75 | 218.16 |
| | 4000 | 50 | 956.01 | 27.95 | 58.77 | 221.44 | 215.91 |
| | 500 | 60 | 1007.09 | 30.36 | 66.34 | 231.78 | 225.98 |

TABLE 3-continued

| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
|---|---|---|---|---|---|---|---|
| | | | 80% $H_2$—10% $N_2$—5% $CH_4$—5% $CO_2$ (Case 1) | | | | |
| | 1000 | 60 | 998.26 | 30.11 | 63.11 | 223.03 | 217.45 |
| | 1500 | 60 | 989.76 | 29.72 | 62.46 | 223.47 | 217.89 |
| | 2000 | 60 | 981.62 | 29.24 | 61.32 | 222.26 | 216.71 |
| | 2500 | 60 | 973.85 | 29.04 | 59.37 | 217.34 | 211.91 |
| | 3000 | 60 | 966.45 | 28.89 | 58.42 | 215.80 | 210.41 |
| | 3500 | 60 | 959.40 | 28.51 | 56.64 | 211.55 | 206.26 |
| | 4000 | 60 | 952.68 | 28.51 | 56.35 | 211.94 | 206.64 |
| | 500 | 70 | 1000.75 | 28.71 | 63.88 | 228.28 | 222.58 |
| | 1000 | 70 | 992.18 | 25.88 | 63.00 | 232.95 | 227.13 |
| | 1500 | 70 | 983.92 | 25.19 | 60.98 | 228.70 | 222.98 |
| | 2000 | 70 | 976.00 | 24.30 | 58.80 | 223.89 | 218.29 |
| | 2500 | 70 | 968.43 | 20.18 | 57.02 | 225.34 | 219.71 |
| | 3000 | 70 | 961.21 | 22.97 | 55.47 | 216.65 | 211.24 |
| | 3500 | 70 | 954.32 | 23.36 | 53.99 | 211.79 | 206.49 |
| | 4000 | 70 | 947.75 | 22.52 | 53.09 | 210.98 | 205.71 |
| 10 | 500 | 30 | 1048.18 | 40.57 | 71.61 | 211.61 | 206.32 |
| | 1000 | 30 | 1038.49 | 39.35 | 69.85 | 212.08 | 206.78 |
| | 1500 | 30 | 1029.18 | 38.48 | 68.45 | 212.31 | 207.00 |
| | 2000 | 30 | 1020.30 | 38.00 | 67.90 | 213.83 | 208.49 |
| | 2500 | 30 | 1011.86 | 37.83 | 67.34 | 214.32 | 208.97 |
| | 3000 | 30 | 1003.84 | 38.05 | 66.81 | 213.69 | 208.35 |
| | 3500 | 30 | 996.24 | 37.97 | 66.51 | 214.63 | 209.27 |
| | 4000 | 30 | 989.03 | 37.55 | 65.85 | 215.26 | 209.88 |
| | 500 | 40 | 1044.50 | 36.87 | 71.95 | 224.69 | 219.08 |
| | 1000 | 40 | 1035.12 | 36.27 | 69.55 | 220.91 | 215.39 |
| | 1500 | 40 | 1026.10 | 35.92 | 67.69 | 217.85 | 212.41 |
| | 2000 | 40 | 1017.48 | 35.83 | 66.29 | 215.40 | 210.02 |
| | 2500 | 40 | 1009.27 | 35.46 | 65.33 | 215.01 | 209.63 |
| | 3000 | 40 | 1001.47 | 35.46 | 65.10 | 215.91 | 210.51 |
| | 3500 | 40 | 994.07 | 35.44 | 64.41 | 215.26 | 209.88 |
| | 4000 | 40 | 987.03 | 35.34 | 63.33 | 213.45 | 208.11 |
| | 500 | 50 | 1039.71 | 35.76 | 72.09 | 229.41 | 223.68 |
| | 1000 | 50 | 1030.60 | 34.97 | 70.27 | 227.82 | 222.12 |
| | 1500 | 50 | 1021.85 | 34.51 | 68.35 | 224.76 | 219.14 |
| | 2000 | 50 | 1013.48 | 33.89 | 67.09 | 224.07 | 218.47 |
| | 2500 | 50 | 1005.50 | 33.73 | 65.76 | 221.79 | 216.25 |
| | 3000 | 50 | 997.91 | 33.60 | 64.87 | 220.76 | 215.24 |
| | 3500 | 50 | 990.68 | 33.57 | 63.99 | 219.45 | 213.96 |
| | 4000 | 50 | 983.81 | 33.17 | 63.01 | 218.61 | 213.14 |
| | 500 | 60 | 1035.09 | 31.31 | 70.36 | 236.82 | 230.90 |
| | 1000 | 60 | 1026.26 | 30.63 | 67.62 | 231.19 | 225.41 |
| | 1500 | 60 | 1017.76 | 29.71 | 65.53 | 228.05 | 222.35 |
| | 2000 | 60 | 1009.62 | 29.97 | 64.32 | 225.04 | 219.41 |
| | 2500 | 60 | 1001.85 | 29.98 | 63.11 | 222.48 | 216.92 |
| | 3000 | 60 | 994.45 | 29.56 | 61.57 | 219.59 | 214.10 |
| | 3500 | 60 | 987.40 | 28.97 | 60.84 | 219.83 | 214.33 |
| | 4000 | 60 | 980.68 | 28.73 | 60.27 | 219.74 | 214.24 |
| | 500 | 70 | 1029.15 | 35.20 | 68.43 | 221.56 | 216.02 |
| | 1000 | 70 | 1020.58 | 34.59 | 66.68 | 219.32 | 213.84 |
| | 1500 | 70 | 1012.32 | 34.00 | 64.67 | 215.99 | 210.59 |
| | 2000 | 70 | 1004.40 | 33.33 | 63.39 | 215.03 | 209.65 |
| | 2500 | 70 | 996.83 | 33.11 | 61.93 | 212.19 | 206.88 |
| | 3000 | 70 | 989.61 | 33.11 | 61.42 | 211.97 | 206.67 |
| | 3500 | 70 | 982.72 | 32.41 | 60.49 | 211.88 | 206.58 |
| | 4000 | 70 | 976.15 | 32.59 | 60.21 | 211.89 | 206.59 |
| 15 | 500 | 30 | 1078.48 | 37.83 | 76.69 | 229.02 | 223.29 |
| | 1000 | 30 | 1068.79 | 38.36 | 74.41 | 222.62 | 217.06 |
| | 1500 | 30 | 1059.48 | 38.63 | 72.01 | 216.53 | 211.11 |
| | 2000 | 30 | 1050.60 | 37.31 | 69.06 | 213.19 | 207.86 |
| | 2500 | 30 | 1042.16 | 36.76 | 68.50 | 214.73 | 209.36 |
| | 3000 | 30 | 1034.14 | 36.93 | 67.26 | 212.02 | 206.72 |
| | 3500 | 30 | 1026.54 | 37.09 | 66.48 | 210.66 | 205.39 |
| | 4000 | 30 | 1019.33 | 36.98 | 65.68 | 209.90 | 204.65 |
| | 500 | 40 | 1074.20 | 30.24 | 72.58 | 238.04 | 232.09 |
| | 1000 | 40 | 1064.82 | 29.67 | 69.84 | 232.38 | 226.57 |
| | 1500 | 40 | 1055.80 | 29.66 | 67.62 | 226.94 | 221.27 |
| | 2000 | 40 | 1047.18 | 29.16 | 66.03 | 224.52 | 218.90 |
| | 2500 | 40 | 1038.97 | 28.85 | 64.58 | 221.98 | 216.43 |
| | 3000 | 40 | 1031.17 | 28.83 | 63.49 | 219.96 | 214.46 |
| | 3500 | 40 | 1023.77 | 28.81 | 62.37 | 217.65 | 212.21 |
| | 4000 | 40 | 1016.73 | 28.72 | 61.97 | 217.97 | 212.52 |
| | 500 | 50 | 1069.31 | 28.92 | 72.28 | 241.27 | 235.24 |
| | 1000 | 50 | 1060.20 | 28.42 | 69.56 | 235.29 | 229.41 |
| | 1500 | 50 | 1051.45 | 28.39 | 67.13 | 229.05 | 223.32 |

23

TABLE 3-continued

| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|---|---|---|---|---|---|---|---|
| | | | 80% H₂—10% N₂—5% CH₄—5% CO₂ (Case 1) | | | | |
| | 2000 | 50 | 1043.08 | 28.30 | 66.38 | 228.47 | 222.76 |
| | 2500 | 50 | 1035.10 | 28.25 | 65.79 | 228.29 | 222.59 |
| | 3000 | 50 | 1027.51 | 28.11 | 65.28 | 228.49 | 222.78 |
| | 3500 | 50 | 1020.28 | 28.14 | 64.63 | 227.75 | 222.06 |
| | 4000 | 50 | 1013.41 | 28.14 | 64.09 | 227.38 | 221.69 |
| | 500 | 60 | 1063.49 | 28.75 | 69.65 | 234.12 | 228.27 |
| | 1000 | 60 | 1054.66 | 28.29 | 67.32 | 229.19 | 223.46 |
| | 1500 | 60 | 1046.16 | 28.14 | 65.19 | 224.07 | 218.47 |
| | 2000 | 60 | 1038.02 | 28.06 | 63.94 | 221.64 | 216.09 |
| | 2500 | 60 | 1030.25 | 27.80 | 62.37 | 218.38 | 212.92 |
| | 3000 | 60 | 1022.85 | 27.60 | 60.94 | 215.30 | 209.92 |
| | 3500 | 60 | 1015.80 | 27.33 | 59.34 | 211.62 | 206.33 |
| | 4000 | 60 | 1009.08 | 27.21 | 58.41 | 209.90 | 204.65 |
| | 500 | 70 | 1056.55 | 31.54 | 68.74 | 226.09 | 220.44 |
| | 1000 | 70 | 1047.98 | 30.69 | 66.32 | 221.93 | 216.38 |
| | 1500 | 70 | 1039.72 | 30.19 | 64.60 | 218.99 | 213.52 |
| | 2000 | 70 | 1031.80 | 29.75 | 63.04 | 216.30 | 210.89 |
| | 2500 | 70 | 1024.23 | 29.45 | 62.55 | 216.84 | 211.42 |
| | 3000 | 70 | 1017.01 | 29.34 | 61.45 | 214.78 | 209.41 |
| | 3500 | 70 | 1010.12 | 29.21 | 61.29 | 215.95 | 210.55 |
| | 4000 | 70 | 1003.55 | 29.11 | 60.58 | 215.08 | 209.70 |
| 20 | 500 | 30 | 1107.78 | 37.59 | 81.23 | 236.92 | 231.00 |
| | 1000 | 30 | 1098.09 | 37.56 | 76.97 | 226.58 | 220.92 |
| | 1500 | 30 | 1088.78 | 37.60 | 74.82 | 222.01 | 216.46 |
| | 2000 | 30 | 1079.90 | 37.78 | 73.16 | 218.32 | 212.86 |
| | 2500 | 30 | 1071.46 | 38.26 | 72.58 | 216.91 | 211.49 |
| | 3000 | 30 | 1063.44 | 38.00 | 71.49 | 216.01 | 210.61 |
| | 3500 | 30 | 1055.84 | 38.15 | 70.78 | 214.96 | 209.59 |
| | 4000 | 30 | 1048.63 | 38.45 | 69.80 | 212.55 | 207.24 |
| | 500 | 40 | 1103.10 | 38.32 | 75.63 | 219.34 | 213.86 |
| | 1000 | 40 | 1093.72 | 38.09 | 74.09 | 217.39 | 211.96 |
| | 1500 | 40 | 1084.70 | 37.81 | 72.92 | 216.57 | 211.15 |
| | 2000 | 40 | 1076.08 | 37.48 | 71.67 | 215.54 | 210.15 |
| | 2500 | 40 | 1067.87 | 36.61 | 71.21 | 218.28 | 212.82 |
| | 3000 | 40 | 1060.07 | 36.14 | 70.86 | 220.12 | 214.62 |
| | 3500 | 40 | 1052.67 | 35.88 | 70.05 | 219.86 | 214.36 |
| | 4000 | 40 | 1045.63 | 35.56 | 69.66 | 221.00 | 215.47 |
| | 500 | 50 | 1098.21 | 38.90 | 73.34 | 211.92 | 206.62 |
| | 1000 | 50 | 1089.10 | 35.81 | 71.76 | 217.88 | 212.43 |
| | 1500 | 50 | 1080.35 | 34.70 | 70.09 | 217.49 | 212.05 |
| | 2000 | 50 | 1071.98 | 33.52 | 68.79 | 218.15 | 212.70 |
| | 2500 | 50 | 1064.00 | 33.61 | 67.37 | 215.03 | 209.65 |
| | 3000 | 50 | 1056.41 | 33.33 | 66.34 | 213.96 | 208.61 |
| | 3500 | 50 | 1049.18 | 33.07 | 66.00 | 214.97 | 209.59 |
| | 4000 | 50 | 1042.31 | 32.96 | 65.90 | 216.31 | 210.90 |
| | 500 | 60 | 1092.69 | 32.00 | 72.40 | 229.14 | 223.42 |
| | 1000 | 60 | 1083.86 | 30.99 | 70.61 | 227.71 | 222.01 |
| | 1500 | 60 | 1075.36 | 30.21 | 69.08 | 226.38 | 220.72 |
| | 2000 | 60 | 1067.22 | 29.71 | 68.00 | 225.67 | 220.03 |
| | 2500 | 60 | 1059.45 | 29.14 | 66.68 | 224.16 | 218.56 |
| | 3000 | 60 | 1052.05 | 28.46 | 66.10 | 225.23 | 219.60 |
| | 3500 | 60 | 1045.00 | 28.63 | 65.80 | 225.35 | 219.72 |
| | 4000 | 60 | 1038.28 | 28.58 | 65.26 | 225.07 | 219.44 |
| | 500 | 70 | 1086.25 | 32.67 | 69.95 | 221.06 | 215.53 |
| | 1000 | 70 | 1077.68 | 32.10 | 67.73 | 217.08 | 211.66 |
| | 1500 | 70 | 1069.42 | 31.74 | 65.69 | 213.00 | 207.68 |
| | 2000 | 70 | 1061.50 | 31.04 | 64.07 | 210.88 | 205.61 |
| | 2500 | 70 | 1053.93 | 30.13 | 62.32 | 208.53 | 203.31 |
| | 3000 | 70 | 1046.71 | 29.31 | 60.54 | 205.66 | 200.52 |
| | 3500 | 70 | 1039.82 | 28.86 | 59.31 | 203.69 | 198.60 |
| | 4000 | 70 | 1033.25 | 28.72 | 56.42 | 195.27 | 190.39 |

24

TABLE 4

| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|---|---|---|---|---|---|---|---|
| | | | 70% H₂—20% N₂—5% CH₄—5% CO₂ (Case 2) | | | | |
| 2 | 500 | 30 | 995.96 | 33 | 67.65 | 232.3 | 226.49 |
| | 1000 | 30 | 982.83 | 33 | 65.61 | 228.29 | 222.58 |
| | 1500 | 30 | 970.23 | 32.9 | 63.85 | 225.3 | 219.67 |
| | 2000 | 30 | 958.2 | 33.15 | 62.53 | 222.79 | 217.22 |
| | 2500 | 30 | 946.78 | 32.82 | 61.78 | 223.61 | 218.02 |
| | 3000 | 30 | 935.95 | 33.32 | 60.25 | 219.34 | 213.85 |
| | 3500 | 30 | 925.7 | 33.14 | 59.18 | 218.3 | 212.85 |
| | 4000 | 30 | 915.99 | 33.09 | 58.25 | 217.26 | 211.83 |
| | 500 | 40 | 992.4 | 37.71 | 67.67 | 219.97 | 214.47 |
| | 1000 | 40 | 979.69 | 37.67 | 65.78 | 216.74 | 211.32 |
| | 1500 | 40 | 967.48 | 38.16 | 63.91 | 211.81 | 206.51 |
| | 2000 | 40 | 955.82 | 37.81 | 62.6 | 210.99 | 205.72 |
| | 2500 | 40 | 944.73 | 37.62 | 61.45 | 210.08 | 204.83 |
| | 3000 | 40 | 934.2 | 37.28 | 60.04 | 208.53 | 203.31 |
| | 3500 | 40 | 924.21 | 37.61 | 59.24 | 207.07 | 201.89 |
| | 4000 | 40 | 914.75 | 37.51 | 58.5 | 206.86 | 201.69 |
| | 500 | 50 | 988.4 | 32.99 | 63.62 | 220.17 | 214.66 |
| | 1000 | 50 | 976.09 | 32.83 | 61.81 | 216.98 | 211.56 |
| | 1500 | 50 | 964.26 | 32.52 | 60.05 | 214.13 | 208.77 |
| | 2000 | 50 | 952.94 | 32.28 | 58.97 | 213.33 | 207.99 |
| | 2500 | 50 | 942.16 | 32.07 | 57.9 | 212.36 | 207.05 |
| | 3000 | 50 | 931.91 | 31.91 | 57.32 | 212.9 | 207.58 |
| | 3500 | 50 | 922.17 | 30.98 | 56.34 | 213.6 | 208.26 |
| | 4000 | 50 | 912.93 | 30.65 | 56.17 | 215.83 | 210.43 |
| | 500 | 60 | 982.19 | 32.91 | 61.92 | 215.83 | 210.44 |
| | 1000 | 60 | 970.25 | 32.12 | 60.08 | 213.83 | 208.48 |
| | 1500 | 60 | 958.76 | 30.76 | 58.8 | 214.89 | 209.52 |
| | 2000 | 60 | 947.76 | 29.79 | 57.58 | 215.01 | 209.64 |
| | 2500 | 60 | 937.27 | 30.35 | 56.55 | 212.3 | 207 |
| | 3000 | 60 | 927.29 | 29.71 | 55.49 | 211.92 | 206.63 |
| | 3500 | 60 | 917.79 | 29.14 | 54.46 | 211.33 | 206.04 |
| | 4000 | 60 | 908.76 | 28.3 | 53.75 | 212.35 | 207.04 |
| | 500 | 70 | 974.15 | 30.07 | 62.36 | 225.92 | 220.27 |
| | 1000 | 70 | 962.55 | 28.62 | 60.13 | 223.59 | 218 |
| | 1500 | 70 | 951.39 | 27.75 | 58.3 | 221.12 | 215.59 |
| | 2000 | 70 | 940.7 | 27.22 | 57.32 | 220.94 | 215.41 |
| | 2500 | 70 | 930.49 | 26.61 | 55.84 | 218.77 | 213.3 |
| | 3000 | 70 | 920.75 | 25.77 | 55.12 | 219.82 | 214.33 |
| | 3500 | 70 | 911.48 | 25.25 | 53.86 | 217.91 | 212.46 |
| | 4000 | 70 | 902.66 | 25.31 | 53.02 | 216.53 | 211.12 |
| 5 | 500 | 30 | 1016.16 | 39.59 | 70.29 | 217.36 | 211.93 |
| | 1000 | 30 | 1003.03 | 40.88 | 68.67 | 211.06 | 205.78 |
| | 1500 | 30 | 990.43 | 40.46 | 67.15 | 210.38 | 205.12 |
| | 2000 | 30 | 978.4 | 40.78 | 65.49 | 206.69 | 201.52 |
| | 2500 | 30 | 966.98 | 40.95 | 64.73 | 206.15 | 201 |
| | 3000 | 30 | 956.15 | 41.07 | 63.92 | 205.52 | 200.38 |
| | 3500 | 30 | 945.9 | 41.34 | 63.24 | 204.7 | 199.58 |
| | 4000 | 30 | 936.19 | 41.26 | 62.35 | 204.14 | 199.04 |
| | 500 | 40 | 1012.7 | 36.32 | 69.26 | 224.69 | 219.07 |
| | 1000 | 40 | 999.99 | 35.65 | 66.98 | 221.95 | 216.4 |
| | 1500 | 40 | 987.78 | 35.63 | 65.55 | 219.95 | 214.45 |
| | 2000 | 40 | 976.12 | 35.27 | 64.08 | 218.54 | 213.08 |
| | 2500 | 40 | 965.03 | 35.64 | 63.11 | 216.7 | 211.29 |
| | 3000 | 40 | 954.5 | 35.23 | 61.92 | 216.08 | 210.68 |
| | 3500 | 40 | 944.51 | 35.35 | 60.88 | 214.4 | 209.04 |
| | 4000 | 40 | 935.05 | 35.62 | 60.3 | 213.78 | 208.44 |
| | 500 | 50 | 1008.6 | 39.57 | 67.3 | 209.73 | 204.49 |
| | 1000 | 50 | 996.29 | 39.09 | 65.81 | 209.04 | 203.82 |
| | 1500 | 50 | 984.46 | 38.61 | 64.17 | 207.72 | 202.53 |
| | 2000 | 50 | 973.14 | 38.38 | 62.96 | 206.83 | 201.66 |
| | 2500 | 50 | 962.36 | 38.1 | 61.8 | 206.06 | 200.91 |
| | 3000 | 50 | 952.11 | 38.19 | 60.84 | 204.79 | 199.67 |
| | 3500 | 50 | 942.37 | 38.14 | 59.61 | 202.87 | 197.8 |
| | 4000 | 50 | 933.13 | 37.93 | 59.07 | 203.6 | 198.51 |
| | 500 | 60 | 1003.89 | 36.61 | 67.15 | 218.93 | 213.45 |
| | 1000 | 60 | 991.95 | 36.34 | 65.39 | 216.53 | 211.12 |
| | 1500 | 60 | 980.46 | 35.99 | 63.56 | 213.9 | 208.55 |
| | 2000 | 60 | 969.46 | 35.47 | 62.44 | 213.89 | 208.55 |
| | 2500 | 60 | 958.97 | 34.72 | 61.23 | 214 | 208.65 |
| | 3000 | 60 | 948.99 | 33.99 | 60.12 | 214.21 | 208.85 |
| | 3500 | 60 | 939.49 | 34.24 | 59.21 | 212.43 | 207.12 |
| | 4000 | 60 | 930.46 | 34.22 | 58.83 | 213.18 | 207.85 |
| | 500 | 70 | 997.65 | 27.71 | 66.35 | 240.08 | 234.08 |
| | 1000 | 70 | 986.05 | 28.05 | 64.3 | 234.67 | 228.8 |

TABLE 4-continued

| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
|---|---|---|---|---|---|---|---|
| | 1500 | 70 | 974.89 | 29.13 | 61.42 | 224.41 | 218.8 |
| | 2000 | 70 | 964.2 | 27.77 | 58.3 | 218.16 | 212.71 |
| | 2500 | 70 | 953.99 | 26.15 | 56.08 | 215.16 | 209.78 |
| | 3000 | 70 | 944.25 | 25.95 | 55.01 | 213.62 | 208.28 |
| | 3500 | 70 | 934.98 | 25.65 | 54.07 | 212.58 | 207.27 |
| | 4000 | 70 | 926.16 | 25.43 | 52.98 | 210.66 | 205.39 |
| 10 | 500 | 30 | 1044.66 | 37.89 | 75.15 | 231.51 | 225.72 |
| | 1000 | 30 | 1031.53 | 37.35 | 72.91 | 229.12 | 223.39 |
| | 1500 | 30 | 1018.93 | 37.28 | 70.97 | 226.01 | 220.36 |
| | 2000 | 30 | 1006.9 | 37.52 | 68.6 | 220.33 | 214.82 |
| | 2500 | 30 | 995.48 | 37.3 | 67.82 | 220.99 | 215.46 |
| | 3000 | 30 | 984.65 | 37.36 | 66.44 | 218.7 | 213.23 |
| | 3500 | 30 | 974.4 | 37.09 | 65.36 | 218.17 | 212.72 |
| | 4000 | 30 | 964.69 | 37.22 | 64.57 | 217.35 | 211.92 |
| | 500 | 40 | 1041.1 | 35.58 | 73.82 | 235.14 | 229.26 |
| | 1000 | 40 | 1028.39 | 35.62 | 71.37 | 230.07 | 224.32 |
| | 1500 | 40 | 1016.18 | 35.3 | 69.44 | 227.42 | 221.73 |
| | 2000 | 40 | 1004.52 | 35.62 | 67.98 | 224.33 | 218.72 |
| | 2500 | 40 | 993.43 | 35.32 | 66.38 | 222.32 | 216.76 |
| | 3000 | 40 | 982.9 | 35.21 | 65.32 | 221.4 | 215.86 |
| | 3500 | 40 | 972.91 | 35.63 | 64.34 | 219.18 | 213.7 |
| | 4000 | 40 | 963.45 | 35.73 | 63.72 | 218.92 | 213.45 |
| | 500 | 50 | 1036.4 | 32.42 | 69.13 | 229.6 | 223.86 |
| | 1000 | 50 | 1024.09 | 32.12 | 67.14 | 226.4 | 220.74 |
| | 1500 | 50 | 1012.26 | 32.35 | 64.83 | 220.61 | 215.1 |
| | 2000 | 50 | 1000.94 | 32.13 | 62.71 | 216.35 | 210.94 |
| | 2500 | 50 | 990.16 | 31.72 | 60.32 | 211.28 | 206 |
| | 3000 | 50 | 979.91 | 31.19 | 58.44 | 208.03 | 202.83 |
| | 3500 | 50 | 970.17 | 31.13 | 56.66 | 203.84 | 198.75 |
| | 4000 | 50 | 960.93 | 31.25 | 55.86 | 202.63 | 197.56 |
| | 500 | 60 | 1031.89 | 33.03 | 68.25 | 226.13 | 220.47 |
| | 1000 | 60 | 1019.95 | 32.99 | 66.29 | 222.3 | 216.74 |
| | 1500 | 60 | 1008.46 | 32.75 | 64.65 | 219.86 | 214.36 |
| | 2000 | 60 | 997.46 | 32.08 | 63.6 | 220.28 | 214.77 |
| | 2500 | 60 | 986.97 | 31.58 | 62.36 | 219.49 | 214 |
| | 3000 | 60 | 976.99 | 31.95 | 61.17 | 216.62 | 211.21 |
| | 3500 | 60 | 967.49 | 31.19 | 60.02 | 216.4 | 210.99 |
| | 4000 | 60 | 958.46 | 31.01 | 58.78 | 214.32 | 208.96 |
| | 500 | 70 | 1026.05 | 34.44 | 67.26 | 220.45 | 214.94 |
| | 1000 | 70 | 1014.45 | 33.45 | 65.02 | 218.08 | 212.63 |
| | 1500 | 70 | 1003.29 | 33.1 | 63.41 | 215.91 | 210.51 |
| | 2000 | 70 | 992.6 | 32.31 | 61.77 | 214.46 | 209.1 |
| | 2500 | 70 | 982.39 | 31.88 | 60.44 | 213.03 | 207.71 |
| | 3000 | 70 | 972.65 | 31.35 | 59.91 | 214.47 | 209.1 |
| | 3500 | 70 | 963.38 | 31.22 | 58.93 | 213.3 | 207.97 |
| | 4000 | 70 | 954.56 | 30.96 | 58.55 | 214.46 | 209.1 |
| 15 | 500 | 30 | 1074.96 | 32.1 | 75.52 | 242.69 | 236.63 |
| | 1000 | 30 | 1061.83 | 31.82 | 73.6 | 240.16 | 234.16 |
| | 1500 | 30 | 1049.23 | 31.45 | 71.49 | 237.03 | 231.1 |
| | 2000 | 30 | 1037.2 | 31.52 | 69.12 | 231.62 | 225.83 |
| | 2500 | 30 | 1025.78 | 31.67 | 68.36 | 231.27 | 225.49 |
| | 3000 | 30 | 1014.95 | 31.49 | 67.12 | 229.94 | 224.19 |
| | 3500 | 30 | 1004.7 | 31.55 | 65.91 | 227.98 | 222.28 |
| | 4000 | 30 | 994.99 | 31.27 | 65.41 | 229.11 | 223.38 |
| | 500 | 40 | 1070.8 | 35.7 | 74.37 | 230 | 224.25 |
| | 1000 | 40 | 1058.09 | 34.44 | 72.09 | 229.14 | 223.41 |
| | 1500 | 40 | 1045.88 | 33.94 | 70.1 | 226.74 | 221.07 |
| | 2000 | 40 | 1034.22 | 34.16 | 68.58 | 223.73 | 218.14 |
| | 2500 | 40 | 1023.13 | 34.03 | 67.22 | 222.02 | 216.47 |
| | 3000 | 40 | 1012.6 | 34.07 | 65.96 | 220.03 | 214.53 |
| | 3500 | 40 | 1002.61 | 34.03 | 65.39 | 220.4 | 214.89 |
| | 4000 | 40 | 993.15 | 33.78 | 64.56 | 220.31 | 214.8 |
| | 500 | 50 | 1066 | 35.91 | 69.75 | 216.11 | 210.7 |
| | 1000 | 50 | 1053.69 | 35.41 | 67.85 | 214 | 208.65 |
| | 1500 | 50 | 1041.86 | 35.17 | 66.15 | 211.63 | 206.34 |
| | 2000 | 50 | 1030.54 | 35 | 64.99 | 210.65 | 205.38 |
| | 2500 | 50 | 1019.76 | 34.81 | 64.02 | 210.19 | 204.93 |
| | 3000 | 50 | 1009.51 | 34.49 | 62.88 | 209.33 | 204.09 |
| | 3500 | 50 | 999.77 | 34.26 | 62.06 | 209.2 | 203.97 |
| | 4000 | 50 | 990.53 | 34.08 | 61.31 | 209.04 | 203.81 |
| | 500 | 60 | 1060.29 | 34.06 | 72.39 | 230.63 | 224.87 |
| | 1000 | 60 | 1048.35 | 32.7 | 70.84 | 231.88 | 226.08 |
| | 1500 | 60 | 1036.86 | 32.94 | 69.15 | 228.23 | 222.53 |
| | 2000 | 60 | 1025.86 | 32.57 | 67.33 | 225.54 | 219.9 |
| | 2500 | 60 | 1015.37 | 31.44 | 65.1 | 223.05 | 217.47 |
| | 3000 | 60 | 1005.39 | 31.32 | 63.04 | 218.41 | 212.95 |
| | 3500 | 60 | 995.89 | 30.97 | 61.4 | 215.55 | 210.16 |
| | 4000 | 60 | 986.86 | 31.32 | 60.34 | 213.01 | 207.68 |
| | 500 | 70 | 1053.45 | 33.93 | 73.12 | 234.85 | 228.98 |
| | 1000 | 70 | 1041.85 | 33.71 | 71.01 | 231.2 | 225.42 |
| | 1500 | 70 | 1030.69 | 32.77 | 69.42 | 230.94 | 225.16 |
| | 2000 | 70 | 1020 | 32.38 | 68.35 | 230.78 | 225.01 |
| | 2500 | 70 | 1009.79 | 32.04 | 67.27 | 230.27 | 224.51 |
| | 3000 | 70 | 1000.05 | 32.09 | 66.07 | 228.25 | 222.55 |
| | 3500 | 70 | 990.78 | 31.86 | 65.35 | 228.42 | 222.71 |
| | 4000 | 70 | 981.96 | 31.5 | 64.93 | 229.9 | 224.15 |
| 20 | 500 | 30 | 1104.26 | 36.22 | 76.37 | 227.5 | 221.81 |
| | 1000 | 30 | 1091.13 | 36.12 | 74.16 | 223.87 | 218.27 |
| | 1500 | 30 | 1078.53 | 36.01 | 72.27 | 221.05 | 215.53 |
| | 2000 | 30 | 1066.5 | 35.63 | 70.33 | 218.55 | 213.08 |
| | 2500 | 30 | 1055.08 | 35.89 | 69.58 | 217.83 | 212.39 |
| | 3000 | 30 | 1044.25 | 36.03 | 68.23 | 215.49 | 210.1 |
| | 3500 | 30 | 1034 | 35.38 | 67.17 | 215.98 | 210.58 |
| | 4000 | 30 | 1024.29 | 35.87 | 66.51 | 214.58 | 209.22 |
| | 500 | 40 | 1099.7 | 35.69 | 75.05 | 226.03 | 220.38 |
| | 1000 | 40 | 1086.99 | 35.73 | 72.83 | 221.81 | 216.26 |
| | 1500 | 40 | 1074.78 | 35.51 | 71.03 | 219.37 | 213.89 |
| | 2000 | 40 | 1063.12 | 35.47 | 69.86 | 218.24 | 212.78 |
| | 2500 | 40 | 1052.03 | 35.36 | 68.55 | 216.71 | 211.29 |
| | 3000 | 40 | 1041.5 | 35.31 | 67.37 | 215.24 | 209.86 |
| | 3500 | 40 | 1031.51 | 35.21 | 66.21 | 213.83 | 208.49 |
| | 4000 | 40 | 1022.05 | 35.35 | 65.6 | 213.48 | 208.14 |
| | 500 | 50 | 1094.9 | 30.28 | 75.04 | 241.34 | 235.31 |
| | 1000 | 50 | 1082.59 | 30.04 | 73 | 238.03 | 232.08 |
| | 1500 | 50 | 1070.76 | 30.05 | 71 | 234.05 | 228.2 |
| | 2000 | 50 | 1059.44 | 29.79 | 69.9 | 233.5 | 227.66 |
| | 2500 | 50 | 1048.66 | 29.67 | 68.37 | 231 | 225.23 |
| | 3000 | 50 | 1038.41 | 29.89 | 67.1 | 228.44 | 222.73 |
| | 3500 | 50 | 1028.67 | 29.55 | 66.18 | 228.2 | 222.5 |
| | 4000 | 50 | 1019.43 | 29.56 | 65.6 | 228.25 | 222.55 |
| | 500 | 60 | 1089.49 | 32.98 | 73.82 | 231.79 | 226 |
| | 1000 | 60 | 1077.55 | 32.88 | 71.68 | 227.79 | 222.09 |
| | 1500 | 60 | 1066.06 | 32.71 | 69.73 | 224.43 | 218.82 |
| | 2000 | 60 | 1055.06 | 32.79 | 68.77 | 223.44 | 217.85 |
| | 2500 | 60 | 1044.57 | 32.79 | 67.26 | 220.73 | 215.21 |
| | 3000 | 60 | 1034.59 | 32.7 | 66.24 | 219.69 | 214.2 |
| | 3500 | 60 | 1025.09 | 32.23 | 65.27 | 219.62 | 214.13 |
| | 4000 | 60 | 1016.06 | 32.39 | 64.71 | 219.28 | 213.8 |
| | 500 | 70 | 1083.15 | 36.79 | 69.61 | 209.87 | 204.62 |
| | 1000 | 70 | 1071.55 | 36.18 | 67.17 | 206.32 | 201.16 |
| | 1500 | 70 | 1060.39 | 35.84 | 65.54 | 204.29 | 199.18 |
| | 2000 | 70 | 1049.7 | 35.41 | 64.3 | 203.58 | 198.49 |
| | 2500 | 70 | 1039.49 | 35.24 | 63.36 | 202.98 | 197.9 |
| | 3000 | 70 | 1029.75 | 35.47 | 61.74 | 199.12 | 194.14 |
| | 3500 | 70 | 1020.48 | 35.4 | 61.27 | 199.55 | 194.56 |
| | 4000 | 70 | 1011.66 | 35.75 | 60.72 | 198.65 | 193.68 |

TABLE 5

60% $H_2$—30% $N_2$—5% $CH_4$—5% $CO_2$ (Case 3)

| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
|---|---|---|---|---|---|---|---|
| 2 | 500 | 30 | 992.42 | 31.4 | 68.81 | 241.33 | 235.3 |
| | 1000 | 30 | 975.83 | 31.15 | 66.8 | 238.9 | 232.93 |
| | 1500 | 30 | 959.88 | 30.9 | 64.79 | 236.14 | 230.24 |
| | 2000 | 30 | 944.66 | 30.97 | 62.78 | 232.36 | 226.55 |
| | 2500 | 30 | 930.21 | 31.17 | 61.82 | 231.86 | 226.07 |
| | 3000 | 30 | 916.53 | 30.92 | 60.49 | 230.85 | 225.08 |
| | 3500 | 30 | 903.6 | 30.72 | 59.35 | 230.24 | 224.49 |
| | 4000 | 30 | 891.4 | 30.86 | 58.72 | 230.59 | 224.83 |
| | 500 | 40 | 988.97 | 42.69 | 67.53 | 204.68 | 199.56 |
| | 1000 | 40 | 972.93 | 42.81 | 65.12 | 200.22 | 195.21 |

TABLE 5-continued

| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|---|---|---|---|---|---|---|---|
| | | | 60% $H_2$—30% $N_2$—5% $CH_4$—5% $CO_2$ (Case 3) | | | | |
| | 1500 | 40 | 957.49 | 42.13 | 63.73 | 201.29 | 196.26 |
| | 2000 | 40 | 942.75 | 42.68 | 62.11 | 197.5 | 192.56 |
| | 2500 | 40 | 928.73 | 42.05 | 60.56 | 197.46 | 192.53 |
| | 3000 | 40 | 915.44 | 42.68 | 59.54 | 195 | 190.12 |
| | 3500 | 40 | 902.9 | 42.97 | 58.55 | 193.51 | 188.67 |
| | 4000 | 40 | 891 | 42.87 | 57.99 | 194.53 | 189.67 |
| | 500 | 50 | 985.09 | 37.47 | 67.96 | 223.26 | 217.68 |
| | 1000 | 50 | 969.55 | 37.28 | 65.82 | 220.26 | 214.75 |
| | 1500 | 50 | 954.6 | 37.15 | 63.99 | 217.88 | 212.43 |
| | 2000 | 50 | 940.3 | 37 | 62.68 | 217.09 | 211.66 |
| | 2500 | 50 | 926.69 | 36.72 | 61.19 | 215.83 | 210.43 |
| | 3000 | 50 | 913.76 | 36.44 | 60.47 | 217.08 | 211.66 |
| | 3500 | 50 | 901.51 | 36.12 | 59.9 | 218.86 | 213.39 |
| | 4000 | 50 | 889.9 | 36.29 | 59.25 | 218.84 | 213.37 |
| | 500 | 60 | 978.98 | 37.36 | 66.93 | 221.58 | 216.04 |
| | 1000 | 60 | 963.91 | 37.21 | 64.69 | 217.97 | 212.52 |
| | 1500 | 60 | 949.4 | 36.83 | 62.87 | 216.13 | 210.73 |
| | 2000 | 60 | 935.52 | 36.6 | 61.83 | 216.34 | 210.93 |
| | 2500 | 60 | 922.29 | 36.15 | 60.57 | 216.23 | 210.82 |
| | 3000 | 60 | 909.71 | 35.79 | 59.9 | 217.8 | 212.35 |
| | 3500 | 60 | 897.76 | 35.7 | 58.83 | 216.99 | 211.56 |
| | 4000 | 60 | 886.4 | 35.63 | 57.94 | 216.62 | 211.21 |
| | 500 | 70 | 971.03 | 34.81 | 63.65 | 219.47 | 213.98 |
| | 1000 | 70 | 956.41 | 33.83 | 61.69 | 218.48 | 213.02 |
| | 1500 | 70 | 942.32 | 33.16 | 60.29 | 218.43 | 212.96 |
| | 2000 | 70 | 928.83 | 32.88 | 58.89 | 217.12 | 211.69 |
| | 2500 | 70 | 915.96 | 32.22 | 57.97 | 218.35 | 212.89 |
| | 3000 | 70 | 903.7 | 31.91 | 56.66 | 217.02 | 211.6 |
| | 3500 | 70 | 892.05 | 31.72 | 55.69 | 216.55 | 211.13 |
| | 4000 | 70 | 881 | 31.74 | 54.03 | 212.67 | 207.36 |
| 5 | 500 | 30 | 1012.62 | 44.44 | 70.84 | 203.66 | 198.57 |
| | 1000 | 30 | 996.03 | 44.59 | 68.94 | 200.98 | 195.96 |
| | 1500 | 30 | 980.08 | 44.45 | 67.2 | 199.58 | 194.59 |
| | 2000 | 30 | 964.86 | 44.53 | 65.39 | 196.99 | 192.07 |
| | 2500 | 30 | 950.41 | 44.69 | 64.41 | 196.45 | 191.54 |
| | 3000 | 30 | 936.73 | 44.78 | 62.99 | 194.64 | 189.77 |
| | 3500 | 30 | 923.8 | 44.4 | 62.17 | 196.05 | 191.15 |
| | 4000 | 30 | 911.6 | 44.88 | 61.14 | 193.79 | 188.95 |
| | 500 | 40 | 1009.27 | 43.19 | 70.04 | 206.32 | 201.16 |
| | 1000 | 40 | 993.23 | 43.23 | 67.95 | 203.25 | 198.17 |
| | 1500 | 40 | 977.79 | 42.94 | 66.21 | 202.16 | 197.1 |
| | 2000 | 40 | 963.05 | 42.67 | 65.22 | 203.05 | 197.97 |
| | 2500 | 40 | 949.03 | 42.7 | 63.75 | 201.33 | 196.3 |
| | 3000 | 40 | 935.74 | 42.44 | 62.58 | 201.26 | 196.23 |
| | 3500 | 40 | 923.2 | 42.39 | 61.8 | 201.62 | 196.58 |
| | 4000 | 40 | 911.3 | 42.26 | 60.81 | 201.37 | 196.34 |
| | 500 | 50 | 1005.29 | 40.38 | 67.7 | 209.19 | 203.96 |
| | 1000 | 50 | 989.75 | 40.04 | 65.71 | 207.29 | 202.11 |
| | 1500 | 50 | 974.8 | 40.06 | 64.34 | 205.97 | 200.82 |
| | 2000 | 50 | 960.5 | 40.1 | 63.03 | 204.69 | 199.58 |
| | 2500 | 50 | 946.89 | 38.05 | 62.08 | 210.52 | 205.26 |
| | 3000 | 50 | 933.96 | 39.97 | 61.04 | 204.25 | 199.14 |
| | 3500 | 50 | 921.71 | 40.27 | 60.17 | 203.11 | 198.04 |
| | 4000 | 50 | 910.1 | 39.91 | 59.57 | 204.74 | 199.62 |
| | 500 | 60 | 1000.68 | 35.56 | 67.32 | 223.17 | 217.59 |
| | 1000 | 60 | 985.61 | 40.41 | 65.05 | 204.93 | 199.8 |
| | 1500 | 60 | 971.1 | 40.63 | 62.79 | 200.13 | 195.12 |
| | 2000 | 60 | 957.22 | 40.14 | 61.91 | 201.65 | 196.61 |
| | 2500 | 60 | 943.99 | 39.89 | 60.29 | 199.83 | 194.83 |
| | 3000 | 60 | 931.41 | 39.5 | 59 | 199.31 | 194.33 |
| | 3500 | 60 | 919.46 | 39.07 | 58.36 | 200.55 | 195.91 |
| | 4000 | 60 | 908.1 | 38.67 | 57.54 | 201.72 | 196.68 |
| | 500 | 70 | 994.53 | 38.6 | 66.08 | 211.75 | 206.46 |
| | 1000 | 70 | 979.91 | 38 | 64.16 | 210.39 | 205.13 |
| | 1500 | 70 | 965.82 | 37.58 | 62.85 | 210.31 | 205.05 |
| | 2000 | 70 | 952.33 | 35.81 | 61.92 | 215.02 | 209.64 |
| | 2500 | 70 | 939.46 | 37.17 | 61.01 | 211.02 | 205.74 |
| | 3000 | 70 | 927.2 | 36.69 | 60.28 | 212.58 | 207.26 |
| | 3500 | 70 | 915.55 | 36.58 | 59.41 | 212.47 | 207.16 |
| | 4000 | 70 | 904.5 | 36.47 | 58.81 | 213.18 | 207.86 |
| 10 | 500 | 30 | 1041.12 | 46.19 | 72.15 | 195.61 | 190.72 |
| | 1000 | 30 | 1024.53 | 45.85 | 70.34 | 195.02 | 190.14 |
| | 1500 | 30 | 1008.58 | 45.78 | 68.85 | 194.16 | 189.30 |
| | 2000 | 30 | 993.36 | 45.84 | 66.55 | 190.33 | 185.57 |

TABLE 5-continued

| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|---|---|---|---|---|---|---|---|
| | | | 60% $H_2$—30% $N_2$—5% $CH_4$—5% $CO_2$ (Case 3) | | | | |
| | 2500 | 30 | 978.91 | 45.83 | 65.58 | 190.35 | 185.60 |
| | 3000 | 30 | 965.23 | 45.83 | 64.40 | 189.56 | 184.82 |
| | 3500 | 30 | 952.30 | 45.77 | 63.50 | 189.67 | 184.93 |
| | 4000 | 30 | 940.10 | 45.78 | 62.74 | 189.80 | 185.06 |
| | 500 | 40 | 1037.67 | 43.44 | 71.11 | 202.92 | 197.84 |
| | 1000 | 40 | 1021.63 | 41.01 | 69.56 | 209.52 | 204.28 |
| | 1500 | 40 | 1006.19 | 40.66 | 67.67 | 208.03 | 202.83 |
| | 2000 | 40 | 991.45 | 40.32 | 66.26 | 207.78 | 202.59 |
| | 2500 | 40 | 977.43 | 40.46 | 64.65 | 205.20 | 200.07 |
| | 3000 | 40 | 964.14 | 40.05 | 63.73 | 206.31 | 201.15 |
| | 3500 | 40 | 951.60 | 40.07 | 62.94 | 206.39 | 201.23 |
| | 4000 | 40 | 939.70 | 39.95 | 62.12 | 206.67 | 201.50 |
| | 500 | 50 | 1033.09 | 42.79 | 67.99 | 196.97 | 192.04 |
| | 1000 | 50 | 1017.55 | 42.47 | 66.46 | 196.45 | 191.54 |
| | 1500 | 50 | 1002.60 | 41.86 | 64.99 | 196.88 | 191.96 |
| | 2000 | 50 | 988.30 | 40.93 | 63.63 | 198.35 | 193.39 |
| | 2500 | 50 | 974.69 | 40.58 | 62.60 | 198.92 | 193.94 |
| | 3000 | 50 | 961.76 | 40.13 | 61.46 | 199.24 | 194.26 |
| | 3500 | 50 | 949.51 | 39.91 | 60.69 | 200.57 | 195.56 |
| | 4000 | 50 | 937.90 | 39.95 | 60.09 | 200.28 | 195.27 |
| | 500 | 60 | 1028.68 | 33.90 | 68.89 | 226.66 | 220.99 |
| | 1000 | 60 | 1013.61 | 36.40 | 67.27 | 217.84 | 212.39 |
| | 1500 | 60 | 999.10 | 35.78 | 65.40 | 216.53 | 211.11 |
| | 2000 | 60 | 985.22 | 35.35 | 64.59 | 218.04 | 212.59 |
| | 2500 | 60 | 971.99 | 35.23 | 63.28 | 216.87 | 211.45 |
| | 3000 | 60 | 959.41 | 34.33 | 62.51 | 219.42 | 213.94 |
| | 3500 | 60 | 947.46 | 34.01 | 61.48 | 219.31 | 213.82 |
| | 4000 | 60 | 936.10 | 35.05 | 59.97 | 213.85 | 208.50 |
| | 500 | 70 | 1022.93 | 39.92 | 67.34 | 205.88 | 200.73 |
| | 1000 | 70 | 1008.31 | 39.55 | 66.22 | 206.48 | 201.32 |
| | 1500 | 70 | 994.22 | 39.11 | 63.91 | 203.40 | 198.31 |
| | 2000 | 70 | 980.73 | 38.56 | 63.29 | 205.77 | 200.63 |
| | 2500 | 70 | 967.86 | 37.96 | 62.53 | 207.70 | 202.51 |
| | 3000 | 70 | 955.60 | 37.66 | 62.02 | 209.51 | 204.27 |
| | 3500 | 70 | 943.95 | 37.33 | 61.70 | 211.93 | 206.63 |
| | 4000 | 70 | 932.90 | 37.21 | 60.03 | 208.98 | 203.75 |
| 15 | 500 | 30 | 1071.42 | 32.28 | 73.27 | 235.75 | 229.85 |
| | 1000 | 30 | 1054.83 | 32.16 | 70.91 | 232.05 | 226.25 |
| | 1500 | 30 | 1038.88 | 32.28 | 68.77 | 228.21 | 222.50 |
| | 2000 | 30 | 1023.66 | 32.26 | 66.83 | 225.10 | 219.48 |
| | 2500 | 30 | 1009.21 | 32.65 | 65.88 | 224.14 | 218.53 |
| | 3000 | 30 | 995.53 | 32.57 | 65.16 | 224.93 | 219.31 |
| | 3500 | 30 | 982.60 | 32.51 | 64.39 | 225.35 | 219.71 |
| | 4000 | 30 | 970.40 | 32.62 | 64.60 | 224.60 | 218.99 |
| | 500 | 40 | 1067.37 | 38.03 | 72.39 | 217.84 | 212.39 |
| | 1000 | 40 | 1051.33 | 38.03 | 70.28 | 214.72 | 209.35 |
| | 1500 | 40 | 1035.89 | 37.80 | 68.75 | 213.86 | 208.51 |
| | 2000 | 40 | 1021.15 | 37.83 | 67.16 | 211.83 | 206.53 |
| | 2500 | 40 | 1007.13 | 37.71 | 66.16 | 211.92 | 206.62 |
| | 3000 | 40 | 993.84 | 37.73 | 65.05 | 211.08 | 205.80 |
| | 3500 | 40 | 981.30 | 35.66 | 64.59 | 218.07 | 212.62 |
| | 4000 | 40 | 969.40 | 37.66 | 63.72 | 212.19 | 206.88 |
| | 500 | 50 | 1062.69 | 40.59 | 71.32 | 207.82 | 202.62 |
| | 1000 | 50 | 1047.15 | 40.33 | 69.08 | 205.08 | 199.96 |
| | 1500 | 50 | 1032.20 | 40.33 | 67.61 | 203.62 | 198.53 |
| | 2000 | 50 | 1017.90 | 40.45 | 66.53 | 202.82 | 197.75 |
| | 2500 | 50 | 1004.29 | 40.37 | 65.21 | 201.71 | 196.67 |
| | 3000 | 50 | 991.36 | 40.03 | 64.46 | 203.03 | 197.95 |
| | 3500 | 50 | 979.11 | 39.80 | 63.56 | 203.37 | 198.29 |
| | 4000 | 50 | 967.50 | 39.74 | 63.06 | 204.38 | 199.27 |
| | 500 | 60 | 1057.08 | 39.90 | 69.46 | 205.55 | 200.41 |
| | 1000 | 60 | 1042.01 | 39.62 | 67.71 | 204.11 | 199.01 |
| | 1500 | 60 | 1027.50 | 39.38 | 66.16 | 202.96 | 197.89 |
| | 2000 | 60 | 1013.62 | 39.19 | 65.13 | 203.07 | 197.99 |
| | 2500 | 60 | 1000.39 | 39.76 | 64.12 | 200.93 | 195.91 |
| | 3000 | 60 | 987.81 | 39.28 | 63.25 | 202.09 | 197.04 |
| | 3500 | 60 | 975.86 | 38.22 | 62.27 | 204.43 | 199.32 |
| | 4000 | 60 | 964.50 | 38.09 | 61.43 | 204.41 | 199.30 |
| | 500 | 70 | 1050.33 | 38.18 | 68.07 | 207.73 | 202.54 |
| | 1000 | 70 | 1035.71 | 37.85 | 66.17 | 205.71 | 200.57 |
| | 1500 | 70 | 1021.62 | 37.36 | 65.29 | 207.13 | 201.95 |
| | 2000 | 70 | 1008.13 | 37.21 | 64.08 | 206.42 | 201.26 |
| | 2500 | 70 | 995.26 | 36.64 | 63.05 | 207.27 | 202.09 |
| | 3000 | 70 | 983.00 | 36.66 | 62.19 | 206.96 | 201.78 |

TABLE 5-continued

| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|---|---|---|---|---|---|---|---|
| | | | 60% H₂—30% N₂—5% CH₄—5% CO₂ (Case 3) | | | | |
| | 3500 | 70 | 971.35 | 35.07 | 60.65 | 208.36 | 203.16 |
| | 4000 | 70 | 960.30 | 36.68 | 58.78 | 200.17 | 195.16 |
| 20 | 500 | 30 | 1100.72 | 36.29 | 78.13 | 233.31 | 227.48 |
| | 1000 | 30 | 1084.13 | 36.23 | 76.07 | 230.79 | 225.02 |
| | 1500 | 30 | 1068.18 | 36.38 | 74.32 | 228.41 | 222.70 |
| | 2000 | 30 | 1052.96 | 36.63 | 72.16 | 224.25 | 218.65 |
| | 2500 | 30 | 1038.51 | 36.54 | 71.17 | 224.53 | 218.92 |
| | 3000 | 30 | 1024.83 | 36.31 | 69.77 | 223.71 | 218.12 |
| | 3500 | 30 | 1011.90 | 36.43 | 68.59 | 222.39 | 216.83 |
| | 4000 | 30 | 999.70 | 36.43 | 67.75 | 222.33 | 216.77 |
| | 500 | 40 | 1096.27 | 33.98 | 77.40 | 238.74 | 232.77 |
| | 1000 | 40 | 1080.23 | 33.80 | 75.43 | 236.61 | 230.70 |
| | 1500 | 40 | 1064.79 | 33.55 | 73.93 | 235.94 | 230.04 |
| | 2000 | 40 | 1050.05 | 32.99 | 72.27 | 235.40 | 229.52 |
| | 2500 | 40 | 1036.03 | 33.52 | 70.96 | 232.84 | 227.02 |
| | 3000 | 40 | 1022.74 | 33.54 | 69.96 | 232.47 | 226.66 |
| | 3500 | 40 | 1010.20 | 33.12 | 69.15 | 233.77 | 227.93 |
| | 4000 | 40 | 998.30 | 32.83 | 68.21 | 234.13 | 228.28 |
| | 500 | 50 | 1091.59 | 45.67 | 71.61 | 186.91 | 182.24 |
| | 1000 | 50 | 1076.05 | 45.21 | 69.51 | 185.59 | 180.95 |
| | 1500 | 50 | 1061.10 | 44.92 | 68.02 | 185.10 | 180.47 |
| | 2000 | 50 | 1046.80 | 44.32 | 67.09 | 186.99 | 182.32 |
| | 2500 | 50 | 1033.19 | 44.36 | 65.97 | 186.15 | 181.50 |
| | 3000 | 50 | 1020.26 | 44.15 | 64.97 | 186.34 | 181.68 |
| | 3500 | 50 | 1008.01 | 44.01 | 64.39 | 187.34 | 182.66 |
| | 4000 | 50 | 996.40 | 43.80 | 63.55 | 187.70 | 183.01 |
| | 500 | 60 | 1086.28 | 42.13 | 70.62 | 196.59 | 191.67 |
| | 1000 | 60 | 1071.21 | 41.69 | 68.65 | 195.17 | 190.30 |
| | 1500 | 60 | 1056.70 | 41.37 | 67.16 | 194.51 | 189.65 |
| | 2000 | 60 | 1042.82 | 41.02 | 65.93 | 194.50 | 189.64 |
| | 2500 | 60 | 1029.59 | 40.49 | 65.18 | 196.32 | 191.42 |
| | 3000 | 60 | 1017.01 | 40.34 | 64.10 | 195.90 | 191.00 |
| | 3500 | 60 | 1005.06 | 40.44 | 63.52 | 196.14 | 191.24 |
| | 4000 | 60 | 993.70 | 40.32 | 62.85 | 196.65 | 191.74 |
| | 500 | 70 | 1080.03 | 36.93 | 69.00 | 208.25 | 203.04 |
| | 1000 | 70 | 1065.41 | 36.42 | 66.91 | 206.06 | 200.91 |
| | 1500 | 70 | 1051.32 | 36.55 | 65.97 | 205.57 | 200.43 |
| | 2000 | 70 | 1037.83 | 36.71 | 64.89 | 204.39 | 199.28 |
| | 2500 | 70 | 1024.96 | 36.30 | 63.86 | 204.77 | 199.65 |
| | 3000 | 70 | 1012.70 | 36.07 | 63.24 | 205.81 | 200.66 |
| | 3500 | 70 | 1001.05 | 35.55 | 62.18 | 206.09 | 200.94 |
| | 4000 | 70 | 990.00 | 35.51 | 61.18 | 205.11 | 199.98 |

TABLE 6

| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|---|---|---|---|---|---|---|---|
| | | | 50% H₂—40% N₂—5% CH₄—5% CO₂ (Case 4) | | | | |
| 2 | 500 | 30 | 988.86 | 37.59 | 68.63 | 224.27 | 218.66 |
| | 1000 | 30 | 968.76 | 37.96 | 66.12 | 219.43 | 213.95 |
| | 1500 | 30 | 949.40 | 38.27 | 63.98 | 215.74 | 210.35 |
| | 2000 | 30 | 930.91 | 38.17 | 62.11 | 213.90 | 208.55 |
| | 2500 | 30 | 913.37 | 38.51 | 60.94 | 212.92 | 207.59 |
| | 3000 | 30 | 896.8 | 38.34 | 59.73 | 213.02 | 207.7 |
| | 3500 | 30 | 881.1 | 38.34 | 58.77 | 213.23 | 207.99 |
| | 4000 | 30 | 866.4 | 38.03 | 57.94 | 214.79 | 209.42 |
| | 500 | 40 | 985.54 | 38.38 | 67.57 | 219.19 | 213.71 |
| | 1000 | 40 | 966.1 | 37.96 | 65.42 | 217.72 | 212.27 |
| | 1500 | 40 | 947.39 | 37.61 | 63.29 | 215.81 | 210.42 |
| | 2000 | 40 | 929.5 | 37.76 | 61.63 | 213.75 | 208.4 |
| | 2500 | 40 | 912.5 | 37.6 | 60.19 | 213.11 | 207.79 |
| | 3000 | 40 | 896.4 | 37.65 | 59.26 | 213.47 | 208.13 |
| | 3500 | 40 | 881.1 | 37.04 | 58.2 | 215.01 | 209.63 |
| | 4000 | 40 | 866.8 | 36.87 | 57.22 | 215.35 | 209.97 |
| | 500 | 50 | 981.77 | 35.99 | 65.59 | 220.42 | 214.91 |
| | 1000 | 50 | 962.96 | 35.62 | 63.42 | 218.33 | 212.87 |
| | 1500 | 50 | 944.84 | 35.67 | 61.67 | 216.24 | 210.84 |
| | 2000 | 50 | 927.51 | 35.25 | 59.98 | 215.35 | 209.97 |

TABLE 6-continued

| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|---|---|---|---|---|---|---|---|
| | | | 50% H₂—40% N₂—5% CH₄—5% CO₂ (Case 4) | | | | |
| | 2500 | 50 | 911.02 | 34.68 | 59.68 | 219.67 | 214.18 |
| | 3000 | 50 | 895.4 | 35.03 | 58.65 | 218.73 | 213.26 |
| | 3500 | 50 | 880.6 | 34.47 | 57.79 | 220.61 | 215.1 |
| | 4000 | 50 | 866.6 | 34.07 | 56.56 | 220.46 | 214.95 |
| | 500 | 60 | 975.76 | 38.85 | 63.98 | 208.22 | 203.01 |
| | 1000 | 60 | 957.53 | 39.17 | 62.05 | 204.89 | 199.77 |
| | 1500 | 60 | 939.97 | 39.33 | 60.49 | 203 | 197.93 |
| | 2000 | 60 | 923.16 | 39.44 | 59.07 | 201.49 | 196.46 |
| | 2500 | 60 | 907.15 | 38.87 | 58.09 | 203.29 | 198.21 |
| | 3000 | 60 | 891.9 | 38.37 | 57.78 | 207.14 | 201.96 |
| | 3500 | 60 | 877.5 | 37.63 | 56.92 | 209.49 | 204.25 |
| | 4000 | 60 | 863.8 | 37.21 | 56.35 | 211.86 | 206.56 |
| | 500 | 70 | 967.91 | 37.48 | 62.65 | 209.45 | 204.21 |
| | 1000 | 70 | 950.23 | 37.46 | 60.15 | 204.9 | 199.77 |
| | 1500 | 70 | 933.19 | 37.01 | 58.66 | 204.69 | 199.57 |
| | 2000 | 70 | 916.86 | 36.83 | 57.52 | 204.77 | 199.65 |
| | 2500 | 70 | 901.3 | 36.21 | 56.82 | 207.39 | 202.21 |
| | 3000 | 70 | 886.49 | 35.69 | 56.16 | 209.83 | 204.59 |
| | 3500 | 70 | 872.4 | 35.5 | 54.77 | 208.44 | 203.23 |
| | 4000 | 70 | 859.1 | 35.18 | 53.32 | 206.86 | 201.68 |
| 5 | 500 | 30 | 1009.06 | 37.03 | 73.74 | 237.89 | 231.94 |
| | 1000 | 30 | 988.96 | 37.11 | 71.28 | 234.38 | 228.52 |
| | 1500 | 30 | 969.6 | 36.88 | 68.54 | 230.56 | 224.8 |
| | 2000 | 30 | 951.11 | 36.89 | 66.35 | 227.54 | 221.85 |
| | 2500 | 30 | 933.57 | 37.36 | 65.13 | 226.13 | 220.47 |
| | 3000 | 30 | 917 | 37.25 | 63.88 | 226.1 | 220.45 |
| | 3500 | 30 | 901.3 | 36.67 | 62.33 | 226.1 | 220.45 |
| | 4000 | 30 | 886.6 | 36.58 | 61.32 | 226.48 | 220.82 |
| | 500 | 40 | 1005.84 | 44.92 | 64.88 | 186.26 | 181.6 |
| | 1000 | 40 | 986.4 | 45.02 | 62.26 | 181.95 | 177.4 |
| | 1500 | 40 | 967.69 | 44.76 | 60.33 | 180.52 | 176.01 |
| | 2000 | 40 | 949.8 | 44.78 | 58.44 | 178.09 | 173.64 |
| | 2500 | 40 | 932.8 | 44.67 | 57.65 | 179.22 | 174.74 |
| | 3000 | 40 | 916.7 | 44.4 | 56.88 | 180.76 | 176.24 |
| | 3500 | 40 | 901.4 | 44.04 | 55.91 | 181.85 | 177.3 |
| | 4000 | 40 | 887.1 | 43.83 | 55.25 | 183.21 | 178.63 |
| | 500 | 50 | 1001.97 | 45.53 | 66.21 | 188.8 | 184.08 |
| | 1000 | 50 | 983.16 | 45.63 | 63.5 | 184.16 | 179.56 |
| | 1500 | 50 | 965.04 | 45.01 | 61.62 | 184.09 | 179.49 |
| | 2000 | 50 | 947.71 | 44.33 | 61.06 | 187.96 | 183.26 |
| | 2500 | 50 | 931.22 | 43.67 | 59.66 | 188.95 | 184.23 |
| | 3000 | 50 | 915.6 | 42.98 | 58.53 | 190.7 | 185.93 |
| | 3500 | 50 | 900.8 | 42.52 | 57.28 | 191.13 | 186.35 |
| | 4000 | 50 | 886.8 | 42.24 | 56.52 | 192.4 | 187.59 |
| | 500 | 60 | 997.46 | 38.61 | 66.61 | 212.78 | 207.46 |
| | 1000 | 60 | 979.23 | 38.49 | 63.7 | 207.61 | 202.42 |
| | 1500 | 60 | 961.67 | 37.98 | 62.44 | 208.69 | 203.47 |
| | 2000 | 60 | 944.86 | 38.37 | 61.01 | 206.41 | 201.25 |
| | 2500 | 60 | 928.85 | 37.9 | 60.07 | 208.1 | 202.9 |
| | 3000 | 60 | 913.6 | 37.17 | 59.36 | 211.12 | 205.84 |
| | 3500 | 60 | 899.2 | 38.05 | 58.09 | 207.42 | 202.23 |
| | 4000 | 60 | 885.5 | 37.83 | 56.88 | 206.87 | 201.7 |
| | 500 | 70 | 991.41 | 38.6 | 65.87 | 211.75 | 206.46 |
| | 1000 | 70 | 973.73 | 38 | 63.76 | 210.39 | 205.13 |
| | 1500 | 70 | 956.69 | 37.58 | 62.26 | 210.31 | 205.05 |
| | 2000 | 70 | 940.36 | 35.81 | 61.14 | 215.02 | 209.64 |
| | 2500 | 70 | 924.8 | 37.17 | 60.06 | 211.02 | 205.74 |
| | 3000 | 70 | 909.99 | 36.69 | 59.16 | 212.58 | 207.26 |
| | 3500 | 70 | 895.9 | 36.58 | 58.13 | 212.47 | 207.16 |
| | 4000 | 70 | 882.6 | 36.47 | 57.38 | 213.18 | 207.86 |
| 10 | 500 | 30 | 1037.56 | 39.25 | 65.92 | 200.62 | 195.6 |
| | 1000 | 30 | 1017.46 | 38.91 | 63.18 | 197.03 | 192.1 |
| | 1500 | 30 | 998.1 | 39.03 | 61 | 193.59 | 188.75 |
| | 2000 | 30 | 979.61 | 38.76 | 58.42 | 189.62 | 184.88 |
| | 2500 | 30 | 962.07 | 38.85 | 57.37 | 189.36 | 184.63 |
| | 3000 | 30 | 945.5 | 38.94 | 56.02 | 187.92 | 183.23 |
| | 3500 | 30 | 929.8 | 38.85 | 55.16 | 188.42 | 183.71 |
| | 4000 | 30 | 915.1 | 38.97 | 53.99 | 187.04 | 182.37 |
| | 500 | 40 | 1034.24 | 40.22 | 63.34 | 190.7 | 185.93 |
| | 1000 | 40 | 1014.8 | 39.84 | 61.36 | 189.3 | 184.57 |
| | 1500 | 40 | 996.09 | 39.68 | 58.58 | 184.55 | 179.94 |
| | 2000 | 40 | 978.2 | 39.43 | 57.7 | 185.79 | 181.15 |
| | 2500 | 40 | 961.2 | 39.49 | 56.81 | 186 | 181.35 |
| | 3000 | 40 | 945.1 | 39.1 | 55.95 | 187.33 | 182.64 |

TABLE 6-continued

| | | | 50% H$_2$—40% N$_2$—5% CH$_4$—5% CO$_2$ (Case 4) | | | | |
|---|---|---|---|---|---|---|---|
| Salinity (wt. %) | Pressure (psi) | Temperature (° C.) | Δρ (kg/m³) | CA (o) | ST (mN/m) | h$_{seal}$ (m) | h$_{(seal/res)}$ (m) |
| | 3500 | 40 | 929.8 | 38.54 | 54.73 | 187.72 | 183.03 |
| | 4000 | 40 | 915.5 | 38.42 | 54.08 | 188.7 | 183.99 |
| | 500 | 50 | 1029.77 | 35.21 | 66.5 | 215.17 | 209.79 |
| | 1000 | 50 | 1010.96 | 33.15 | 63.8 | 215.46 | 210.07 |
| | 1500 | 50 | 992.84 | 33.19 | 61.5 | 211.36 | 206.08 |
| | 2000 | 50 | 975.51 | 33.05 | 59.91 | 209.89 | 204.64 |
| | 2500 | 50 | 959.02 | 33.06 | 58.56 | 208.69 | 203.48 |
| | 3000 | 50 | 943.4 | 32.93 | 57.72 | 209.39 | 204.15 |
| | 3500 | 50 | 928.6 | 32.41 | 57.06 | 211.53 | 206.24 |
| | 4000 | 50 | 914.6 | 31.65 | 55.95 | 212.36 | 207.05 |
| | 500 | 60 | 1025.46 | 37.34 | 65.59 | 202.37 | 202.18 |
| | 1000 | 60 | 1007.23 | 36.4 | 62.61 | 204.01 | 198.91 |
| | 1500 | 60 | 989.67 | 35.82 | 60.64 | 202.59 | 197.53 |
| | 2000 | 60 | 972.86 | 35.58 | 59.56 | 203.06 | 197.98 |
| | 2500 | 60 | 956.85 | 35.95 | 58.2 | 200.78 | 195.76 |
| | 3000 | 60 | 941.6 | 35.21 | 56.94 | 201.47 | 196.44 |
| | 3500 | 60 | 927.2 | 34.92 | 56.45 | 203.57 | 198.49 |
| | 4000 | 60 | 913.5 | 34.48 | 55.41 | 203.91 | 198.82 |
| | 500 | 70 | 1019.81 | 43.01 | 63.35 | 185.21 | 180.58 |
| | 1000 | 70 | 1002.13 | 42.23 | 61.04 | 183.9 | 179.3 |
| | 1500 | 70 | 985.09 | 42.13 | 58.92 | 180.9 | 176.38 |
| | 2000 | 70 | 968.76 | 41.08 | 57.51 | 182.47 | 177.91 |
| | 2500 | 70 | 953.2 | 40.55 | 56.62 | 184.06 | 179.46 |
| | 3000 | 70 | 938.39 | 39.92 | 56.05 | 186.8 | 182.13 |
| | 3500 | 70 | 924.3 | 39.17 | 54.8 | 187.44 | 182.75 |
| | 4000 | 70 | 911 | 39.06 | 54.25 | 188.55 | 183.84 |
| 15 | 500 | 30 | 1067.86 | 36.68 | 71.41 | 218.68 | 213.21 |
| | 1000 | 30 | 1047.76 | 39.07 | 69.49 | 209.95 | 204.71 |
| | 1500 | 30 | 1028.4 | 39.51 | 67.32 | 205.92 | 200.77 |
| | 2000 | 30 | 1009.91 | 39.34 | 65.41 | 204.27 | 199.16 |
| | 2500 | 30 | 992.37 | 39.46 | 64.27 | 203.9 | 198.8 |
| | 3000 | 30 | 975.8 | 39.52 | 62.79 | 202.41 | 197.35 |
| | 3500 | 30 | 960.1 | 39.21 | 61.74 | 203.19 | 198.11 |
| | 4000 | 30 | 945.4 | 39.27 | 60.7 | 202.71 | 197.64 |
| | 500 | 40 | 1063.94 | 34.94 | 71.1 | 223.37 | 217.79 |
| | 1000 | 40 | 1044.5 | 34.74 | 68.75 | 220.55 | 215.03 |
| | 1500 | 40 | 1025.79 | 34.51 | 66.83 | 218.91 | 213.44 |
| | 2000 | 40 | 1007.9 | 34.53 | 65.31 | 217.67 | 212.23 |
| | 2500 | 40 | 990.9 | 34.46 | 63.67 | 216.01 | 210.61 |
| | 3000 | 40 | 974.8 | 34.23 | 62.87 | 217.43 | 211.99 |
| | 3500 | 40 | 959.5 | 34.2 | 61.86 | 217.41 | 211.98 |
| | 4000 | 40 | 945.2 | 33.82 | 60.92 | 218.34 | 212.88 |
| | 500 | 50 | 1059.37 | 37.66 | 67.85 | 206.75 | 201.59 |
| | 1000 | 50 | 1040.56 | 37.98 | 65.62 | 202.7 | 197.63 |
| | 1500 | 50 | 1022.44 | 37.59 | 63.9 | 201.93 | 196.88 |
| | 2000 | 50 | 1005.11 | 37.11 | 62.48 | 202.16 | 197.11 |
| | 2500 | 50 | 988.62 | 36.68 | 61.54 | 203.55 | 198.46 |
| | 3000 | 50 | 973 | 36.25 | 60.55 | 204.65 | 199.53 |
| | 3500 | 50 | 958.2 | 36.32 | 60 | 205.73 | 200.58 |
| | 4000 | 50 | 944.2 | 36.35 | 58.76 | 204.37 | 199.26 |
| | 500 | 60 | 1053.86 | 37.34 | 67.29 | 207 | 201.83 |
| | 1000 | 60 | 1035.63 | 36.87 | 65.34 | 205.83 | 200.68 |
| | 1500 | 60 | 1018.07 | 36.75 | 63.86 | 204.96 | 199.84 |
| | 2000 | 60 | 1001.26 | 36.45 | 62.62 | 205.14 | 200.01 |
| | 2500 | 60 | 985.25 | 36.51 | 61.34 | 204.07 | 198.97 |
| | 3000 | 60 | 970 | 35.85 | 60.63 | 206.59 | 201.42 |
| | 3500 | 60 | 955.6 | 35.11 | 59.65 | 208.21 | 203.01 |
| | 4000 | 60 | 941.9 | 35.44 | 58.6 | 206.69 | 201.52 |
| | 500 | 70 | 1047.21 | 33.89 | 66.8 | 215.9 | 210.5 |
| | 1000 | 70 | 1029.53 | 33.5 | 64.56 | 213.21 | 207.88 |
| | 1500 | 70 | 1012.49 | 33.1 | 63.01 | 212.58 | 207.27 |
| | 2000 | 70 | 996.16 | 32.44 | 62.3 | 215.22 | 209.84 |
| | 2500 | 70 | 980.6 | 32.13 | 61.3 | 215.85 | 210.46 |
| | 3000 | 70 | 965.79 | 31.6 | 60.51 | 217.6 | 212.16 |
| | 3500 | 70 | 951.7 | 31.36 | 59.52 | 217.75 | 212.31 |
| | 4000 | 70 | 938.4 | 31.14 | 58.73 | 218.41 | 212.95 |
| 20 | 500 | 30 | 1097.16 | 30.51 | 75.81 | 242.74 | 236.67 |
| | 1000 | 30 | 1077.06 | 32.75 | 72.75 | 231.66 | 225.87 |
| | 1500 | 30 | 1057.7 | 32.57 | 70.57 | 229.62 | 223.53 |
| | 2000 | 30 | 1039.21 | 32.66 | 68.44 | 226.09 | 220.44 |
| | 2500 | 30 | 1021.67 | 33.06 | 67.29 | 225.08 | 219.46 |
| | 3000 | 30 | 1005.1 | 32.6 | 65.85 | 225.08 | 219.45 |
| | 3500 | 30 | 989.4 | 32.68 | 64.82 | 224.84 | 219.22 |
| | 4000 | 30 | 974.7 | 32.69 | 63.8 | 224.64 | 219.03 |

TABLE 6-continued

| | | | 50% H$_2$—40% N$_2$—5% CH$_4$—5% CO$_2$ (Case 4) | | | | |
|---|---|---|---|---|---|---|---|
| Salinity (wt. %) | Pressure (psi) | Temperature (° C.) | Δρ (kg/m³) | CA (o) | ST (mN/m) | h$_{seal}$ (m) | h$_{(seal/res)}$ (m) |
| | 500 | 40 | 1092.84 | 34.2 | 74.53 | 230 | 224.25 |
| | 1000 | 40 | 1073.4 | 35.14 | 72.03 | 223.75 | 218.15 |
| | 1500 | 40 | 1054.69 | 34.6 | 69.76 | 222.01 | 216.46 |
| | 2000 | 40 | 1036.8 | 34.72 | 68.4 | 221.1 | 215.58 |
| | 2500 | 40 | 1019.8 | 34.72 | 66.59 | 218.85 | 213.37 |
| | 3000 | 40 | 1003.7 | 35.26 | 65.41 | 217 | 211.57 |
| | 3500 | 40 | 988.4 | 35.26 | 64.55 | 217.43 | 211.99 |
| | 4000 | 40 | 974.1 | 34.94 | 63.57 | 218.16 | 212.7 |
| | 500 | 50 | 1088.27 | 38.01 | 69.69 | 205.75 | 200.6 |
| | 1000 | 50 | 1069.46 | 36.83 | 67.09 | 204.76 | 199.64 |
| | 1500 | 50 | 1051.34 | 36.05 | 65.5 | 205.39 | 200.26 |
| | 2000 | 50 | 1034.01 | 36.61 | 64.27 | 203.45 | 198.36 |
| | 2500 | 50 | 1017.52 | 36.41 | 63.05 | 203.35 | 198.27 |
| | 3000 | 50 | 1001.9 | 36.16 | 61.66 | 202.6 | 197.54 |
| | 3500 | 50 | 987.1 | 35.84 | 60.7 | 203.29 | 198.21 |
| | 4000 | 50 | 973.1 | 36.13 | 59.55 | 201.54 | 196.5 |
| | 500 | 60 | 1083.06 | 39.93 | 68.12 | 196.68 | 191.76 |
| | 1000 | 60 | 1064.83 | 38.51 | 66.01 | 197.79 | 192.85 |
| | 1500 | 60 | 1047.27 | 38.17 | 64.73 | 198.16 | 193.2 |
| | 2000 | 60 | 1030.46 | 37.83 | 63.17 | 197.41 | 192.48 |
| | 2500 | 60 | 1014.45 | 37.73 | 62.3 | 198.06 | 193.11 |
| | 3000 | 60 | 999.2 | 37.42 | 61.07 | 197.92 | 192.98 |
| | 3500 | 60 | 984.8 | 37 | 59.74 | 197.56 | 192.62 |
| | 4000 | 60 | 971.1 | 36.8 | 59.2 | 199.05 | 194.07 |
| | 500 | 70 | 1076.91 | 33.6 | 70.84 | 223.41 | 217.82 |
| | 1000 | 70 | 1059.23 | 33.51 | 68.19 | 218.87 | 213.4 |
| | 1500 | 70 | 1042.19 | 32.82 | 66.43 | 218.41 | 212.95 |
| | 2000 | 70 | 1025.86 | 32.51 | 65.32 | 218.95 | 213.48 |
| | 2500 | 70 | 1010.3 | 31.64 | 64.35 | 221.1 | 215.57 |
| | 3000 | 70 | 995.49 | 31.26 | 62.98 | 220.51 | 215 |
| | 3500 | 70 | 981.4 | 30.66 | 62.29 | 222.65 | 217.08 |
| | 4000 | 70 | 968.1 | 31 | 61.28 | 221.25 | 215.72 |

TABLE 7

| | | | 40% H$_2$—50% N$_2$—5% CH$_4$—5% CO$_2$ (Case 5) | | | | |
|---|---|---|---|---|---|---|---|
| Salinity (wt. %) | Pressure (psi) | Temperature (° C.) | Δρ (kg/m³) | CA (o) | ST (mN/m) | h$_{seal}$ (m) | h$_{(seal/res)}$ (m) |
| 2 | 500 | 30 | 985.28 | 31.68 | 68.65 | 241.78 | 235.74 |
| | 1000 | 30 | 961.6 | 31.13 | 66.16 | 240.16 | 234.16 |
| | 1500 | 30 | 938.73 | 31.01 | 64.14 | 238.81 | 232.84 |
| | 2000 | 30 | 916.88 | 30.84 | 62.75 | 239.61 | 233.62 |
| | 2500 | 30 | 896.1 | 30.96 | 61.33 | 239.31 | 233.32 |
| | 3000 | 30 | 876.5 | 31.35 | 60.17 | 239.04 | 233.07 |
| | 3500 | 30 | 858.1 | 31.01 | 59.29 | 241.46 | 235.42 |
| | 4000 | 30 | 840.8 | 31.03 | 57.8 | 240.22 | 234.21 |
| | 500 | 40 | 982.08 | 37.07 | 68.04 | 225.43 | 219.79 |
| | 1000 | 40 | 959.21 | 37.01 | 65.8 | 223.34 | 217.76 |
| | 1500 | 40 | 937.13 | 37.25 | 64.06 | 221.87 | 216.32 |
| | 2000 | 40 | 916.01 | 37.73 | 62.34 | 219.47 | 213.98 |
| | 2500 | 40 | 895.9 | 38.2 | 61.15 | 218.75 | 213.28 |
| | 3000 | 40 | 877 | 37.64 | 59.86 | 220.39 | 214.88 |
| | 3500 | 40 | 859 | 37.8 | 58.54 | 219.56 | 214.08 |
| | 4000 | 40 | 842.2 | 37.2 | 57.61 | 222.18 | 216.62 |
| | 500 | 50 | 978.42 | 34.37 | 63.65 | 218.98 | 213.5 |
| | 1000 | 50 | 956.3 | 34.17 | 61.35 | 216.44 | 211.03 |
| | 1500 | 50 | 934.95 | 34.22 | 60.19 | 217.08 | 211.65 |
| | 2000 | 50 | 914.51 | 34.16 | 58.78 | 216.87 | 211.45 |
| | 2500 | 50 | 895.1 | 33.9 | 57.79 | 218.51 | 213.05 |
| | 3000 | 50 | 876.7 | 33.52 | 56.75 | 220.04 | 214.54 |
| | 3500 | 50 | 859.2 | 33.93 | 55.51 | 218.58 | 213.12 |
| | 4000 | 50 | 842.8 | 33.58 | 54.27 | 218.73 | 213.26 |
| | 500 | 60 | 972.52 | 36.94 | 63.56 | 213 | 207.67 |
| | 1000 | 60 | 951.1 | 36.73 | 62.59 | 215.06 | 209.68 |
| | 1500 | 60 | 930.42 | 36.76 | 62.39 | 219.06 | 213.58 |
| | 2000 | 60 | 910.62 | 36.62 | 59.96 | 215.49 | 210.11 |
| | 2500 | 60 | 891.8 | 36.82 | 58.46 | 213.97 | 208.62 |
| | 3000 | 60 | 873.9 | 36.43 | 57.73 | 216.75 | 211.33 |

TABLE 7-continued

| 40% $H_2$—50% $N_2$—5% $CH_4$—5% $CO_2$ (Case 5) | | | | | | | |
|---|---|---|---|---|---|---|---|
| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
| | 3500 | 60 | 856.9 | 36.34 | 56.35 | 216 | 210.6 |
| | 4000 | 60 | 840.9 | 36.31 | 55.32 | 216.19 | 210.78 |
| | 500 | 70 | 964.78 | 35.77 | 60.95 | 209.04 | 203.82 |
| | 1000 | 70 | 944 | 35.26 | 57.55 | 202.98 | 197.91 |
| | 1500 | 70 | 923.96 | 35.17 | 54.84 | 197.84 | 192.9 |
| | 2000 | 70 | 904.75 | 34.97 | 52.01 | 192.09 | 187.28 |
| | 2500 | 70 | 886.44 | 34.73 | 50.11 | 189.43 | 184.7 |
| | 3000 | 70 | 869 | 34.41 | 47.22 | 182.8 | 178.23 |
| | 3500 | 70 | 852.5 | 34.08 | 45.76 | 181.26 | 176.73 |
| | 4000 | 70 | 836.9 | 34.14 | 43.44 | 175.17 | 170.79 |
| 5 | 500 | 30 | 985.28 | 38.61 | 62.64 | 202.59 | 197.53 |
| | 1000 | 30 | 961.6 | 38.37 | 60.28 | 200.42 | 195.41 |
| | 1500 | 30 | 938.73 | 38.43 | 59.07 | 200.98 | 195.96 |
| | 2000 | 30 | 916.88 | 38.93 | 57.57 | 199.18 | 194.2 |
| | 2500 | 30 | 896.1 | 38.11 | 56.27 | 201.47 | 196.44 |
| | 3000 | 30 | 876.5 | 38.54 | 54.93 | 199.91 | 194.91 |
| | 3500 | 30 | 858.1 | 38.49 | 54.16 | 201.43 | 196.39 |
| | 4000 | 30 | 840.8 | 38.28 | 52.9 | 201.38 | 196.35 |
| | 500 | 40 | 982.08 | 40.87 | 64.84 | 203.6 | 198.51 |
| | 1000 | 40 | 959.21 | 41.62 | 61.13 | 194.28 | 189.43 |
| | 1500 | 40 | 937.13 | 42.03 | 58.4 | 188.78 | 184.07 |
| | 2000 | 40 | 916.01 | 42.16 | 56.76 | 187.32 | 182.63 |
| | 2500 | 40 | 895.9 | 41.91 | 54.52 | 184.66 | 180.04 |
| | 3000 | 40 | 877 | 41.62 | 53.15 | 184.73 | 180.11 |
| | 3500 | 40 | 859 | 41.36 | 51.4 | 183.15 | 178.57 |
| | 4000 | 40 | 842.2 | 41.41 | 50.06 | 181.78 | 177.23 |
| | 500 | 50 | 978.42 | 32.76 | 59.18 | 207.39 | 202.21 |
| | 1000 | 50 | 956.3 | 33.26 | 56.48 | 201.36 | 196.33 |
| | 1500 | 50 | 934.95 | 32.97 | 53.88 | 197.15 | 192.22 |
| | 2000 | 50 | 914.51 | 32.69 | 52.86 | 198.34 | 193.38 |
| | 2500 | 50 | 895.1 | 32.59 | 52 | 199.57 | 194.58 |
| | 3000 | 50 | 876.7 | 32.17 | 50.12 | 197.32 | 192.38 |
| | 3500 | 50 | 859.2 | 32.18 | 47.62 | 191.28 | 186.5 |
| | 4000 | 50 | 842.8 | 33.53 | 45.83 | 184.82 | 180.2 |
| | 500 | 60 | 972.52 | 35.33 | 60.36 | 206.48 | 201.31 |
| | 1000 | 60 | 951.1 | 35.31 | 59.21 | 207.15 | 201.97 |
| | 1500 | 60 | 930.42 | 35.23 | 57.41 | 205.53 | 200.4 |
| | 2000 | 60 | 910.62 | 35.66 | 56.17 | 204.36 | 199.25 |
| | 2500 | 60 | 891.8 | 35.6 | 55.38 | 205.91 | 200.76 |
| | 3000 | 60 | 873.9 | 35.45 | 54.24 | 206.18 | 201.02 |
| | 3500 | 60 | 856.9 | 35.13 | 53.3 | 207.41 | 202.23 |
| | 4000 | 60 | 840.9 | 34.73 | 52.4 | 208.81 | 203.59 |
| | 500 | 70 | 964.78 | 33.41 | 57.61 | 203.27 | 198.19 |
| | 1000 | 70 | 944 | 33.16 | 55.12 | 199.32 | 194.34 |
| | 1500 | 70 | 923.96 | 31.66 | 54.27 | 203.86 | 198.76 |
| | 2000 | 70 | 904.75 | 32.92 | 52.61 | 199.05 | 194.08 |
| | 2500 | 70 | 886.44 | 32.58 | 51.8 | 200.78 | 195.76 |
| | 3000 | 70 | 869 | 31.99 | 50.97 | 202.83 | 197.76 |
| | 3500 | 70 | 852.5 | 31.9 | 50.56 | 205.3 | 200.17 |
| | 4000 | 70 | 836.9 | 31.83 | 48.14 | 199.27 | 194.29 |
| 10 | 500 | 30 | 985.28 | 36.07 | 67.38 | 225.4 | 219.76 |
| | 1000 | 30 | 961.6 | 36.28 | 65.35 | 223.39 | 217.8 |
| | 1500 | 30 | 938.73 | 36.27 | 63.18 | 221.27 | 215.74 |
| | 2000 | 30 | 916.88 | 36.35 | 62.09 | 222.4 | 216.84 |
| | 2500 | 30 | 896.1 | 36.31 | 60.68 | 222.51 | 216.95 |
| | 3000 | 30 | 876.5 | 36.14 | 59.53 | 223.66 | 218.07 |
| | 3500 | 30 | 858.1 | 36.28 | 58.45 | 223.91 | 218.31 |
| | 4000 | 30 | 840.8 | 36.09 | 57.27 | 224.42 | 218.81 |
| | 500 | 40 | 982.08 | 34.65 | 63.39 | 216.52 | 211.11 |
| | 1000 | 40 | 959.21 | 34.55 | 61.27 | 214.53 | 209.17 |
| | 1500 | 40 | 937.13 | 35.53 | 59.91 | 212.15 | 206.85 |
| | 2000 | 40 | 916.01 | 35.6 | 59.1 | 213.91 | 208.56 |
| | 2500 | 40 | 895.9 | 34.97 | 57.17 | 213.24 | 207.91 |
| | 3000 | 40 | 877 | 35.18 | 56.14 | 213.36 | 208.02 |
| | 3500 | 40 | 859 | 34.56 | 55.08 | 213.51 | 209.93 |
| | 4000 | 40 | 842.2 | 35.09 | 54.17 | 214.61 | 209.25 |
| | 500 | 50 | 978.42 | 30.69 | 61.69 | 221.09 | 215.56 |
| | 1000 | 50 | 956.3 | 30.39 | 59.95 | 220.5 | 214.99 |
| | 1500 | 50 | 934.95 | 30.44 | 59.2 | 222.59 | 217.03 |
| | 2000 | 50 | 914.51 | 30.08 | 57.43 | 221.58 | 216.04 |
| | 2500 | 50 | 895.1 | 29.95 | 55.92 | 220.75 | 215.23 |
| | 3000 | 50 | 876.7 | 29.87 | 54.58 | 220.12 | 214.62 |
| | 3500 | 50 | 859.2 | 29.29 | 53.91 | 223.15 | 217.57 |
| | 4000 | 50 | 842.8 | 29.13 | 52.84 | 223.31 | 217.73 |
| | 500 | 60 | 972.52 | 31.31 | 61.79 | 221.33 | 215.8 |
| | 1000 | 60 | 951.1 | 30.88 | 59.63 | 219.43 | 213.95 |
| | 1500 | 60 | 930.42 | 30.6 | 59.16 | 223.17 | 217.6 |
| | 2000 | 60 | 910.62 | 30.35 | 57.43 | 221.92 | 216.37 |
| | 2500 | 60 | 891.8 | 30.25 | 56.37 | 222.62 | 217.06 |
| | 3000 | 60 | 873.9 | 30.08 | 54.99 | 222.04 | 216.49 |
| | 3500 | 60 | 856.9 | 30.19 | 53.94 | 221.85 | 216.31 |
| | 4000 | 60 | 840.9 | 30.11 | 53.1 | 222.75 | 217.18 |
| | 500 | 70 | 964.78 | 31.22 | 58.29 | 210.7 | 205.43 |
| | 1000 | 70 | 944 | 30.56 | 54.7 | 203.44 | 198.35 |
| | 1500 | 70 | 923.96 | 30.69 | 52.2 | 198.11 | 193.16 |
| | 2000 | 70 | 904.75 | 29.75 | 49.54 | 193.85 | 189.01 |
| | 2500 | 70 | 886.44 | 29.79 | 47.01 | 187.66 | 182.97 |
| | 3000 | 70 | 869 | 29.62 | 45.8 | 186.82 | 182.15 |
| | 3500 | 70 | 852.5 | 29.52 | 43.56 | 181.3 | 176.76 |
| | 4000 | 70 | 836.9 | 31.62 | 41.99 | 174.2 | 169.84 |
| 15 | 500 | 30 | 985.28 | 36.43 | 69.09 | 230.05 | 224.3 |
| | 1000 | 30 | 961.6 | 36.17 | 66.27 | 226.83 | 221.16 |
| | 1500 | 30 | 938.73 | 35.97 | 63.45 | 223.07 | 217.49 |
| | 2000 | 30 | 916.88 | 35.7 | 59.94 | 216.47 | 211.06 |
| | 2500 | 30 | 896.1 | 35.7 | 58.58 | 216.48 | 211.06 |
| | 3000 | 30 | 876.5 | 35.77 | 57.15 | 215.71 | 210.32 |
| | 3500 | 30 | 858.1 | 35.67 | 56.06 | 216.42 | 211.01 |
| | 4000 | 30 | 840.8 | 35.76 | 54.94 | 216.23 | 210.83 |
| | 500 | 40 | 982.08 | 30.15 | 67.8 | 243.42 | 237.33 |
| | 1000 | 40 | 959.21 | 29.82 | 64.46 | 237.74 | 231.8 |
| | 1500 | 40 | 937.13 | 29.52 | 62.41 | 236.32 | 230.41 |
| | 2000 | 40 | 916.01 | 29.63 | 59.96 | 232.01 | 226.21 |
| | 2500 | 40 | 895.9 | 29.16 | 58.14 | 231.08 | 225.3 |
| | 3000 | 40 | 877 | 29.24 | 56.56 | 229.5 | 223.76 |
| | 3500 | 40 | 859 | 29.24 | 55.31 | 229.08 | 223.36 |
| | 4000 | 40 | 842.2 | 29.25 | 54.12 | 228.6 | 222.89 |
| | 500 | 50 | 978.42 | 28.03 | 69.02 | 253.9 | 247.56 |
| | 1000 | 50 | 956.3 | 27.15 | 65.86 | 249.87 | 243.62 |
| | 1500 | 50 | 934.95 | 26.48 | 63.51 | 247.91 | 241.71 |
| | 2000 | 50 | 914.51 | 26.07 | 61.39 | 245.86 | 239.71 |
| | 2500 | 50 | 895.1 | 25.54 | 59.56 | 244.8 | 238.68 |
| | 3000 | 50 | 876.7 | 25.37 | 57.67 | 242.35 | 236.3 |
| | 3500 | 50 | 859.2 | 25.2 | 56.67 | 243.35 | 237.27 |
| | 4000 | 50 | 842.8 | 25.03 | 55.64 | 243.92 | 237.82 |
| | 500 | 60 | 972.52 | 32.07 | 66.83 | 237.44 | 231.5 |
| | 1000 | 60 | 951.1 | 31.79 | 64.44 | 234.83 | 228.96 |
| | 1500 | 60 | 930.42 | 31.53 | 62.26 | 232.57 | 226.75 |
| | 2000 | 60 | 910.62 | 31.27 | 60.16 | 230.24 | 224.48 |
| | 2500 | 60 | 891.8 | 31.07 | 58.21 | 227.97 | 222.27 |
| | 3000 | 60 | 873.9 | 31.24 | 56.49 | 225.34 | 219.71 |
| | 3500 | 60 | 856.9 | 31.02 | 55.01 | 224.33 | 218.72 |
| | 4000 | 60 | 840.9 | 31.12 | 53.77 | 223.22 | 217.64 |
| | 500 | 70 | 964.78 | 31.89 | 66.6 | 238.98 | 233.01 |
| | 1000 | 70 | 944 | 31.26 | 64.05 | 236.48 | 230.57 |
| | 1500 | 70 | 923.96 | 29.91 | 61.89 | 236.76 | 230.84 |
| | 2000 | 70 | 904.75 | 28.63 | 60.24 | 238.29 | 232.33 |
| | 2500 | 70 | 886.44 | 28.04 | 57.78 | 234.59 | 228.73 |
| | 3000 | 70 | 869 | 27.56 | 55.91 | 232.59 | 226.78 |
| | 3500 | 70 | 852.5 | 27.39 | 54.54 | 231.63 | 225.84 |
| | 4000 | 70 | 836.9 | 29.95 | 52.95 | 223.53 | 217.94 |
| 20 | 500 | 30 | 985.28 | 32.86 | 66.73 | 231.99 | 226.19 |
| | 1000 | 30 | 961.6 | 32.39 | 66.56 | 238.34 | 232.38 |
| | 1500 | 30 | 938.73 | 32.5 | 64.95 | 237.93 | 231.98 |
| | 2000 | 30 | 916.88 | 32.75 | 62.61 | 234.21 | 228.36 |
| | 2500 | 30 | 896.1 | 32.61 | 62.2 | 238.43 | 232.47 |
| | 3000 | 30 | 876.5 | 32.9 | 60.79 | 237.46 | 231.53 |
| | 3500 | 30 | 858.1 | 32.46 | 60.17 | 241.27 | 235.24 |
| | 4000 | 30 | 840.8 | 32.43 | 58.73 | 240.4 | 234.39 |
| | 500 | 40 | 982.08 | 36.97 | 67.99 | 225.56 | 219.92 |
| | 1000 | 40 | 959.21 | 38.17 | 65.93 | 220.35 | 214.84 |
| | 1500 | 40 | 937.13 | 37.89 | 64.48 | 221.41 | 215.87 |
| | 2000 | 40 | 916.01 | 37.93 | 62.34 | 218.92 | 213.44 |
| | 2500 | 40 | 895.9 | 37.73 | 61.97 | 223.09 | 217.51 |
| | 3000 | 40 | 877 | 38.22 | 61.47 | 224.55 | 218.94 |
| | 3500 | 40 | 859 | 38.2 | 59.87 | 223.34 | 217.76 |
| | 4000 | 40 | 842.2 | 37.7 | 58.35 | 223.52 | 217.93 |
| | 500 | 50 | 978.42 | 38.83 | 60.72 | 197.16 | 192.23 |
| | 1000 | 50 | 956.3 | 39.17 | 58.71 | 194.08 | 189.23 |

TABLE 7-continued

| 40% H₂—50% N₂—5% CH₄—5% CO₂ (Case 5) | | | | | | | |
|---|---|---|---|---|---|---|---|
| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
|  | 1500 | 50 | 934.95 | 39.17 | 57.37 | 193.98 | 189.13 |
|  | 2000 | 50 | 914.51 | 38.97 | 55.99 | 194.13 | 189.28 |
|  | 2500 | 50 | 895.1 | 38.86 | 54.78 | 194.32 | 189.46 |
|  | 3000 | 50 | 876.7 | 39.32 | 53.52 | 192.59 | 187.78 |
|  | 3500 | 50 | 859.2 | 38.82 | 51.65 | 191 | 186.22 |
|  | 4000 | 50 | 842.8 | 39.03 | 49.74 | 186.94 | 182.26 |
|  | 500 | 60 | 972.52 | 34.53 | 61.5 | 212.43 | 207.12 |
|  | 1000 | 60 | 951.1 | 34.91 | 59.52 | 209.28 | 204.05 |
|  | 1500 | 60 | 930.42 | 34.81 | 58.2 | 209.45 | 204.21 |
|  | 2000 | 60 | 910.62 | 34.87 | 56.73 | 208.42 | 203.21 |
|  | 2500 | 60 | 891.8 | 34.37 | 55.88 | 210.89 | 205.61 |
|  | 3000 | 60 | 873.9 | 34.42 | 55.1 | 212.08 | 206.78 |
|  | 3500 | 60 | 856.9 | 34.26 | 54.1 | 212.79 | 207.47 |
|  | 4000 | 60 | 840.9 | 34.07 | 53.02 | 212.97 | 207.65 |
|  | 500 | 70 | 964.78 | 34.89 | 66.6 | 230.87 | 225.1 |
|  | 1000 | 70 | 944 | 34.26 | 64.05 | 228.65 | 222.93 |
|  | 1500 | 70 | 923.96 | 32.91 | 61.89 | 229.31 | 223.58 |
|  | 2000 | 70 | 904.75 | 31.63 | 60.24 | 231.15 | 225.38 |
|  | 2500 | 70 | 886.44 | 31.04 | 57.78 | 227.73 | 222.04 |
|  | 3000 | 70 | 869 | 30.56 | 55.91 | 225.92 | 220.28 |
|  | 3500 | 70 | 852.5 | 30.39 | 54.54 | 225.04 | 219.41 |
|  | 4000 | 70 | 836.9 | 32.2 | 52.95 | 218.3 | 212.84 |

TABLE 8

| 30% H₂—60% N₂—5% CH₄—5% CO₂ (Case 6) | | | | | | | |
|---|---|---|---|---|---|---|---|
| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
| 2 | 500 | 30 | 981.67 | 34.85 | 68.88 | 234.83 | 228.96 |
|  | 1000 | 30 | 954.32 | 34.5 | 68.02 | 239.53 | 233.54 |
|  | 1500 | 30 | 927.83 | 35.04 | 65.8 | 236.77 | 230.85 |
|  | 2000 | 30 | 902.5 | 35.2 | 64.43 | 237.88 | 231.94 |
|  | 2500 | 30 | 878.4 | 34.94 | 62.71 | 238.63 | 232.67 |
|  | 3000 | 30 | 855.7 | 35.56 | 61.5 | 238.52 | 232.55 |
|  | 3500 | 30 | 834.3 | 35.96 | 61.09 | 241.7 | 235.66 |
|  | 4000 | 30 | 814.3 | 35.59 | 59.04 | 240.43 | 234.42 |
|  | 500 | 40 | 978.6 | 37.53 | 64.49 | 213.12 | 207.79 |
|  | 1000 | 40 | 952.21 | 38.1 | 62.22 | 209.71 | 204.46 |
|  | 1500 | 40 | 926.66 | 38.81 | 61.44 | 210.66 | 205.4 |
|  | 2000 | 40 | 902.2 | 38.97 | 60.03 | 210.94 | 205.66 |
|  | 2500 | 40 | 878.9 | 39.06 | 58.98 | 212.49 | 207.18 |
|  | 3000 | 40 | 857 | 38.26 | 58.42 | 218.27 | 212.82 |
|  | 3500 | 40 | 836.3 | 37.97 | 57.81 | 222.2 | 216.64 |
|  | 4000 | 40 | 816.8 | 38.47 | 56.82 | 222.08 | 216.53 |
|  | 500 | 50 | 975.06 | 36.11 | 67.99 | 229.7 | 223.96 |
|  | 1000 | 50 | 949.56 | 36.05 | 66.19 | 229.8 | 224.05 |
|  | 1500 | 50 | 924.89 | 36.15 | 64.24 | 228.69 | 222.97 |
|  | 2000 | 50 | 901.25 | 35.85 | 63 | 231.03 | 225.26 |
|  | 2500 | 50 | 878.8 | 35.53 | 61.79 | 233.33 | 227.5 |
|  | 3000 | 50 | 857.5 | 36.05 | 60.14 | 231.21 | 225.43 |
|  | 3500 | 50 | 837.4 | 36.05 | 59.49 | 234.23 | 228.38 |
|  | 4000 | 50 | 818.5 | 35.77 | 57.81 | 233.67 | 227.83 |
|  | 500 | 60 | 969.27 | 40.59 | 65.56 | 209.45 | 204.21 |
|  | 1000 | 60 | 944.59 | 37.58 | 63.33 | 216.68 | 211.26 |
|  | 1500 | 60 | 920.72 | 39.53 | 60.5 | 206.66 | 201.5 |
|  | 2000 | 60 | 897.85 | 39.08 | 60.01 | 211.59 | 206.3 |
|  | 2500 | 60 | 876.1 | 38.24 | 57.91 | 211.71 | 206.42 |
|  | 3000 | 60 | 855.4 | 38.37 | 57.45 | 214.71 | 209.34 |
|  | 3500 | 60 | 835.9 | 38.35 | 55.9 | 213.85 | 208.51 |
|  | 4000 | 60 | 817.5 | 38.16 | 54.62 | 214.22 | 208.86 |
|  | 500 | 70 | 961.62 | 28.75 | 65.38 | 243.05 | 236.97 |
|  | 1000 | 70 | 937.71 | 28.36 | 63 | 241.05 | 235.03 |
|  | 1500 | 70 | 914.6 | 28 | 59.79 | 235.38 | 229.5 |
|  | 2000 | 70 | 892.43 | 27.81 | 57.15 | 230.96 | 225.18 |
|  | 2500 | 70 | 871.3 | 27.53 | 55.33 | 229.61 | 223.87 |
|  | 3000 | 70 | 851.2 | 26.9 | 54.22 | 231.64 | 225.85 |
|  | 3500 | 70 | 832.2 | 26.88 | 50.28 | 219.76 | 214.27 |
|  | 4000 | 70 | 814.3 | 26.65 | 47.98 | 214.74 | 209.37 |

TABLE 8-continued

| 30% H₂—60% N₂—5% CH₄—5% CO₂ (Case 6) | | | | | | | |
|---|---|---|---|---|---|---|---|
| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
| 5 | 500 | 30 | 981.67 | 21.06 | 62.49 | 242.24 | 236.18 |
|  | 1000 | 30 | 954.32 | 22.97 | 60.32 | 237.28 | 231.35 |
|  | 1500 | 30 | 927.83 | 21.95 | 58.81 | 239.74 | 233.75 |
|  | 2000 | 30 | 902.5 | 22.78 | 55.56 | 231.46 | 225.67 |
|  | 2500 | 30 | 878.4 | 22.42 | 54.08 | 232.05 | 226.25 |
|  | 3000 | 30 | 855.7 | 21.32 | 53.49 | 237.43 | 231.49 |
|  | 3500 | 30 | 834.3 | 22.1 | 51.82 | 234.65 | 228.78 |
|  | 4000 | 30 | 814.3 | 21.59 | 49.57 | 230.8 | 225.03 |
|  | 500 | 40 | 978.6 | 20.54 | 64.26 | 250.74 | 244.47 |
|  | 1000 | 40 | 952.21 | 18.59 | 59.97 | 243.4 | 237.31 |
|  | 1500 | 40 | 926.66 | 16.51 | 54.99 | 232.01 | 226.21 |
|  | 2000 | 40 | 902.2 | 18.78 | 52.87 | 226.21 | 220.26 |
|  | 2500 | 40 | 878.9 | 18.02 | 51.34 | 226.52 | 220.85 |
|  | 3000 | 40 | 857 | 18.82 | 50.34 | 226.71 | 221.04 |
|  | 3500 | 40 | 836.3 | 18.04 | 50.25 | 232.98 | 227.15 |
|  | 4000 | 40 | 816.8 | 17.99 | 48.26 | 229.14 | 223.41 |
|  | 500 | 50 | 975.06 | 19.22 | 63.26 | 249.81 | 243.56 |
|  | 1000 | 50 | 949.56 | 19.02 | 61.06 | 247.88 | 241.68 |
|  | 1500 | 50 | 924.89 | 18.68 | 58.66 | 244.99 | 238.86 |
|  | 2000 | 50 | 901.25 | 18.04 | 57.44 | 247.11 | 240.94 |
|  | 2500 | 50 | 878.8 | 17.85 | 55.89 | 246.83 | 240.66 |
|  | 3000 | 50 | 857.5 | 17.78 | 54.36 | 246.15 | 240 |
|  | 3500 | 50 | 837.4 | 18.46 | 53.55 | 247.31 | 241.13 |
|  | 4000 | 50 | 818.5 | 17.72 | 51.9 | 246.3 | 240.14 |
|  | 500 | 60 | 969.27 | 27.11 | 65.53 | 245.37 | 239.24 |
|  | 1000 | 60 | 944.59 | 27.05 | 63.09 | 242.57 | 236.5 |
|  | 1500 | 60 | 920.72 | 27.15 | 60.58 | 238.73 | 232.76 |
|  | 2000 | 60 | 897.85 | 26.85 | 58.63 | 237.57 | 231.63 |
|  | 2500 | 60 | 876.1 | 26.53 | 57.05 | 237.54 | 231.6 |
|  | 3000 | 60 | 855.4 | 27.05 | 55.77 | 236.77 | 230.85 |
|  | 3500 | 60 | 835.9 | 27.05 | 54.17 | 235.36 | 229.47 |
|  | 4000 | 60 | 817.5 | 26.77 | 52.69 | 234.64 | 228.77 |
|  | 500 | 70 | 961.62 | 32.88 | 61.51 | 219.05 | 213.58 |
|  | 1000 | 70 | 937.71 | 32.78 | 57.84 | 211.45 | 206.17 |
|  | 1500 | 70 | 914.6 | 32.36 | 56.49 | 212.75 | 207.43 |
|  | 2000 | 70 | 892.43 | 31.61 | 54.19 | 210.85 | 205.58 |
|  | 2500 | 70 | 871.3 | 31.14 | 51.38 | 205.82 | 200.67 |
|  | 3000 | 70 | 851.2 | 30.98 | 49.64 | 203.87 | 198.77 |
|  | 3500 | 70 | 832.2 | 30.58 | 47.05 | 198.49 | 193.53 |
|  | 4000 | 70 | 814.3 | 30 | 44.96 | 194.98 | 190.11 |
| 10 | 500 | 30 | 981.67 | 28.64 | 69.61 | 253.75 | 247.41 |
|  | 1000 | 30 | 954.32 | 28.43 | 67.37 | 253.13 | 246.81 |
|  | 1500 | 30 | 927.83 | 28.81 | 65.18 | 251.02 | 244.74 |
|  | 2000 | 30 | 902.5 | 28.37 | 62.65 | 249.06 | 242.83 |
|  | 2500 | 30 | 878.4 | 28.48 | 60.98 | 248.81 | 242.59 |
|  | 3000 | 30 | 855.7 | 28.35 | 60.33 | 252.99 | 246.67 |
|  | 3500 | 30 | 834.3 | 28.55 | 58.88 | 252.79 | 246.47 |
|  | 4000 | 30 | 814.3 | 28.65 | 57.58 | 253.01 | 246.68 |
|  | 500 | 40 | 978.6 | 28.32 | 68.45 | 251.08 | 244.8 |
|  | 1000 | 40 | 952.21 | 27.89 | 65.15 | 246.58 | 240.41 |
|  | 1500 | 40 | 926.66 | 27.45 | 62.47 | 243.92 | 237.82 |
|  | 2000 | 40 | 902.2 | 26.93 | 60.09 | 242.15 | 236.09 |
|  | 2500 | 40 | 878.9 | 26.98 | 57.96 | 239.62 | 233.63 |
|  | 3000 | 40 | 857 | 27.02 | 56.38 | 238.97 | 233 |
|  | 3500 | 40 | 836.3 | 26.94 | 56.02 | 243.5 | 237.41 |
|  | 4000 | 40 | 816.8 | 27.62 | 54.63 | 241.64 | 235.6 |
|  | 500 | 50 | 975.06 | 30.08 | 60.71 | 219.71 | 214.21 |
|  | 1000 | 50 | 949.56 | 29.5 | 59.19 | 221.22 | 215.69 |
|  | 1500 | 50 | 924.89 | 29.01 | 57.15 | 220.34 | 214.83 |
|  | 2000 | 50 | 901.25 | 28.85 | 55.57 | 220.22 | 214.72 |
|  | 2500 | 50 | 878.8 | 28.72 | 53.88 | 219.23 | 213.75 |
|  | 3000 | 50 | 857.5 | 28.89 | 52.11 | 216.97 | 211.55 |
|  | 3500 | 50 | 837.4 | 29.08 | 50.12 | 213.3 | 207.97 |
|  | 4000 | 50 | 818.5 | 28.86 | 47.76 | 208.38 | 203.17 |
|  | 500 | 60 | 969.27 | 38.19 | 59.49 | 196.72 | 191.81 |
|  | 1000 | 60 | 944.59 | 37.83 | 57.35 | 195.56 | 190.67 |
|  | 1500 | 60 | 920.72 | 37.38 | 55.79 | 196.33 | 191.42 |
|  | 2000 | 60 | 897.85 | 37.33 | 54.23 | 195.84 | 190.94 |
|  | 2500 | 60 | 876.1 | 36.68 | 53.11 | 198.27 | 193.31 |
|  | 3000 | 60 | 855.4 | 36.67 | 52.24 | 199.76 | 194.77 |
|  | 3500 | 60 | 835.9 | 36.78 | 51.27 | 200.34 | 195.33 |
|  | 4000 | 60 | 817.5 | 36.52 | 50.09 | 200.81 | 195.79 |
|  | 500 | 70 | 961.62 | 32.37 | 58.27 | 208.69 | 203.47 |
|  | 1000 | 70 | 937.71 | 31.65 | 55.58 | 205.74 | 200.6 |

37

TABLE 8-continued

| | | | | | | | |
|---|---|---|---|---|---|---|---|
| | | | 30% $H_2$—60% $N_2$—5% $CH_4$—5% $CO_2$ (Case 6) | | | | |
| Salinity (wt. %) | Pressure (psi) | Temperature (° C.) | Δρ (kg/m³) | CA (o) | ST (mN/m) | $h_{seal}$ (m) | $h_{(seal/res)}$ (m) |
| | 1500 | 70 | 914.6 | 31.36 | 53.21 | 202.59 | 197.52 |
| | 2000 | 70 | 892.43 | 31.11 | 50.95 | 199.33 | 194.35 |
| | 2500 | 70 | 871.3 | 31.14 | 47.92 | 191.93 | 187.13 |
| | 3000 | 70 | 851.2 | 30.63 | 44.28 | 182.54 | 177.98 |
| | 3500 | 70 | 832.2 | 30.51 | 41.38 | 174.67 | 170.31 |
| | 4000 | 70 | 814.3 | 30.42 | 38.78 | 167.46 | 163.27 |
| 15 | 500 | 30 | 981.67 | 30.45 | 64.68 | 231.62 | 225.83 |
| | 1000 | 30 | 954.32 | 30.86 | 62.55 | 229.44 | 223.71 |
| | 1500 | 30 | 927.83 | 31.56 | 61.69 | 231.03 | 225.26 |
| | 2000 | 30 | 902.5 | 31.69 | 59.58 | 229.06 | 223.33 |
| | 2500 | 30 | 878.4 | 31.52 | 57.99 | 229.46 | 223.72 |
| | 3000 | 30 | 855.7 | 31.18 | 57.49 | 234.38 | 228.52 |
| | 3500 | 30 | 834.3 | 31.29 | 57.68 | 240.92 | 234.9 |
| | 4000 | 30 | 814.3 | 31.33 | 55.84 | 238.86 | 232.89 |
| | 500 | 40 | 978.6 | 33.47 | 65.5 | 227.67 | 221.98 |
| | 1000 | 40 | 952.21 | 33.35 | 62.9 | 225 | 219.38 |
| | 1500 | 40 | 926.66 | 32.22 | 60.88 | 226.64 | 220.97 |
| | 2000 | 40 | 902.2 | 32.74 | 59.52 | 226.28 | 220.62 |
| | 2500 | 40 | 878.9 | 31.29 | 57.37 | 227.48 | 221.79 |
| | 3000 | 40 | 857 | 31.07 | 57.44 | 234.1 | 228.24 |
| | 3500 | 40 | 836.3 | 31.33 | 56.95 | 237.19 | 231.26 |
| | 4000 | 40 | 816.8 | 30.94 | 54.77 | 234.5 | 228.64 |
| | 500 | 50 | 975.06 | 34.46 | 64.8 | 223.43 | 217.84 |
| | 1000 | 50 | 949.56 | 34.51 | 63.04 | 223.09 | 217.51 |
| | 1500 | 50 | 924.89 | 34.18 | 61.5 | 224.31 | 218.7 |
| | 2000 | 50 | 901.25 | 34.32 | 60.67 | 226.71 | 221.04 |
| | 2500 | 50 | 878.8 | 34.14 | 59.81 | 229.69 | 223.95 |
| | 3000 | 50 | 857.5 | 34.03 | 58.04 | 228.74 | 223.02 |
| | 3500 | 50 | 837.4 | 33.73 | 56.9 | 230.41 | 224.65 |
| | 4000 | 50 | 818.5 | 33.84 | 55.93 | 231.44 | 225.65 |
| | 500 | 60 | 969.27 | 34.83 | 62.53 | 215.94 | 210.55 |
| | 1000 | 60 | 944.59 | 34.5 | 63.02 | 224.18 | 218.57 |
| | 1500 | 60 | 920.72 | 34.27 | 62.61 | 229.12 | 223.39 |
| | 2000 | 60 | 897.85 | 33.9 | 65.93 | 248.52 | 242.31 |
| | 2500 | 60 | 876.1 | 33.66 | 61.71 | 239.05 | 233.07 |
| | 3000 | 60 | 855.4 | 32.48 | 59.84 | 234.63 | 234.62 |
| | 3500 | 60 | 835.9 | 32.59 | 60.75 | 249.68 | 243.44 |
| | 4000 | 60 | 817.5 | 32.32 | 57.86 | 243.91 | 237.82 |
| | 500 | 70 | 961.62 | 31.98 | 55.48 | 199.55 | 194.56 |
| | 1000 | 70 | 937.71 | 31.85 | 52.9 | 195.39 | 190.5 |
| | 1500 | 70 | 914.6 | 31.39 | 50.79 | 193.3 | 188.47 |
| | 2000 | 70 | 892.43 | 31.1 | 47.69 | 186.58 | 181.91 |
| | 2500 | 70 | 871.3 | 30.73 | 46.09 | 185.4 | 180.77 |
| | 3000 | 70 | 851.2 | 30.6 | 44.2 | 182.27 | 177.72 |
| | 3500 | 70 | 832.2 | 30.43 | 42.11 | 177.91 | 173.46 |
| | 4000 | 70 | 814.3 | 30.24 | 39.65 | 171.55 | 167.26 |
| 20 | 500 | 30 | 981.67 | 35.03 | 60.57 | 206.02 | 200.87 |
| | 1000 | 30 | 954.32 | 35.56 | 58.92 | 204.81 | 199.69 |
| | 1500 | 30 | 927.83 | 35.48 | 57.31 | 205.11 | 199.98 |
| | 2000 | 30 | 902.5 | 36.13 | 56.48 | 206.13 | 200.98 |
| | 2500 | 30 | 878.4 | 35.66 | 54.97 | 207.35 | 202.16 |
| | 3000 | 30 | 855.7 | 35.78 | 53.69 | 207.58 | 202.39 |
| | 3500 | 30 | 834.3 | 35.48 | 53.27 | 212.01 | 206.71 |
| | 4000 | 30 | 814.3 | 35.52 | 50.37 | 205.31 | 200.18 |
| | 500 | 40 | 978.6 | 34.46 | 62.41 | 214.43 | 209.07 |
| | 1000 | 40 | 952.21 | 33.88 | 59.64 | 212.01 | 206.71 |
| | 1500 | 40 | 926.66 | 33.51 | 58.35 | 214.07 | 208.71 |
| | 2000 | 40 | 902.2 | 32.96 | 55.97 | 212.25 | 206.95 |
| | 2500 | 40 | 878.9 | 32.65 | 54.64 | 213.44 | 208.1 |
| | 3000 | 40 | 857 | 32.15 | 53.06 | 213.77 | 208.42 |
| | 3500 | 40 | 836.3 | 31.71 | 51.78 | 214.8 | 209.43 |
| | 4000 | 40 | 816.8 | 32.57 | 50.63 | 213.01 | 207.69 |
| | 500 | 50 | 975.06 | 28.11 | 62.51 | 230.57 | 224.8 |
| | 1000 | 50 | 949.56 | 27.93 | 61.11 | 231.85 | 226.06 |
| | 1500 | 50 | 924.89 | 27.85 | 58.82 | 229.3 | 223.57 |
| | 2000 | 50 | 901.25 | 28.01 | 57.63 | 230.2 | 224.44 |
| | 2500 | 50 | 878.8 | 27.69 | 56.29 | 231.28 | 225.5 |
| | 3000 | 50 | 857.5 | 27.56 | 54.82 | 231.12 | 225.35 |
| | 3500 | 50 | 837.4 | 27.34 | 53.35 | 230.76 | 224.99 |
| | 4000 | 50 | 818.5 | 27.54 | 51.9 | 229.24 | 223.51 |
| | 500 | 60 | 969.27 | 28.65 | 62.28 | 229.93 | 224.18 |
| | 1000 | 60 | 944.59 | 28.43 | 61.39 | 233.06 | 227.23 |
| | 1500 | 60 | 920.72 | 27.98 | 59.08 | 231.08 | 225.3 |
| | 2000 | 60 | 897.85 | 27.77 | 57.83 | 232.37 | 226.56 |

38

TABLE 8-continued

| | | | | | | | |
|---|---|---|---|---|---|---|---|
| | | | 30% $H_2$—60% $N_2$—5% $CH_4$—5% $CO_2$ (Case 6) | | | | |
| Salinity (wt. %) | Pressure (psi) | Temperature (° C.) | Δρ (kg/m³) | CA (o) | ST (mN/m) | $h_{seal}$ (m) | $h_{(seal/res)}$ (m) |
| | 2500 | 60 | 876.1 | 25.66 | 55.56 | 233.09 | 227.26 |
| | 3000 | 60 | 855.4 | 27.66 | 54.56 | 230.36 | 224.61 |
| | 3500 | 60 | 835.9 | 26.17 | 53.29 | 233.31 | 227.48 |
| | 4000 | 60 | 817.5 | 27.64 | 51.82 | 228.98 | 223.25 |
| | 500 | 70 | 961.62 | 34.3 | 59.44 | 208.25 | 203.04 |
| | 1000 | 70 | 937.71 | 29.5 | 55.97 | 211.84 | 206.55 |
| | 1500 | 70 | 914.6 | 29.27 | 52.77 | 205.23 | 200.1 |
| | 2000 | 70 | 892.43 | 28.51 | 50.53 | 202.9 | 197.83 |
| | 2500 | 70 | 871.3 | 28.52 | 48.76 | 200.48 | 195.47 |
| | 3000 | 70 | 851.2 | 28.71 | 46.81 | 196.68 | 191.76 |
| | 3500 | 70 | 832.2 | 28.11 | 45.19 | 195.31 | 190.43 |
| | 4000 | 70 | 814.3 | 28.19 | 42.76 | 188.7 | 183.99 |

TABLE 9

| | | | | | | | |
|---|---|---|---|---|---|---|---|
| | | | 20% $H_2$—70% $N_2$—5% $CH_4$—5% $CO_2$ (Case 7) | | | | |
| Salinity (wt. %) | Pressure (psi) | Temperature (° C.) | Δρ (kg/m³) | CA (o) | ST (mN/m) | $h_{seal}$ (m) | $h_{(seal/res)}$ (m) |
| 2 | 500 | 30 | 978.02 | 39.04 | 64.96 | 210.37 | 205.11 |
| | 1000 | 30 | 946.9 | 37.91 | 61.05 | 207.44 | 202.25 |
| | 1500 | 30 | 916.61 | 38.16 | 57.94 | 202.67 | 197.6 |
| | 2000 | 30 | 887.6 | 38.55 | 54.87 | 197.13 | 192.2 |
| | 2500 | 30 | 860 | 39 | 53.16 | 195.88 | 190.98 |
| | 3000 | 30 | 834 | 39.74 | 50.94 | 191.53 | 186.74 |
| | 3500 | 30 | 809.6 | 39.5 | 48.37 | 187.99 | 183.29 |
| | 4000 | 30 | 786.9 | 39.3 | 46.33 | 185.82 | 181.17 |
| | 500 | 40 | 975.08 | 39.04 | 63.89 | 207.55 | 202.36 |
| | 1000 | 40 | 945.08 | 39.7 | 60.25 | 200.01 | 195.01 |
| | 1500 | 40 | 915.94 | 28.31 | 57.21 | 224.25 | 218.64 |
| | 2000 | 40 | 888 | 38.59 | 54.79 | 196.66 | 191.74 |
| | 2500 | 40 | 861.4 | 37.62 | 52.68 | 197.53 | 192.59 |
| | 3000 | 40 | 836.3 | 36.53 | 50.5 | 197.85 | 192.91 |
| | 3500 | 40 | 812.7 | 35.95 | 48.69 | 197.79 | 192.84 |
| | 4000 | 40 | 790.6 | 35.8 | 46.48 | 194.43 | 189.57 |
| | 500 | 50 | 971.67 | 29.38 | 61.52 | 224.97 | 219.34 |
| | 1000 | 50 | 942.71 | 27.81 | 57.71 | 220.79 | 215.27 |
| | 1500 | 50 | 914.6 | 27.09 | 55.33 | 219.62 | 214.13 |
| | 2000 | 50 | 887.6 | 26.43 | 52.89 | 217.58 | 212.14 |
| | 2500 | 50 | 862 | 26.35 | 50.55 | 214.29 | 208.93 |
| | 3000 | 50 | 837.7 | 25.98 | 47.03 | 205.78 | 200.64 |
| | 3500 | 50 | 814.8 | 25.79 | 44.91 | 202.37 | 197.31 |
| | 4000 | 50 | 793.4 | 25.74 | 43.31 | 200.51 | 195.5 |
| | 500 | 60 | 965.99 | 16.93 | 61.7 | 249.17 | 242.94 |
| | 1000 | 60 | 937.99 | 17.23 | 58.12 | 241.3 | 235.26 |
| | 1500 | 60 | 910.84 | 16.6 | 53.86 | 231.06 | 225.28 |
| | 2000 | 60 | 884.8 | 16.74 | 51.19 | 225.89 | 220.25 |
| | 2500 | 60 | 859.9 | 16.54 | 49.21 | 223.69 | 218.1 |
| | 3000 | 60 | 836.4 | 15.83 | 46.77 | 219.35 | 213.87 |
| | 3500 | 60 | 814.2 | 16.03 | 44.3 | 213.22 | 207.89 |
| | 4000 | 60 | 793.4 | 15.84 | 41.61 | 205.74 | 200.6 |
| | 500 | 70 | 958.45 | 34.15 | 61.22 | 215.56 | 210.17 |
| | 1000 | 70 | 931.34 | 29.47 | 57.7 | 219.96 | 214.46 |
| | 1500 | 70 | 905.08 | 29.21 | 53.52 | 210.44 | 205.18 |
| | 2000 | 70 | 879.9 | 29.3 | 50.9 | 205.71 | 200.57 |
| | 2500 | 70 | 855.8 | 29.32 | 48.98 | 203.46 | 198.37 |
| | 3000 | 70 | 833 | 29.22 | 46.58 | 198.99 | 194.02 |
| | 3500 | 70 | 811.4 | 29.29 | 44.14 | 193.49 | 188.65 |
| | 4000 | 70 | 791.1 | 29.05 | 41.49 | 186.96 | 182.29 |
| 5 | 500 | 30 | 978.02 | 28.84 | 73.33 | 267.83 | 261.13 |
| | 1000 | 30 | 946.9 | 27.83 | 70.02 | 266.64 | 259.98 |
| | 1500 | 30 | 916.61 | 27.9 | 67.31 | 264.65 | 258.03 |
| | 2000 | 30 | 887.6 | 27.75 | 67.29 | 273.57 | 266.73 |
| | 2500 | 30 | 860 | 27.59 | 65.2 | 273.96 | 267.12 |
| | 3000 | 30 | 834 | 27.47 | 62.75 | 272.21 | 265.4 |
| | 3500 | 30 | 809.6 | 27.56 | 63.49 | 283.48 | 276.39 |
| | 4000 | 30 | 786.9 | 27.41 | 59.29 | 272.73 | 265.91 |
| | 500 | 40 | 975.08 | 26.76 | 65.92 | 246.13 | 239.98 |
| | 1000 | 40 | 945.08 | 26.68 | 63.85 | 246.17 | 240.02 |

| 20% $H_2$—70% $N_2$—5% $CH_4$—5% $CO_2$ (Case 7) | | | | | | | |
|---|---|---|---|---|---|---|---|
| Salinity (wt. %) | Pressure (psi) | Temperature (° C.) | Δρ (kg/m³) | CA (o) | ST (mN/m) | $h_{seal}$ (m) | $h_{(seal/res)}$ (m) |
|  | 1500 | 40 | 915.94 | 26.23 | 61.27 | 244.68 | 238.57 |
|  | 2000 | 40 | 888 | 26.32 | 59.77 | 246 | 239.85 |
|  | 2500 | 40 | 861.4 | 26.4 | 58.32 | 247.29 | 241.11 |
|  | 3000 | 40 | 836.3 | 25.26 | 56.38 | 248.62 | 242.4 |
|  | 3500 | 40 | 812.7 | 26.25 | 54.69 | 246.08 | 239.92 |
|  | 4000 | 40 | 790.6 | 26.16 | 53.02 | 245.46 | 239.32 |
|  | 500 | 50 | 971.67 | 28.27 | 64.16 | 237.13 | 231.2 |
|  | 1000 | 50 | 942.71 | 28.01 | 62.34 | 238.05 | 232.1 |
|  | 1500 | 50 | 914.6 | 27.81 | 60.43 | 238.31 | 232.35 |
|  | 2000 | 50 | 887.6 | 27.65 | 57.54 | 234.13 | 228.28 |
|  | 2500 | 50 | 862 | 27.51 | 57.21 | 240.03 | 234.03 |
|  | 3000 | 50 | 837.7 | 27.44 | 56.51 | 244.11 | 238 |
|  | 3500 | 50 | 814.8 | 27.4 | 53.94 | 239.63 | 233.64 |
|  | 4000 | 50 | 793.4 | 27.5 | 52.51 | 239.41 | 233.42 |
|  | 500 | 60 | 965.99 | 23.96 | 65.84 | 253.98 | 247.63 |
|  | 1000 | 60 | 937.99 | 23.62 | 63.21 | 251.77 | 245.47 |
|  | 1500 | 60 | 910.84 | 23.78 | 60.06 | 246.02 | 239.87 |
|  | 2000 | 60 | 884.8 | 23.07 | 57.82 | 245.15 | 239.02 |
|  | 2500 | 60 | 859.9 | 22.86 | 55.92 | 244.34 | 238.23 |
|  | 3000 | 60 | 836.4 | 23 | 54.93 | 246.49 | 240.33 |
|  | 3500 | 60 | 814.2 | 23.03 | 53.69 | 247.46 | 241.27 |
|  | 4000 | 60 | 793.4 | 21.9 | 52.26 | 249.22 | 242.99 |
|  | 500 | 70 | 958.45 | 35.8 | 61.79 | 213.21 | 207.88 |
|  | 1000 | 70 | 931.34 | 35.26 | 59.11 | 211.3 | 206.02 |
|  | 1500 | 70 | 905.08 | 35.1 | 55.92 | 206.13 | 200.97 |
|  | 2000 | 70 | 879.9 | 34.5 | 53.29 | 203.54 | 198.45 |
|  | 2500 | 70 | 855.8 | 34.17 | 50.64 | 199.63 | 194.64 |
|  | 3000 | 70 | 833 | 34.07 | 47.66 | 193.27 | 188.44 |
|  | 3500 | 70 | 811.4 | 33.49 | 45.17 | 189.28 | 184.55 |
|  | 4000 | 70 | 791.1 | 30.47 | 43.34 | 192.53 | 187.72 |
| 10 | 500 | 30 | 978.02 | 20.03 | 68.58 | 268.62 | 261.91 |
|  | 1000 | 30 | 946.9 | 20.7 | 65.52 | 263.93 | 257.33 |
|  | 1500 | 30 | 916.61 | 20.39 | 63.66 | 265.45 | 258.82 |
|  | 2000 | 30 | 887.6 | 20.11 | 62.91 | 271.39 | 264.61 |
|  | 2500 | 30 | 860 | 20.76 | 61.68 | 273.47 | 266.63 |
|  | 3000 | 30 | 834 | 19.92 | 60.16 | 276.51 | 269.6 |
|  | 3500 | 30 | 809.6 | 20.91 | 59.02 | 277.66 | 270.72 |
|  | 4000 | 30 | 786.9 | 20.82 | 56.81 | 275.17 | 268.29 |
|  | 500 | 40 | 975.08 | 28.43 | 68.02 | 250.14 | 243.88 |
|  | 1000 | 40 | 945.08 | 27.97 | 65.3 | 248.82 | 242.6 |
|  | 1500 | 40 | 915.94 | 27.7 | 63.41 | 249.94 | 243.69 |
|  | 2000 | 40 | 888 | 27.58 | 62.66 | 255.03 | 248.65 |
|  | 2500 | 40 | 861.4 | 27.54 | 61.44 | 257.9 | 251.46 |
|  | 3000 | 40 | 836.3 | 27.44 | 60.47 | 261.65 | 255.11 |
|  | 3500 | 40 | 812.7 | 27.31 | 60.2 | 268.37 | 261.66 |
|  | 4000 | 40 | 790.6 | 27.14 | 59.04 | 270.98 | 264.21 |
|  | 500 | 50 | 971.67 | 24.71 | 64.23 | 244.87 | 238.75 |
|  | 1000 | 50 | 942.71 | 24.27 | 61.82 | 243.76 | 237.67 |
|  | 1500 | 50 | 914.6 | 23.82 | 59.78 | 243.83 | 237.73 |
|  | 2000 | 50 | 887.6 | 22.72 | 57.74 | 244.68 | 238.57 |
|  | 2500 | 50 | 862 | 23.79 | 56.01 | 242.46 | 236.4 |
|  | 3000 | 50 | 837.7 | 22.84 | 54.33 | 242.15 | 237.65 |
|  | 3500 | 50 | 814.8 | 23.68 | 52.84 | 242.15 | 236.1 |
|  | 4000 | 50 | 793.4 | 22.78 | 51.84 | 245.64 | 239.5 |
|  | 500 | 60 | 965.99 | 26.3 | 65.03 | 246.11 | 239.95 |
|  | 1000 | 60 | 937.99 | 26.56 | 62.56 | 243.25 | 237.17 |
|  | 1500 | 60 | 910.84 | 26.3 | 60.05 | 241.02 | 235 |
|  | 2000 | 60 | 884.8 | 26.13 | 58.06 | 240.21 | 234.21 |
|  | 2500 | 60 | 859.9 | 25.39 | 56.56 | 242.31 | 236.25 |
|  | 3000 | 60 | 836.4 | 25.36 | 55.12 | 242.82 | 236.75 |
|  | 3500 | 60 | 814.2 | 25.17 | 53.27 | 241.44 | 235.43 |
|  | 4000 | 60 | 793.4 | 25.06 | 52.37 | 243.83 | 237.73 |
|  | 500 | 70 | 958.45 | 34.85 | 57.76 | 201.68 | 196.63 |
|  | 1000 | 70 | 931.34 | 35.43 | 53.81 | 191.97 | 187.17 |
|  | 1500 | 70 | 905.08 | 34.94 | 50.08 | 184.95 | 180.33 |
|  | 2000 | 70 | 879.9 | 34.93 | 45.1 | 171.35 | 167.07 |
|  | 2500 | 70 | 855.8 | 34.46 | 41.38 | 162.56 | 158.49 |
|  | 3000 | 70 | 833 | 34.17 | 38.77 | 157.02 | 153.09 |
|  | 3500 | 70 | 811.4 | 34.2 | 37.01 | 153.84 | 150 |
|  | 4000 | 70 | 791.1 | 34.45 | 35.53 | 151.04 | 147.26 |
| 15 | 500 | 30 | 978.02 | 23.86 | 65.01 | 247.86 | 241.66 |
|  | 1000 | 30 | 946.9 | 23.36 | 61.93 | 244.83 | 238.71 |
|  | 1500 | 30 | 916.61 | 23.24 | 60.57 | 247.57 | 241.38 |
|  | 2000 | 30 | 887.6 | 22.51 | 59.29 | 251.61 | 245.32 |
|  | 2500 | 30 | 860 | 22.4 | 57.44 | 251.81 | 245.52 |
|  | 3000 | 30 | 834 | 22.56 | 55.16 | 249.04 | 242.81 |
|  | 3500 | 30 | 809.6 | 22.3 | 54.07 | 251.94 | 245.65 |
|  | 4000 | 30 | 786.9 | 21.26 | 52.28 | 252.47 | 246.15 |
|  | 500 | 40 | 975.08 | 33.29 | 63.51 | 221.99 | 216.44 |
|  | 1000 | 40 | 945.08 | 33.38 | 61.3 | 220.88 | 215.36 |
|  | 1500 | 40 | 915.94 | 33.01 | 59.35 | 221.59 | 216.05 |
|  | 2000 | 40 | 888 | 32.57 | 57.29 | 221.7 | 216.16 |
|  | 2500 | 40 | 861.4 | 32.37 | 56.11 | 224.34 | 218.73 |
|  | 3000 | 40 | 836.3 | 32.24 | 54.82 | 226.09 | 220.44 |
|  | 3500 | 40 | 812.7 | 32.38 | 53.5 | 226.69 | 221.03 |
|  | 4000 | 40 | 790.6 | 32.11 | 51.57 | 225.31 | 219.68 |
|  | 500 | 50 | 971.67 | 31.6 | 66.66 | 238.25 | 232.3 |
|  | 1000 | 50 | 942.71 | 30.58 | 64.69 | 240.89 | 234.87 |
|  | 1500 | 50 | 914.6 | 30.7 | 62.64 | 240.13 | 234.13 |
|  | 2000 | 50 | 887.6 | 29.19 | 60.79 | 243.81 | 237.72 |
|  | 2500 | 50 | 862 | 31.18 | 60.03 | 242.95 | 236.88 |
|  | 3000 | 50 | 837.7 | 29.66 | 57.89 | 244.85 | 238.73 |
|  | 3500 | 50 | 814.8 | 30.16 | 57.34 | 248.08 | 241.88 |
|  | 4000 | 50 | 793.4 | 30.24 | 55.87 | 248.07 | 241.87 |
|  | 500 | 60 | 965.99 | 25.19 | 65.47 | 250.07 | 243.81 |
|  | 1000 | 60 | 937.99 | 25.36 | 64.29 | 252.54 | 246.23 |
|  | 1500 | 60 | 910.84 | 24.34 | 61.2 | 249.63 | 243.39 |
|  | 2000 | 60 | 884.8 | 25.41 | 60.29 | 250.98 | 244.71 |
|  | 2500 | 60 | 859.9 | 24.95 | 59.02 | 253.77 | 247.43 |
|  | 3000 | 60 | 836.4 | 24.59 | 57.76 | 256.04 | 249.63 |
|  | 3500 | 60 | 814.2 | 24.64 | 56.14 | 255.57 | 249.18 |
|  | 4000 | 60 | 793.4 | 24.32 | 54.66 | 255.99 | 249.59 |
|  | 500 | 70 | 958.45 | 31.84 | 63.92 | 231.05 | 225.27 |
|  | 1000 | 70 | 931.34 | 31.2 | 60.92 | 228.16 | 222.46 |
|  | 1500 | 70 | 905.08 | 30.73 | 58.41 | 226.18 | 220.53 |
|  | 2000 | 70 | 879.9 | 30.43 | 54.94 | 219.52 | 214.03 |
|  | 2500 | 70 | 855.8 | 29.84 | 52.97 | 218.93 | 213.46 |
|  | 3000 | 70 | 833 | 29.37 | 50.76 | 216.52 | 211.11 |
|  | 3500 | 70 | 811.4 | 29.46 | 48.36 | 211.61 | 206.32 |
|  | 4000 | 70 | 791.1 | 28.69 | 45.64 | 206.38 | 201.22 |
| 20 | 500 | 30 | 978.02 | 28.01 | 67.64 | 248.97 | 242.75 |
|  | 1000 | 30 | 946.9 | 27.8 | 65.09 | 247.93 | 241.73 |
|  | 1500 | 30 | 916.61 | 28.1 | 63.51 | 249.22 | 242.99 |
|  | 2000 | 30 | 887.6 | 27.96 | 62.71 | 254.47 | 248.11 |
|  | 2500 | 30 | 860 | 27.77 | 60.76 | 254.91 | 248.54 |
|  | 3000 | 30 | 834 | 28.16 | 59.77 | 257.64 | 251.2 |
|  | 3500 | 30 | 809.6 | 28.35 | 58.26 | 258.25 | 251.79 |
|  | 4000 | 30 | 786.9 | 27.96 | 56.44 | 258.32 | 251.86 |
|  | 500 | 40 | 975.08 | 29.26 | 67.14 | 244.93 | 238.81 |
|  | 1000 | 40 | 945.08 | 28.64 | 64.61 | 244.65 | 238.54 |
|  | 1500 | 40 | 915.94 | 28.67 | 62.78 | 245.21 | 239.08 |
|  | 2000 | 40 | 888 | 28.81 | 60.81 | 244.65 | 238.54 |
|  | 2500 | 40 | 861.4 | 28.72 | 59.03 | 245.07 | 238.94 |
|  | 3000 | 40 | 836.3 | 28.48 | 58.15 | 249.24 | 243 |
|  | 3500 | 40 | 812.7 | 28.47 | 56.97 | 251.24 | 244.96 |
|  | 4000 | 40 | 790.6 | 28.33 | 55.98 | 254.12 | 247.77 |
|  | 500 | 50 | 971.67 | 19.85 | 58.15 | 229.53 | 223.79 |
|  | 1000 | 50 | 942.71 | 24.62 | 56.23 | 221.08 | 215.55 |
|  | 1500 | 50 | 914.6 | 25.35 | 54.36 | 219.02 | 213.54 |
|  | 2000 | 50 | 887.6 | 26.14 | 52.75 | 217.55 | 212.11 |
|  | 2500 | 50 | 862 | 25.81 | 51.46 | 219.15 | 213.68 |
|  | 3000 | 50 | 837.7 | 25.24 | 51.04 | 224.71 | 219.09 |
|  | 3500 | 50 | 814.8 | 25.02 | 48.81 | 221.35 | 215.82 |
|  | 4000 | 50 | 793.4 | 25.38 | 48.17 | 223.66 | 218.07 |
|  | 500 | 60 | 965.99 | 22.52 | 60.45 | 233.98 | 228.13 |
|  | 1000 | 60 | 937.99 | 22.66 | 58.37 | 234.15 | 228.3 |
|  | 1500 | 60 | 910.84 | 22.58 | 56.3 | 232.72 | 226.9 |
|  | 2000 | 60 | 884.8 | 22.83 | 54.76 | 232.6 | 226.78 |
|  | 2500 | 60 | 859.9 | 22.57 | 53.77 | 235.46 | 229.57 |
|  | 3000 | 60 | 836.4 | 22.67 | 52.05 | 234.16 | 228.31 |
|  | 3500 | 60 | 814.2 | 22.83 | 51.12 | 235.93 | 230.04 |
|  | 4000 | 60 | 793.4 | 22.83 | 49.34 | 233.72 | 227.87 |
|  | 500 | 70 | 958.45 | 34.3 | 59.25 | 208.25 | 203.04 |
|  | 1000 | 70 | 931.34 | 29.5 | 55.59 | 211.84 | 206.55 |
|  | 1500 | 70 | 905.08 | 29.27 | 52.22 | 205.23 | 200.1 |
|  | 2000 | 70 | 879.9 | 28.51 | 49.82 | 202.9 | 197.83 |
|  | 2500 | 70 | 855.8 | 28.52 | 47.89 | 200.48 | 195.47 |
|  | 3000 | 70 | 833 | 28.71 | 45.81 | 196.68 | 191.76 |

TABLE 9-continued

| | | | | | | | |
|---|---|---|---|---|---|---|---|
| 20% H₂—70% N₂—5% CH₄—5% CO₂ (Case 7) | | | | | | | |
| Salinity (wt. %) | Pressure (psi) | Temperature (° C.) | $\Delta\rho$ (kg/m³) | CA (o) | ST (mN/m) | $h_{seal}$ (m) | $h_{(seal/res)}$ (m) |
| | 3500 | 70 | 811.4 | 28.11 | 44.06 | 195.31 | 190.43 |
| | 4000 | 70 | 791.1 | 28.19 | 41.54 | 188.7 | 183.99 |

According to the present disclosure, a feasibility study of using $N_2$ as a cushion gas (in the presence of $CH_4$ and $CO_2$) for $H_2$ storage is performed by simulating a depleted natural gas scenario. The pendant drop approach was utilized to extensively investigate the gas/brine surface tension important for large-scale $H_2$ storage, while the sessile drop method was employed to test the various quartz/brine/gas-mixture ($H_2$—$N_2$—$CH_4$—$CO_2$) systems. Reservoir pressure ranged from 500 to 4000 psi, the temperature ranged from 30 to 70° C., and the salinity of the NaCl brine ranged from 2 to 20 wt. %. In the present disclosure, wettability investigation showed that all the $N_2$ gas mixture exhibited strong water wet conditions with no noticeable change in pressure and salinity, but slight decreases with increasing temperature. Surface tension results decrease with increasing pressure (regardless of salinity and temperature) but decrease more with increasing $N_2$ fraction. Surface tension increases with increasing salinity but was not continuous over the investigated temperature. Pore sizes can influence the column height estimates and will always result in the column height estimate for the capillary effect of seal rock being higher than column height which considers both seal and reservoir rock capillary effects. Using a $N_2$ fraction of 30% (i.e., Test case 3) provides a preferable cushion gas design for $H_2$ storage for the wide range of investigated reservoir conditions. $N_2$ cushion gas can be used as an alternative to $CH_4$ cushion gas based on wettability and the observed surface tension results.

Numerous modifications and variations of the present disclosure are possible in light of the above teachings. It is therefore to be understood that within the scope of the appended claims, the invention may be practiced otherwise than as specifically described herein.

The invention claimed is:

1. A method of storing hydrogen ($H_2$) gas in a subsurface formation having at least one injection well, at least one production well and at least one heat well penetrating the subsurface formation, comprising:
  injecting a first fluid stream into the subsurface formation via the at least one injection well to form a first composition containing a gas-phase mixture, a liquid-phase mixture and a solid matrix;
  wherein the injecting increases wettability of the solid matrix by contact with the gas-phase mixture and the liquid-phase mixture, and reduces surface tension of the gas-phase mixture and the liquid-phase mixture;
  wherein the gas-phase mixture of the first composition comprises:
  10 to 60% of $H_2$;
  40 to 80% of nitrogen ($N_2$);
  1 to 5% of methane ($CH_4$); and
  1 to 10% of carbon dioxide ($CO_2$), and each % is based on a total volume of the gas phase mixture;
  wherein the liquid-phase mixture of the first composition comprises water and at least one water-soluble mineral;
  wherein the solid matrix of the first composition comprises clay, shale, slate, and minerals; and injecting a $H_2$-containing gas stream into the subsurface formation via the at least one injection well to form a gas mixture containing $H_2$ gas;
  wherein the $H_2$-containing gas stream comprises at least 50% of $H_2$ based on a total volume of the $H_2$-containing gas stream;
  heating and pressurizing the subsurface formation containing the gas mixture via the at least one heat well thereby achieving a storage condition and maintaining the storage condition to store the $H_2$ in the subsurface formation.

2. The method of claim 1, wherein the gas mixture after the injecting comprises:
  20 to 80% of $H_2$;
  10 to 70% of $N_2$;
  about 5% of $CH_4$;
  about 5% of $CO_2$; and
  each % is based on a total volume of the gas mixture.

3. The method of claim 1, wherein the gas-phase mixture of the first composition further comprises up to 5% of hydrogen sulfide ($H_2S$), based on the total volume of the gas-phase mixture.

4. The method of claim 1, wherein the gas-phase mixture of the first composition further comprises up to 5% of moisture ($H_2O$), based on the total volume of the gas-phase mixture.

5. The method of claim 1, wherein the subsurface formation is a hydrocarbon-containing reservoir, a depleted natural gas reservoir, a carbon sequestration reservoir, an aquifer, a geothermal reservoir, and/or an in-situ leachable ore deposit.

6. The method of claim 1, wherein;
  the subsurface formation comprises a rock material obtained from at least one shale selected from the group consisting of Eagle ford shale, Wolfcamp shale, Posidonia shale, Wellington shale, and Mancos shale.

7. The method of claim 6, wherein the rock material comprises one or more of Bentheimer sandstone, Berea sandstone, Vosges sandstone, quartz, borosilicate glass, basalt, shale, calcite, granite, dolomite, gypsum, anhydrite, mica, kaolinite, illite, montmorillonite, and coal.

8. The method of claim 1, wherein the at least one water-soluble mineral comprises one or more of sodium bicarbonate, sodium carbonate, sodium chloride, potassium bicarbonate, potassium carbonate, and potassium chloride.

9. The method of claim 1, wherein the at least one water-soluble mineral is present in the liquid-phase mixture at a concentration of 0.1 to 30 wt. % based on a total weight of the liquid-phase mixture.

10. The method of claim 1, wherein the at least one water-soluble mineral is sodium chloride, and wherein the sodium chloride is present in the liquid-phase mixture at a concentration of 2 to 20 wt. % based on a total weight of the liquid-phase mixture.

11. The method of claim 1, wherein the solid matrix of the first composition further comprises silicate, argillite, quartz, sandstone, gypsum, conglomerate, basalt, feldspar, mica, granite, granodiorite, diorite, calcite, kaolinite, illite, montmorillonite, and sand.

12. The method of claim 1, wherein;
  the storage condition has a temperature in a range of 20 to 80 degree Celsius (° C.) in the subsurface formation,
  the gas/liquid-phase mixture has a water contact angle with the solid matrix in a range of 15 to 50 degrees (°) under a pressure of 500 to 4000 pound-force per square inch (psi) in the subsurface formation, and the gas/liquid-phase mixture has a surface tension in a range of 50 to 90 dynes per centimeter (dynes/cm) under a pressure of 500 to 4000 psi in the subsurface formation, as determined by ASTM D1331-14.

13. The method of claim 1, wherein:

the storage condition has a pressure of 300 to 5000 psi in the subsurface formation, the gas/liquid-phase mixture has a water contact angle with the solid matrix in a range of 15 to 50° under a temperature in a range of 30 to 70° C. in the subsurface formation, and the gas/liquid-phase mixture has a surface tension in a range of 50 to 90 dynes/cm under a temperature in a range of 30 to 70° C. in the subsurface formation, as determined by ASTM D1331-14.

14. The method of claim 1, wherein the first fluid stream is injected in an amount effective to increase an $H_2$ storage capacity of the subsurface formation, wherein:

the gas mixture under the storage condition comprises about 60% of $H_2$, about 30% of $N_2$, about 5% of $CO_2$, about 5% of $CH_4$, each % based on a total volume of the gas mixture;

the liquid-phase mixture comprises 2 to 5 wt. % of NaCl based on a total weight of the liquid-phase mixture; and the storage condition has a temperature in a range of 30 to 40° C.

15. The method of claim 1, further comprising:

withdrawing the gas mixture under the storage condition from the subsurface formation via the at least one production well;

introducing the gas mixture into a hydrogen purification device comprising a plurality of hydrogen-selective membranes;

wherein the plurality of hydrogen-selective membranes are permeable to hydrogen gas, but are at least substantially impermeable to other components in the gas mixture passing the gas mixture through the plurality of hydrogen-selective membranes in the hydrogen purification device thereby allowing hydrogen gas to pass through the hydrogen-selective membrane and rejecting other components in the gas mixture to form a residue composition; and collecting the hydrogen gas after passing and recycling the residue composition.

16. The method of claim 15, wherein the plurality of hydrogen-selective membranes in the hydrogen purification device is arranged in parallel, and wherein each membrane of the plurality of hydrogen-selective membranes is placed in a plane perpendicular to the direction of the gas mixture flow in the hydrogen purification device.

17. The method of claim 1, wherein the at least one heat well is in the form of a closed-loop pipeline having an aboveground loop part and an underground loop part.

18. The method of claim 17, wherein the underground loop part has a helix shape.

19. The method of claim 17, wherein the underground loop part includes a perforated casing.

20. The method of claim 1, wherein the gas-phase mixture of the first composition comprises:

10 to 40% of $H_2$;

60 to 80% of nitrogen ($N_2$);

1 to 5% of methane ($CH_4$); and 1 to 10% of carbon dioxide ($CO_2$), and each % is based on the total volume of the gas phase mixture.

* * * * *